US012420337B2

(12) United States Patent
Woodard et al.

(10) Patent No.: US 12,420,337 B2
(45) Date of Patent: Sep. 23, 2025

(54) SEALED FURNACE

(71) Applicant: Desktop Metal, Inc., Burlington, MA (US)

(72) Inventors: Nathan Woodard, Medford, MA (US); Jonah Samuel Myerberg, Lexington, MA (US); Emanuel M Sachs, Burlington, MA (US); Richard Remo Fontana, Cape Elizabeth, MA (US); Robert Edward Weiss, San Francisco, MA (US); Yet-Ming Chiang, Burlington, MA (US); Stephen Dipietro, Amherst, MA (US); Nicholas Graham Bandiera, Burlington, MA (US)

(73) Assignee: Desktop Metal, Inc., Burlington, MA (US)

( * ) Notice: Subject to any disclaimer, the term of this patent is extended or adjusted under 35 U.S.C. 154(b) by 958 days.

(21) Appl. No.: 17/429,763

(22) PCT Filed: Feb. 11, 2020

(86) PCT No.: PCT/US2020/017714
§ 371 (c)(1),
(2) Date: Aug. 10, 2021

(87) PCT Pub. No.: WO2020/167802
PCT Pub. Date: Aug. 20, 2020

(65) Prior Publication Data
US 2022/0008991 A1  Jan. 13, 2022

Related U.S. Application Data

(60) Provisional application No. 62/911,696, filed on Oct. 7, 2019, provisional application No. 62/911,665, filed
(Continued)

(51) Int. Cl.
*B22F 3/00* (2021.01)
*B22F 3/10* (2006.01)
(Continued)

(52) U.S. Cl.
CPC ............ *B22F 3/003* (2013.01); *B22F 3/1021* (2013.01); *B33Y 40/20* (2020.01); *F27B 5/04* (2013.01);
(Continued)

(58) Field of Classification Search
CPC .. B22F 2201/20; B22F 2999/00; B22F 3/003; B22F 3/10; B22F 3/1021; B33Y 40/00;
(Continued)

(56) References Cited

U.S. PATENT DOCUMENTS

| | | | |
|---|---|---|---|
| 5,048,801 A * | 9/1991 | Johnson | F27D 7/02 266/256 |
| 2022/0108900 A1* | 4/2022 | Shimada | C23C 16/46 |
| 2023/0114036 A1* | 4/2023 | Woodard | F27B 5/04 432/205 |

FOREIGN PATENT DOCUMENTS

JP           06249578           9/1994

* cited by examiner

*Primary Examiner* — Quang T Van

(57) ABSTRACT

A furnace may include an outer wall defining a chamber, the chamber including an internal cavity configured to receive one or more parts, at least one heater positioned within the chamber, the at least one heater being configured to generate temperatures of at least about 800 degrees Celsius within the internal cavity, and a vacuum pump configured to apply a vacuum to at least a portion of the chamber. The furnace may also include at least one layer of inner insulation and at least one layer of outer insulation disposed outward of the inner
(Continued)

insulation with respect to the chamber, the at least one layer of outer insulation being sealed with respect to the at least one layer of inner insulation.

33 Claims, 32 Drawing Sheets

Related U.S. Application Data on Oct. 7, 2019, provisional application No. 62/830,303, filed on Apr. 5, 2019, provisional application No. 62/804,181, filed on Feb. 11, 2019.

(51) Int. Cl.
*B33Y 40/20* (2020.01)
*F27B 5/04* (2006.01)
*F27B 5/08* (2006.01)
*F27B 5/18* (2006.01)
*F27D 1/00* (2006.01)
*F27D 99/00* (2010.01)

(52) U.S. Cl.
CPC .................. *F27B 5/08* (2013.01); *F27B 5/18* (2013.01); *F27D 1/0033* (2013.01); *F27D 99/0073* (2013.01); *B22F 2201/20* (2013.01)

(58) Field of Classification Search
CPC ... B33Y 40/20; F27B 5/04; F27B 5/08; F27B 5/18; F27D 1/0033; F27D 99/0073
USPC ........ 373/110, 111, 112, 118, 119, 122, 128, 373/129, 130, 140, 141, 144
See application file for complete search history.

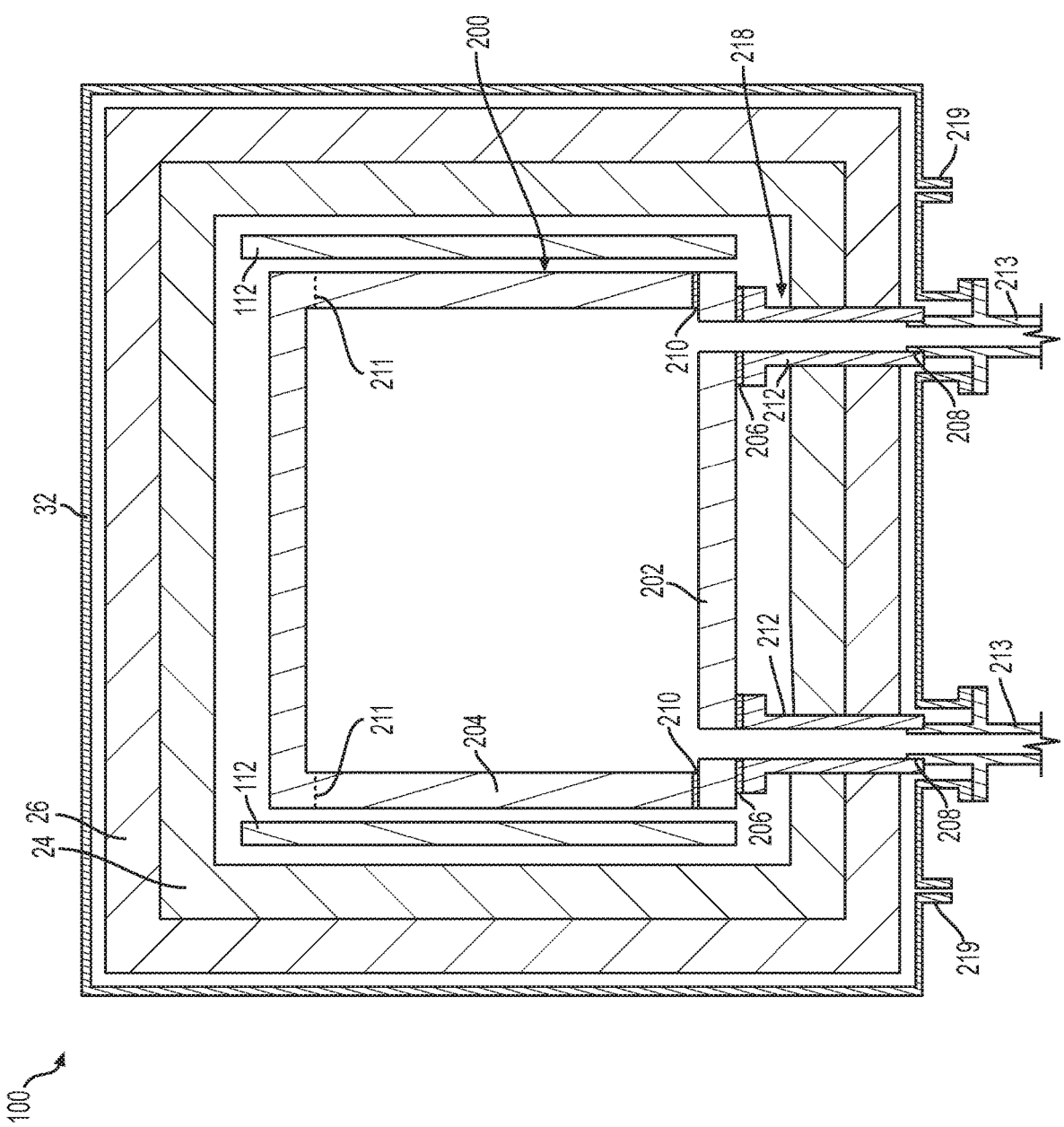

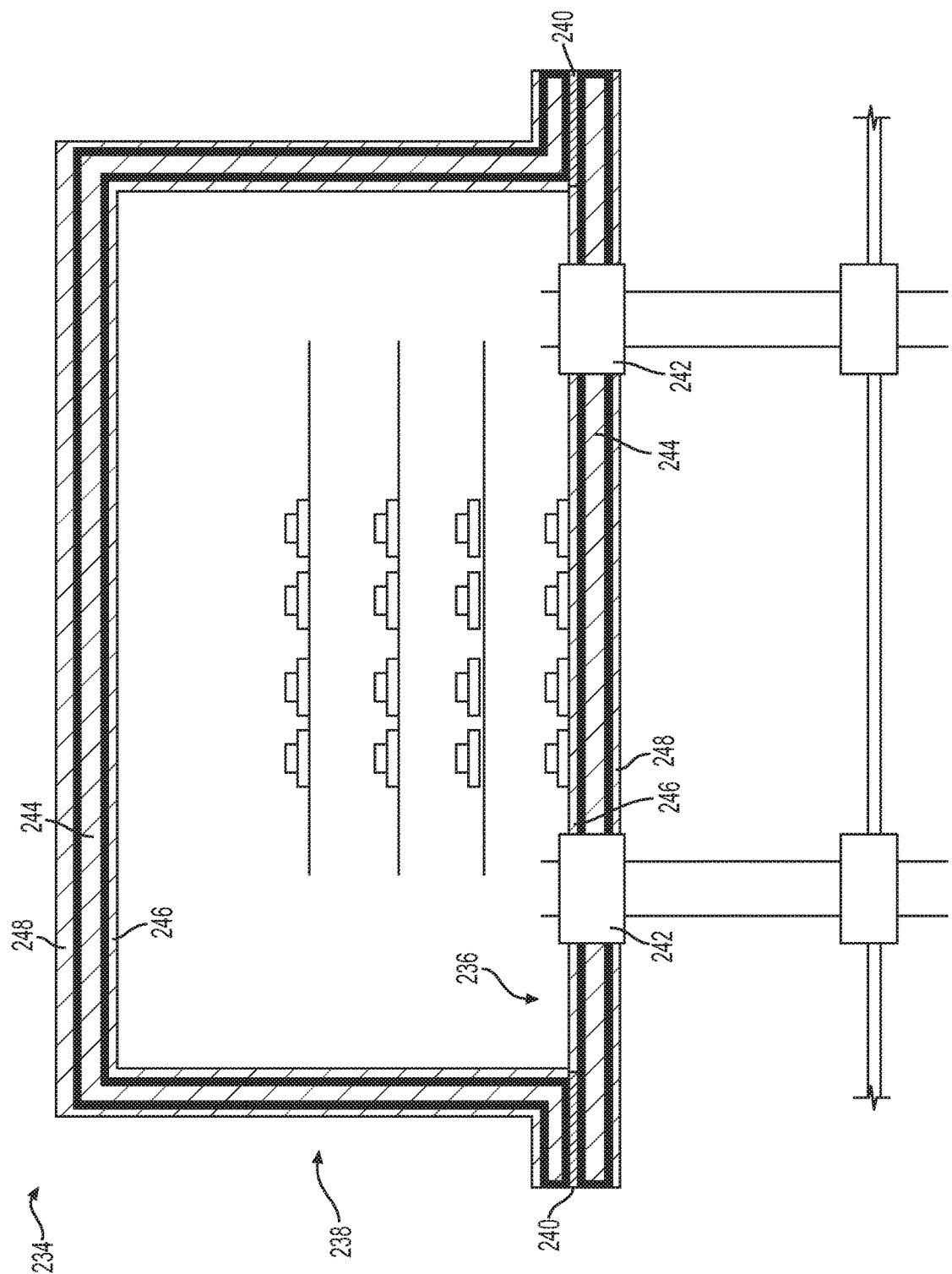

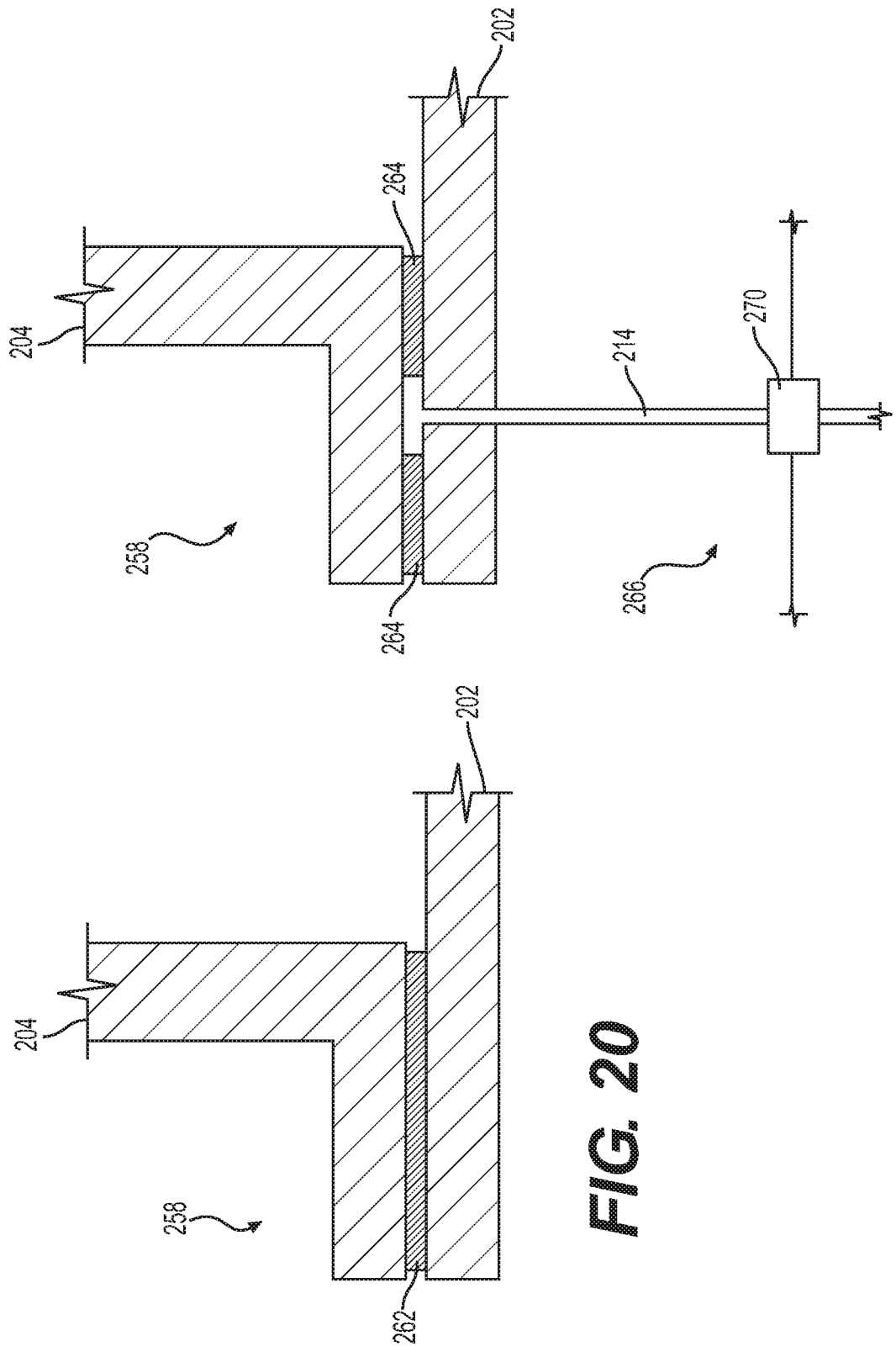

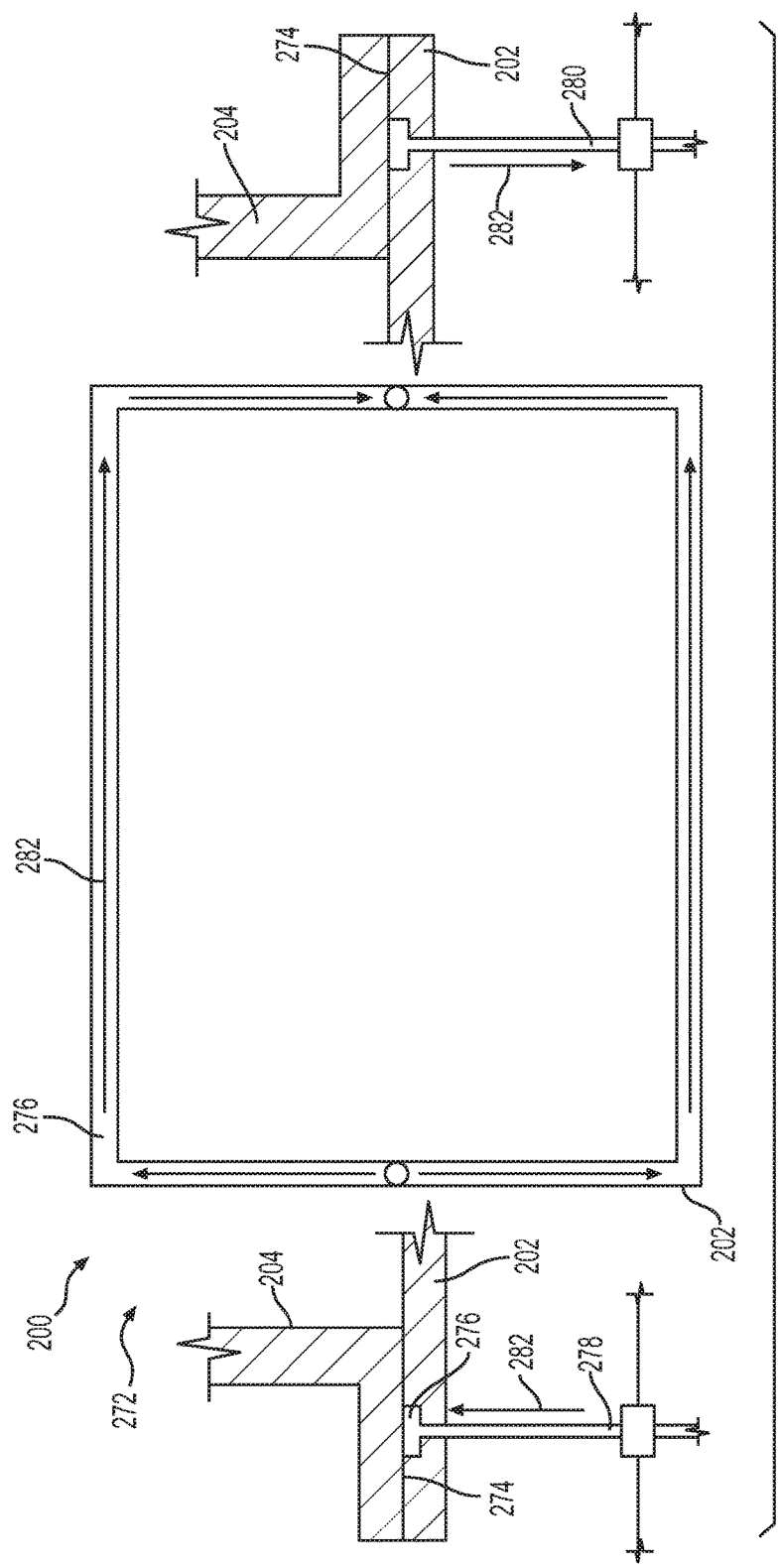
FIG. 22A
FIG. 22B
FIG. 22C

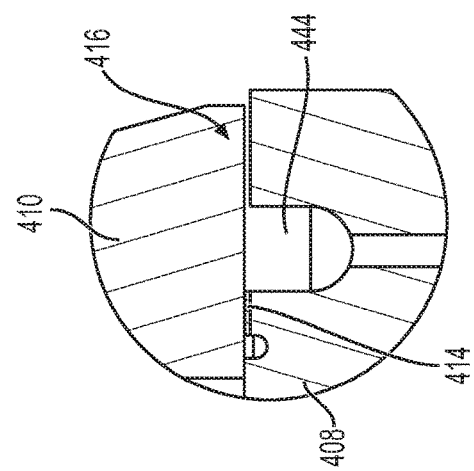
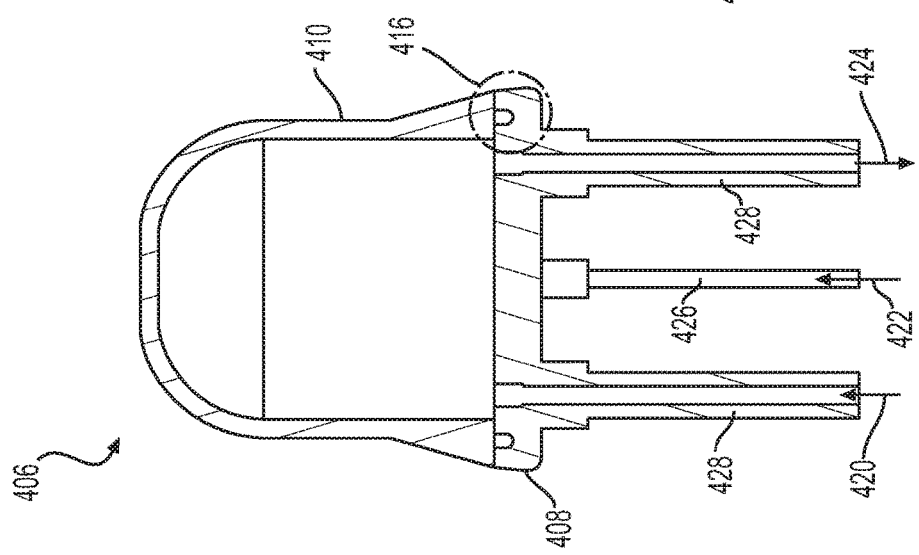
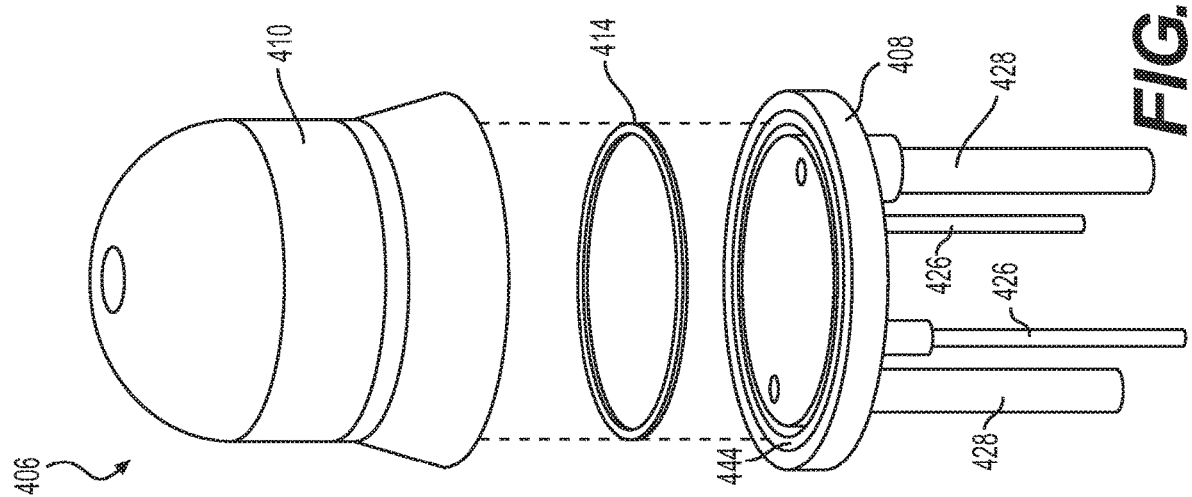

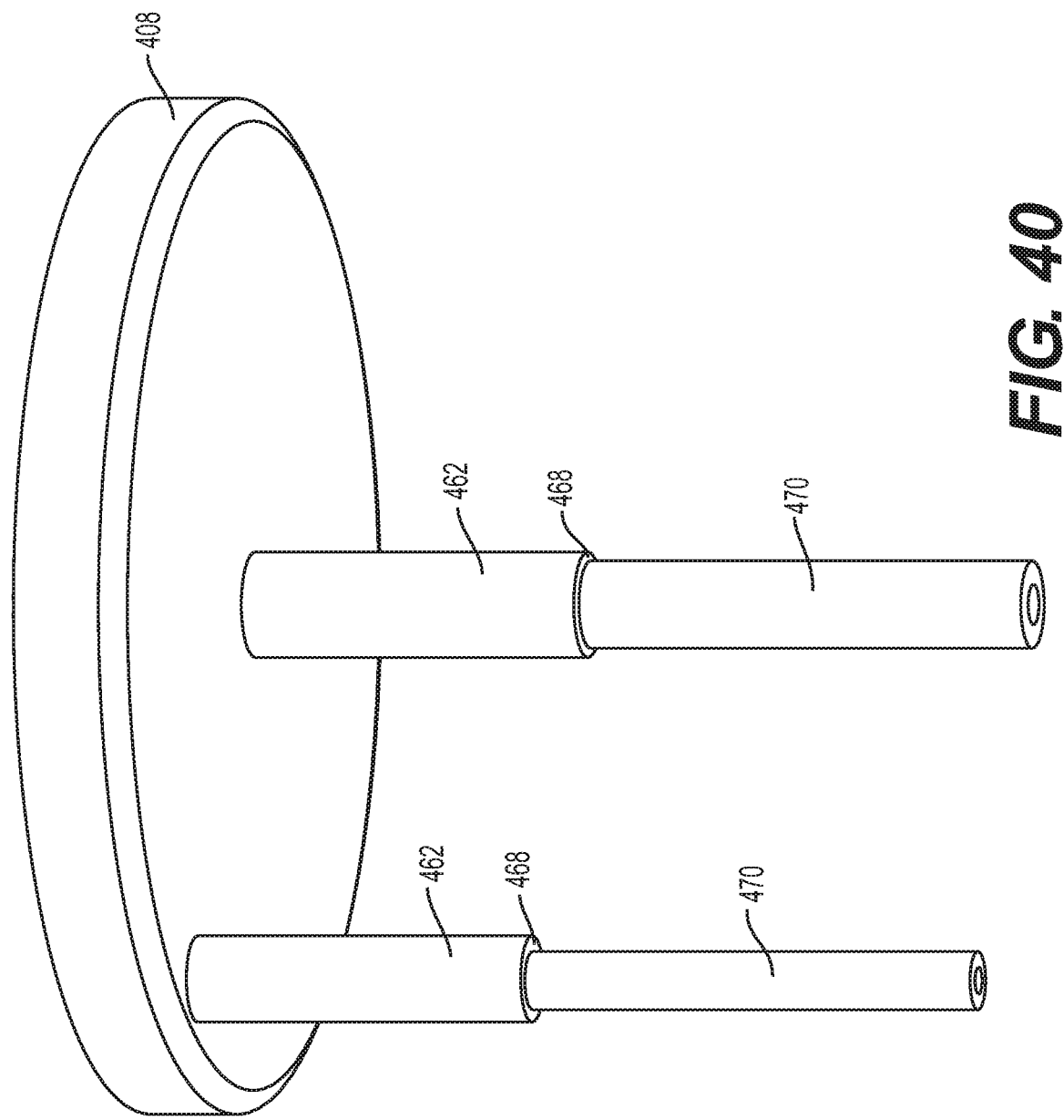

SEALED FURNACE

CROSS-REFERENCE TO RELATED APPLICATIONS

This application claims the benefit of priority of U.S. Provisional Application Nos. 62/804,181, filed Feb. 11, 2019, 62/830,303, filed Apr. 5, 2019, 62/911,665, filed Oct. 7, 2019, and 62/911,696, filed Oct. 7, 2019, the entireties of which are each incorporated by reference into this application.

DESCRIPTION

Technical Field

Various aspects of the present disclosure relate generally to furnaces, and particularly to furnaces configured for debinding and/or sintering operations.

Background

Metal injection molding (MIM) is a metalworking process useful in creating a variety of metal objects. A mixture of powdered metal and one or more binders (e.g., a polymer such as polypropylene or wax) may form a "feedstock" capable of being molded, when heated, into the shape of a desired object. The initial molded part, also referred to as a "green part," may then undergo a preliminary debinding process (e.g., chemical debinding or thermal debinding) to remove primary binder while leaving secondary binder intact, followed by a sintering process. During sintering, the part may be heated to vaporize and remove the secondary binder (thermal debinding) and brought to a temperature near the melting point of the powdered metal, which may cause the metal powder to densify into a solid mass, thereby producing the desired metal object.

Additive manufacturing, such as three-dimensional (3D) printing, includes a variety of techniques for manufacturing a three-dimensional object via a process of forming successive layers of the object. Three-dimensional printers may in some embodiments utilize a feedstock comparable to that used in MIM, thereby creating a green part without the need for a mold. The green part may then undergo debinding and sintering processes to produce the object.

In addition to MIM based additive manufacturing, there are systems using powder beds and loose powder, optical resin curing, and others. These methods, and others, may involve the use of a furnace to produce the final part or to enhance the properties of the part.

In order to reduce contamination and improve the quality of the part, a vacuum furnace may be used for thermal debinding and/or sintering. Thermal treatment with a vacuum furnace may be useful, for example, to reduce the occurrence of oxidation. While vacuum furnaces may assist in reducing oxidation, these furnaces may be prone to contamination that reduces the quality of the part.

In order to produce higher quality parts, it is beneficial to reduce the amount of contamination present within the furnace. One common source of contamination is from insulation included in the furnace. For example, insulation may retain contaminants, such as moisture, binder released from parts during debinding, and various compounds that offgas from the parts and the structures of the furnace itself during thermal processing. Generally, increased insulation is associated with increased contamination, as these contaminants are often retained by the insulation and released during subsequent thermal processing. Therefore, while thick insulation may reduce the amount of power necessary to maintain desired temperatures within the chamber of the furnace, thick insulation may increase the quantity of contaminants present within the chamber. Some furnaces, such as graphite insulated and molybdenum insulated furnaces, may employ minimal insulation with the aim of reducing contamination. However, the use of minimal insulation may greatly increase the power required (e.g., high power requirements of approximately 20 kW to 100 kW). Moreover, the use of minimal insulation may require the use of water cooling, which may involve the use of two nested and hermetically-sealed chambers (e.g., steel chambers) with a structure between the two chambers to facilitate the flow of water for heat exchange, adding complexity and cost. Moreover, even when the quantity of insulation is reduced in this or another manner, contamination due to water and/or condensed binder products, which may become re-volatized during sintering, may still adversely affect part quality.

In some aspects, the presence of contamination within a furnace may lead to contamination of parts or reduced quality in the parts. For example, moisture present within the furnace may increase oxidation of metal powder, or may change the carbon content of an alloy during sintering. Some types of insulation, such as ceramic insulation, may be particularly susceptible to contamination, including moisture contamination. However, contamination may occur in various types of insulation, as well as in other components of the furnace.

The apparatus and systems of the current disclosure may address one or more of the problems described above, or address other aspects of the prior art.

SUMMARY OF THE DISCLOSURE

Examples of the present disclosure relate to, among other things, systems and methods for sintering objects produced by additive manufacturing. Each of the examples disclosed herein may include one or more of the features described in connection with any of the other disclosed examples.

In one aspect, a furnace may include an outer wall defining a chamber, the chamber including an internal cavity configured to receive one or more parts, at least one heater positioned within the chamber, the at least one heater being configured to generate temperatures of at least about 800 degrees Celsius within the internal cavity, and a vacuum pump configured to apply a vacuum to at least a portion of the chamber. The furnace may also include at least one layer of inner insulation and at least one layer of outer insulation disposed outward of the inner insulation with respect to the chamber, the at least one layer of outer insulation being sealed with respect to the at least one layer of inner insulation.

In another aspect, a retort for a furnace may include a retort base, a retort body separably coupleable to the retort base, and a retort seal disposed between the retort base and the retort body when the retort is in a closed position with the retort base coupled to the retort body, the retort seal including an inner seal and an outer seal. The retort may also include a first conduit fluidly connected to the retort base and configured to supply an inert gas, a second conduit fluidly connected to the retort base and configured to apply a vacuum to an interior of the retort, and a third conduit fluidly connected to the retort seal and configured to supply an inert gas between the inner seal and the outer seal.

In one aspect, a vacuum sintering furnace system may include a sealable furnace having a first furnace part and a second furnace part, the first and second furnace parts forming a furnace shell and having respective first and second furnace walls covered inwardly by an insulation layer. An inward face of the insulation layer may form a hot face of a hot zone volume, the first and a second furnace parts having an open position allowing access to the hot zone volume and a closed position sealingly closing the furnace shell. The sealable furnace may include a sealable retort having a first retort part and a second retort part, the first and second retort parts forming a retort shell and having respectively first and second retort walls, an inward face of the retort walls defining a retort chamber volume, the first and second retort parts having an open position allowing loading of a workpiece into the retort chamber volume and a closed position sealingly closing the retort shell with a retort seal. The first and second retort parts may be coupled to one of the first and second furnace parts, such that in the open position of the furnace parts, the retort parts can be brought to their open position, and in the closed position, the retort parts in their closed position can be contained in the hot zone volume, with at least a majority of a perimeter of the retort seal being arranged in the hot zone volume and with an annulus space formed between an outer face of the retort walls and an inner face of the furnace walls. The furnace system may also include a vacuum pumping channel sealed to the first retort part with a retort tube seal with respect to an exterior of the retort and establishing gaseous communication between the retort chamber volume and a port outside of the furnace walls, the sealable retort and the retort tube seal being located in the hot zone being capable of withstanding the sintering temperature, wherein the sealingly closed retort seal cooperates with the retort walls to form a low pressure enclosure that impedes gas passage between the retort chamber volume and the annulus space.

In another aspect, a high-temperature vacuum sintering furnace may include an outer insulation heated by at least one outer furnace heater contained inside the outer insulation, the outer insulation and outer furnace heater being capable of repeated cycling at about 800 degrees C. or higher, wherein the outer insulation defines a hot zone fully surrounding a retort composed of at least one refractory material that can withstand at least 50 sintering cycles at temperatures greater than about 800 degrees C. The retort may include a hollow interior operable as a work zone for sintering parts. The furnace may include a first gas tube in fluid communication with the hollow interior, the first gas tube being attached and sealed to the retort wall by a retort tube seal, and configured to supply sintering process gas into the hollow interior, and wherein the tube extends through the outer insulation from the hot zone to an ambient environment outside of the furnace. The retort of the furnace may be configured to be opened for receiving at least one part through a main retort opening, and may be configured to be closed for sintering the at least one part, such that at least 50% of the sealed retort opening is within the hot zone. The main retort opening may be circumscribed by an inner seal, at least half of the inner seal being provided within the hot zone. The inner seal may be provided in series with an outer seal, at least 50% of the outer seal being provided in the hot zone, such that a gas flow channel is provided between the inner seal and the outer seal. The furnace may include a second tube sealed with a retort tube seal in direct fluid communication with the gas flow channel and configured to expel gaseous contaminants from the gas flow channel between the inner seal and the outer seal.

In another aspect, a third tube may be in fluid connection with the hollow interior and sealed with a tube seal. The third tube may be fluidly connected to a vacuum pump for producing negative pressure in the hollow interior.

In another aspect, the outer seal may be a Peclet seal configured to receive gas flow from the second tube for the expelling of contaminants by way of Peclet sealing. The inner seal may be a lap seal. The inner seal may be a high-temperature gasket. The inner seal may include graphoil.

In another aspect, the first tube may provide an inflow of process gas into the hollow interior and the inner seal may be a Peclet seal that receives the process gas as an outflow from the hollow interior, wherein the outflow may facilitate Peclet sealing between a gas flow channel of the Peclet seal and the hollow interior. The outer seal may be a lap seal or high temperature gasket, and the second tube may be configured for exhausting the process gas after the process gas has passed through the Peclet seal, such that the second tube seal is configured to expel gaseous contaminants that leak from the outside though the secondary seal. The outer seal may be a lap seal.

In another aspect, the outer seal may be a high-temperature gasket. The high-temperature gasket may include graphoil and the furnace may be provided within an air-tight containment surround the outer insulation. The air-tight containment may be filled with inert gas to reduce or prevent oxidation and/or combustion of the graphoil.

In another aspect, the gasket may include graphoil and the furnace may include a refractory outer ring that peripherally surrounds the outer gasket.

In another aspect, the inner seal may include a high-temperature gasket and the outer seal may include a high-temperature gasket. The second tube may be configured to exhaust gas from the gas flow channel, and may expel at least a portion of gaseous contaminants that leak through the outer seal. The inner seal and the outer seal may include graphoil gaskets, and the outer insulation may be surrounded by an air-tight housing containing an inert dry gas. The second tube may be pumped with a vacuum pump.

In another aspect, a fourth tube may be connected to the gas channel configured to inject sweep gas to cause purging between the inner and outer seals. The fourth tube may feed sweep gas, and the third tube may exhaust the sweep gas, with or without a pump from between the inner and outer seals. Alternatively, the third tube may be vacuum-pumped and the fourth tube may feed sweep gas.

In another aspect, the retort may include a non-porous material that is hermetic and impervious to diffusion of outside gases. For example, the retort may include one or more of: SiC, reaction bonded Si SiC, ceramic, nitride-bonded Si SiC with or without a glazed retort coating, or a high-temperature metal. High-temperature metals may include: 310S configured to exposed to air, nickel configured to be exposed to air, molybdenum, tungsten, or any suitable refractory metal including refractory metals that cannot survive exposure to oxygen at sintering temperatures.

In another aspect, the furnace may include a non-hermetic porous material that is coated to provide a hermitic retort. The hermetic retort may include nitride-bonded SiC with a glazed coating.

In another aspect, the outer insulation may be surrounded by a sealed housing. The sealed housing may be a high-strength housing configured to withstand vacuum pressure. The retort may be porous. The retort may be a coated porous retort. The sealed housing may be air-tight and configured to maintain a dry inert atmosphere around the retort at roughly atmospheric pressure. The retort may include a refractory metal that cannot withstand exposure to air at sintering temperature.

Both the foregoing general description and the following detailed description are exemplary and explanatory only and are not restrictive of the features, as claimed. As used herein, the terms "comprises," "comprising," "including," "having," or other variations thereof, are intended to cover a non-exclusive inclusion such that a process, method, article, or apparatus that comprises a list of elements does not include only those elements, but may include other elements not expressly listed or inherent to such a process, method, article, or apparatus. Additionally, the term "exemplary" is used herein in the sense of "example," rather than "ideal." It should be noted that all numeric values disclosed or claimed herein (including all disclosed values, limits, and ranges) may have a variation of +/−10% (unless a different variation is specified) from the disclosed numeric value. In this disclosure, unless stated otherwise, relative terms, such as, for example, "about," "substantially," and "approximately" are used to indicate a possible variation of ±10% in the stated value. Moreover, in the claims, values, limits, and/or ranges of various claimed elements and/or features means the stated value, limit, and/or range+/−10%. The terms "object," "part," and "component," as used herein, are intended to encompass any object fabricated using the additive manufacturing techniques described herein.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments. There are many aspects and embodiments described herein. Those of ordinary skill in the art will readily recognize that the features of a particular aspect or embodiment may be used in conjunction with the features of any or all of the other aspects or embodiments described in this disclosure.

FIG. 12 is a cross-sectional view of the furnace including a sealed retort.

FIG. 15 is a cross-sectional view of a coated retort.

FIG. 20 is a detail view of the retort of FIGS. 18 and 19 with a single gasket.

FIG. 21 is a detail view of the retort of FIGS. 18 and 19 with a pair of gaskets and a pumping tube.

FIGS. 22A, 22B, and 22C are views of a retort having a sweep gas groove.

FIG. 27 is an exploded view of the vacuum retort of FIG. 26.

FIG. 28 is an assembled view of the vacuum retort of FIG. 26.

FIG. 29 is a detail view of the vacuum retort of FIG. 26.

FIG. 40 is a perspective view of an exemplary tube extension.

DETAILED DESCRIPTION

Figure 1:
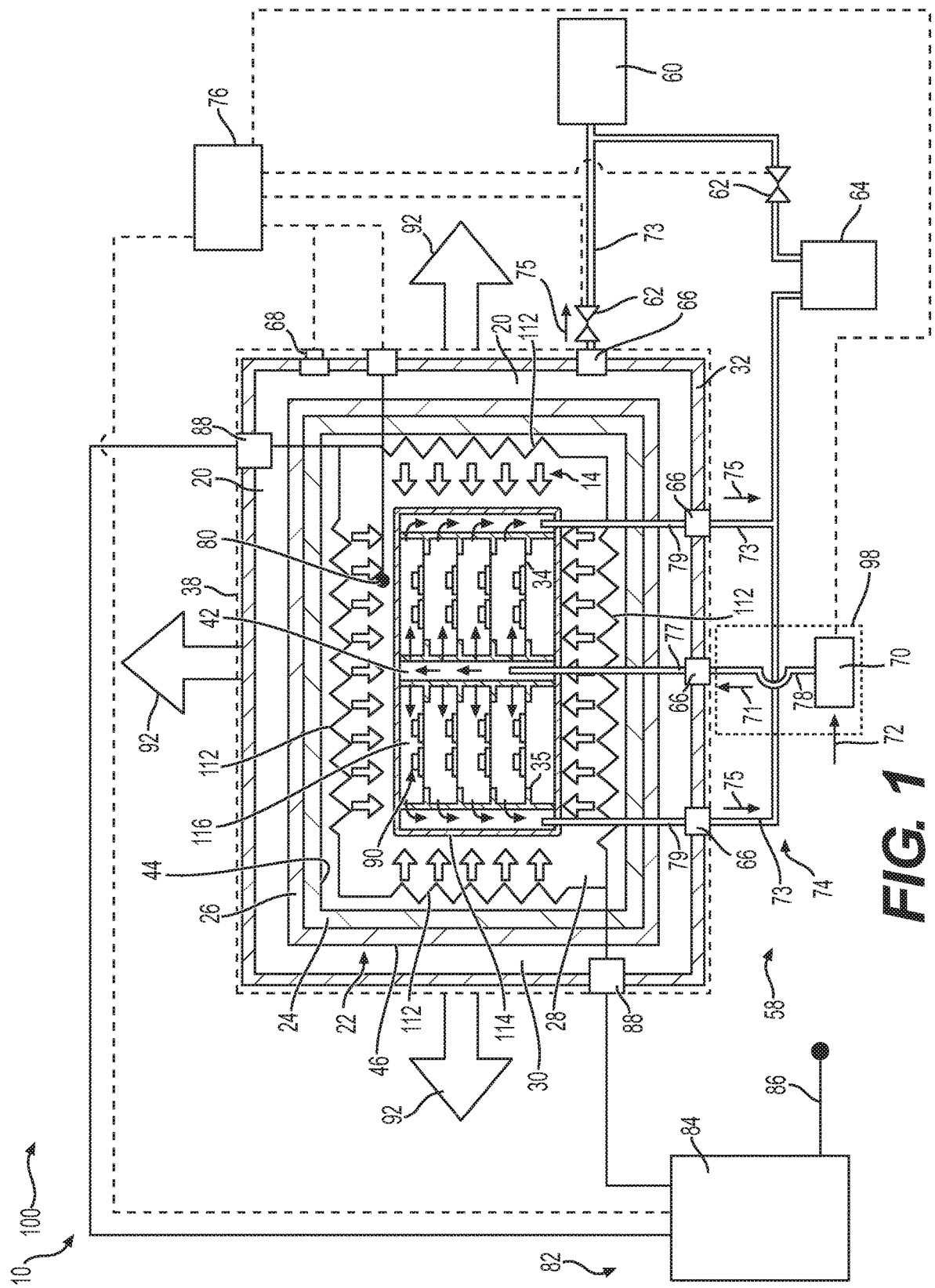
FIG. 1 is a cross-sectional view an exemplary furnace.

Embodiments of the present disclosure include systems and methods to facilitate and improve the efficacy and/or efficiency of sintering printed objects. Reference now will be made in detail to examples of the present disclosure described above and illustrated in the accompanying drawings. Wherever possible, the same reference numbers will be used throughout the drawings to refer to the same or like parts. While exemplary embodiments of a furnace system or furnace may be discussed with different reference numbers, it is understood that the features of any the furnaces described herein may be combined or replaced as desired.

I. Contamination, Energy Use, and Environmental Impacts of Thermal Processing

As described above, furnaces for additive manufacturing may experience contamination due to the introduction of moisture and/or binder into a chamber containing one or more parts. This contamination may result from substances that are absorbed and released from one or more layers of insulation. However, contamination may result from other mechanisms, including release of contaminants from other structures of the furnace system or from within the furnace, leaky seals at inlets, outlets, and/or a door of the furnace, etc. Thus, it may be possible to improve the functioning of a furnace system by addressing one or more of these sources of contamination, such as with the exemplary solutions disclosed herein, which may be individually incorporated in to a furnace system or may be used in combination with one another.

Furnaces, and in particular sintering furnaces, often have large power requirements. For example, a relatively small sintering furnace with a work zone of about 1 cubic foot may require approximately 20 kW to 40 kW of power. Larger furnaces (e.g., furnaces with work zones of about 4 cubic feet to about 8 cubic feet) may require even more power, on the order of one-hundred to several-hundred kW of power. Sintering may require the application of this power for a prolonged period of time (e.g., multiple hours). The application of high levels of power for such extended periods of time represents significant costs and energy usage. For example, sintering cycles in relatively larger furnaces may be associated with energy costs in the hundreds of dollars, or more, per cycle. Additionally, commercial furnaces may operate frequently (e.g., on a nearly-continuous basis), in order to maximize productivity. Each of these furnaces may operate for about 1,000 hours per year, corresponding to several megawatt hours of power on an annual basis.

Smaller furnaces (e.g., smaller tube furnaces typically used in laboratory research) may tend to require less energy by including additional insulation. However, these furnaces may not be suited for use in manufacturing. Furthermore, these furnaces may not be usable under a vacuum, which applies a controlled, negative-pressure environment to the interior of the furnace, reducing the amount of contamination in the atmosphere, and the amount of undesired products, such as binder, that is emitted into the atmosphere.

For at least the above-described reasons, commercial and laboratory furnaces may be inefficient and may increase pollution, both directly (from emissions) and indirectly (due to large power requirements).

The solutions described below may provide one or more environmental benefits, including reduced pollution, costs, and energy usage. For example, one or more of the furnaces described herein may have power requirements (e.g., about 2 kW to about 4 kW) that are approximately 90% less as compared to the requirements of some commercial furnaces. One-thousand large, metal-sintering furnaces may be expected to consume one billion watt hours per year, or over twenty billion watt hours over the course of twenty years. As a comparison, a typical large city may be expected to consume 10 million watt hours per year. Accordingly, assuming there are 1,000 or more large metal-sintering furnaces currently in operation, energy and associated reductions in pollution may be expected to be equivalent to a number of large cities. Moreover, if comparable energy-saving techniques were employed in the ceramic-sintering and firing industries (which are larger than the metal-sintering industry), these energy savings may be doubled, tripled, or even greater.

II. Solution 1: Sealed Retort Vacuum Furnace

II-1. Furnace Systems

FIG. 1 is a cross-sectional partially-schematic view of a furnace system 10 including a furnace 100 according to an embodiment of the present disclosure. In the exemplary configuration illustrated in FIG. 1, furnace system 10 may include, in addition to furnace 100, a power system 82, an environment control system 58, for example, for controlling the sintering environment especially in the work zone where parts are processed, and a system controller or furnace controller 76. Furnace system 10 may include furnace 400 and/or 800 (or features of one or more of these furnaces), which are described below. Furnace 100 may be employed in a variety of heat treatment processes such as debinding and/or sintering. Furnace 100 may be a vacuum furnace configured to create a controlled atmosphere with environment control system 58, and may include an air-tight sealed chamber 20. Such a sealed chamber 20 may prevent or inhibit the entry of ambient air and/or prevent or inhibit contamination, for example, by leakage from the outside air, with process gas (e.g., an inert gas pumped into the chamber 20). In some aspects, chamber 20 may be sealed in a manner that forms approximately complete blockage or hermetic sealing with respect to an atmosphere external of furnace 100. However, chamber 20 may be sealed to a lesser degree, for example sealing that may inhibit or limit leakage of gas. In at least some embodiments, for operation at vacuum, the airtight outer chamber may be sealed as well as sturdy enough to withstand 15 psi. In other cases where the outer airtight chamber will only need to support atmospheric pressure on both sides, the outer chamber does not need to be very sturdy.

Furnace 100 may include a chamber wall 32 that defines chamber 20 within which insulation 22 and heaters 112 may be located. Heat generated by heaters 112 may debind and/or sinter parts 90 placed within chamber 20. In one aspect, the central cavity or chamber 20 within furnace 100 may define a parts cavity 116 inside a retort 114. One or more parts 90 may be supported (e.g., via one or more parts holders or shelves 34 and support brackets 35 for supporting each shelf 34, although any suitable shelving configuration is contemplated) within retort 114. Retort 114 may be located within a hot zone 28 defined by one or more layers of insulation 22, including inner or exposed insulation 24. An inward-facing surface of an inner-most layer of insulation 24 may form a hot face 44 that surrounds hot zone 28. Hot zone 28 may represent an area surrounded by hot face 44 of exposed insulation 24.

In an exemplary configuration, one or more heaters 112 (e.g., a plurality of separate heaters with helical heater elements, separate or continuous serpentine heater elements, or any other suitable heater or group of heaters) may include electrically-resistive heater elements that extend between retort 114 and inner insulation 24 in hot zone 28. These heaters may generate heat 14 within hot zone 28 to provide uniform heat to parts 90. One or more layers of isolated or outer insulation 26 may surround the one or more layers of inner insulation 24. An outer periphery or cold face 46 of an outermost layer of outer insulation 26 may define a cold zone 30. An outer cooling jacket 38 may be provided, if desired, to prevent excess heat accumulation within cold zone 30. The inclusion of cooling jacket 38 may decrease the amount of dissipated heat 92 that escapes into the ambient air surrounding furnace 100.

In order to generate heat in a controlled manner, furnace power system 82 may supply electrical energy that is converted into heat by heaters 112. Each heater 112 may be connected to a suitable power supply 84 which may receive power from main power source 86. In some aspects, main power source 86 may correspond to a commercial or residential standard power source (e.g., a 240V power source). Electrical connections between power supply 84 and one or more heaters 112 may be provided via one or more power feedthroughs 88 that extend through chamber wall 32. Power supply 84 may provide AC or DC power to heaters 112 based on commands from furnace controller 76.

Environment control system 58 may include systems for applying a vacuum to furnace 100, as well as systems for injecting an inert gas into furnace 100. For example, an inlet gas manifold 98 may include one or more process gas feedlines 78 and a mass flow controller 70. An outlet exhaust and/or vacuum pumping manifold 74 may include one or more effluent gas or vacuum lines 73 outside of furnace 100. Gas feedthroughs 66 may connect each external line 73, 78 with an interior of furnace 100. As shown in FIG. 1, inlet gas manifold 98 may receive process gas from a gas supply line 72 and introduce this process gas to an interior of furnace 100. For example, inlet gas manifold 98 may be configured to pump process gas 71 to furnace 100 by mass flow controller 70, which may include one or more suitable variable valves, variable gas constrictions, and/or supply pumps. Process gas 71 may be an inert processing or process gas such as a reducing gas mixture containing a predetermined amount of reactive hydrogen, a gas containing hydrogen as the dominant processing gas, or any suitable gas or mixture, such as a substantially oxygen-free gas. For example, a process gas may contain a relatively small amount of hydrogen, e.g., about 1% to about 10% hydrogen, resulting in a relatively mild reducing process gas. In some aspects, process gas may include about 10% to about 100% hydrogen, resulting in a relatively aggressive reducing process gas. Process gas 71 may enter a process gas inlet conduit (also referred to herein as a "line") or tube 77 connected to process gas line 78 via one of the feedthroughs 66. An inlet gas distributor 42 within retort 114 may distribute the process gas 71 to an interior of retort 114. Additionally, process gas 71 may be pumped to chamber 20 within vacuum chamber wall 32, if desired, by a process gas line 78.

Environment control system 58 may facilitate application of a vacuum to furnace 100. This vacuum may facilitate removal an effluent 75, which may contain a mixture of process gas, vaporized binder, and other offgas from parts 90 and/or components of furnace 100. Outlet exhaust and/or vacuum pumping manifold 74 may include, for example, one or more vacuum pumps 60 connected via gas feedthroughs 66 through outlet exhaust and/or vacuum manifold 74 to cold zone 30 and hot zone 28 via vacuum valves 62. Therefore, vacuum may be applied to an interior of retort 114 and/or chamber 20 defined by vacuum chamber wall 32. When vacuum is applied to chamber 20, vacuum chamber wall may be formed as an air-tight sealed housing that is configured to withstand vacuum pressure. In the exemplary configuration illustrated in FIG. 1, vacuum lines (or tubes) 73 of vacuum manifold 74 may extend through gas feedthroughs 66 to receive effluent 75 from effluent lines (or tubes) 79, which are in fluid communication with retort 114. A binder trap 64 may be in fluid communication with one or more vacuum lines 73 to receive and/or treat effluent 75 pumped via vacuum pump 60. If desired, one or more vacuum lines of vacuum manifold 74 may be configured to apply vacuum to one or more portions of chamber 20 outside of retort 114. For example, one or more vacuum lines 73 may be in communication with insulation 22, to remove contamination that may offgas from one or more layers of insulation, as described below.

Pressures as low as $10^{-6}$ Torr may represent uncommonly low pressure for sintering processing, which may be relatively unusual for sintering, with the exception of special cases. Industrial debinding and sintering may be performed over relatively wide ranges of pressure, with the debinding and/or sintering pressure employed depending on a number of considerations. This may also be true when only sintering is performed (e.g., without performing thermal debinding). In at least some cases, it may be desirable to operate a vacuum pump to generate the lowest (or strongest) vacuum pressure that a pump may be configured to achieve during debinding and/or sintering. However, in other cases, it may be desirable to operate the vacuum pump to produce a relatively modest vacuum pressure. For example, debinding and/or sintering may be performed at vacuum pressures of about 0.01 Torr to about 1 Torr, of about 1 Torr to about 10 Torr, or of about 10 Torr to about 100 Torr. In some cases, vacuum pressures of about 100 Torr to about 759 Torr may be considered a slight vacuum. If desired, furnace 100 may be employed for sintering at about atmospheric pressure or slightly positive pressure. In at least some embodiments, the purity level achieved by furnace 100 (and each furnace described herein), may be comparable to the purity level achieved at relatively strong vacuum pressures, including ultra-high vacuums and/or vacuums capable of pressures, for example, as low as $10^{-6}$ Torr. For example, the furnaces disclosed herein may be configured to operate at equivalent purities as purities achieved at vacuums as low as $10^{-10}$ Torr. Moreover, furnace 100 may be configured to achieve this amount of purity while having lower cost and/or lower power requirements compared to conventional sintering furnaces.

One or more temperature sensors 80 may be provided within hot zone 28 to monitor and provide feedback information indicative of a current temperature within hot zone 28. Additional temperature sensors 80 may be positioned in other locations of hot zone 28, such as on hot face 44, for example. Additional temperature sensors 80 may be positioned on outer insulation 26, on or in vacuum chamber wall 32, or any other desired location. One or more vacuum pressure sensors 68 may be provided to measure a strength of the vacuum applied at one or more locations of furnace 100. For example, a pressure sensor 68 may be applied to measure a pressure of chamber 20, as shown in FIG. 1. In embodiments where retort 114 is a vacuum retort (described in detail below), one or more pressure sensors 68 may be provided at locations indicative of the strength of the vacuum applied to the retort 114. Furnace controller 76 may be any suitable control system including one or more processors, memory devices, input output devices, etc., to receive feedback information e.g., from temperature sensor(s) 80 and pressure sensors 68. Controller 76 may be a system-level controller configured to monitor furnace conditions and to generate commands to control the operation of environment control system 58, including vacuum pump(s) 60, valves 62, and mass flow controller 70, as well as heaters 112 via power supply 84.

Furnace system 10 may be configured to generate an atmosphere-controlled furnace environment via environment control system 58. While a vacuum furnace may include an atmosphere control system, such as system 58, not all atmosphere-controlled furnaces may be vacuum furnaces. A vacuum furnace may form an atmosphere-controlled furnace, when appropriately sealed to provide and withstand vacuum pressure. In at least some embodiments, vacuum furnaces, such as furnace 100 (and the other exemplary furnaces described herein), may be configured to operate at a range of pressures, such as, but not limited to: about $10^{-6}$ Torr (e.g., deep vacuum) to about one atmosphere (760 Torr); about 10 milliTorr to about 500 Torr; about 1 Torr to about 600 Torr; about 1 milliTorr to about 700 Torr; or positive pressure of about 0.001 PSI to about 4 PSI (e.g., modest positive pressure); to name a few.

Furnace 100, which may be formed as a vacuum sintering furnace, may utilize a controlled flow of processing or process gas 71 while simultaneously pumping with vacuum pump(s) 60 in a manner balanced by controller 76. The introduction of process gas 71 and application of vacuum (which removes effluent 75) from chamber 20 and/or parts cavity 116 may control the atmosphere to which parts 90 are exposed. Vacuum pressure may be measured with vacuum pressure sensor 68 in order to facilitate control over the vacuum by controller 76. For example, controller 76 may be configured to balance an inlet flow rate (e.g., of process gas 71) in opposition to outlet gas flow (e.g., of effluent 75). A manual pressure gauge may be provided instead of, or in addition to, sensor 68 to facilitate manual monitoring and/or control over flow balancing. The flow of outlet gas or effluent 75 may be controlled manually or with controller 76, by adjusting the position of one or more electronically-controlled or adjustable valves 62 and/or by changing the pumping rate of pump(s) 60. In a similar manner, flow of process gas 71 may be controllably varied by mass flow controller 70, which may be controlled by controller 76. While mass flow controller 70 and furnace system controller 76 are illustrated as separate devices, as understood, mass flow controller 70 and system controller 76 may be combined in a single system controller. One or both of controllers 70 and 76 may be implemented by any suitable combination of programmable logic controllers (PLCs), computers, etc. Controllers may include open-loop feedback devices, closed-loop feedback devices, and/or state machines. If desired, suitable controllers may include custom microchip-controlled embedded controllers. In some embodiments, furnace controller 76, mass flow controller 70, or both, may be connected to one or more computers through serial or parallel buses, Ethernet, WIFI, Bluetooth, intranet, cellular, LAN, WAN, internet or any other suitable wired connection, wireless connection, or combination thereof. During thermal processing, parts 90 may outgas, especially during debinding processes, as can the housing of furnace system 10 itself, including insulation 22 and retort 114. In some aspects, these outgassing rates may affect the pressure and the control over pressure achieved by controllers 70 and/or 76. The above-described balancing may be influenced by, and/or may be performed in response to, outgassing from parts 90 and/or components of system 10.

In order to reach and maintain temperatures suitable for thermal treatments, such as debinding or sintering, an arrangement of high-temperature (high-temperature resistant) thermal insulation 22 may be located in an interior of furnace 100 with respect to wall 32. Insulation 22 may allow furnace 100 to operate at power requirements that are within desired or practical limits. In one aspect, insulation 22 may be sufficient to allow heaters 112 to reach sintering temperatures when furnace system 10 is connected to a standard power source (main power source 86). Insulation 22 may further avoid excessive heating of components located outside of insulation 22, such as system components and/or components within the room in which furnace 100 is present. Insulation 22 may also limit temperatures that furnace parts themselves, such as wall 32, feedthroughs 66, 88, etc., are exposed to.

In exemplary embodiments, any of the furnaces disclosed herein may be lower power furnaces capable of performing sintering at low power (about 500 to 5,000 Watts per meter squared of internal surface area of the hot zone) and/or require minimal to no water cooling. For example, any of the disclosed furnaces may perform sintering at low power, such as, about 500 to 5,000 Watts per meter squared of internal surface area of the hot zone. Generally, the combination of low power and no water cooling results in furnace designs that may require substantially thick insulation. For example, fibrous insulation (e.g., ceramic, graphite, etc.) may be about 3 inches to about 6 inches thick, about 6 inches thick to about 9 inches thick, or greater than about 3 inches thick. However, Applicants recognized that the approach of using substantially thick insulation, in combination with low power and no water, may generate the deleterious result of more contamination in the sintering furnace.

In some aspects, insulation 22 may include high-performance insulation. Insulation 22 may completely surround heaters 112 and may have a low number of cracks, holes, and other paths through which parasitic heat leakage may occur for a given amount of heating power. In some aspects, the maximum achievable temperature (e.g., a temperature within hot zone 28) for a set of heaters 112 may be associated with a combination of factors including one or more of: (i) a surface area of hot face 44 (increased surface area requires more power), (ii) a type and quality of insulation 22, (iii) a thickness of insulation 22, (iv) the overall condition of insulation 22 with respect to aging, wear, and damage, and (v) the quantity of vacuum pressure applied by pump(s) 60, for example. Regarding the surface area of hot face 44, larger furnaces (having larger hot zones) may require more power for a given insulation type and thickness. Power requirements may be generally proportional to this surface area.

In an exemplary type of insulation 22, heat shielding insulation 22 may include multiple thin layers of refractory metal, such as molybdenum and/or tungsten. This insulation may be particularly useful with refractory heaters 112 that include refractory metal material inside sealed vacuum chamber 22. Each layer of material of insulation 22 may act as a radiation shield with a plurality of layers acting together in a layered or stacked arrangement to maintain hot zone 28 at high temperatures (such as sintering temperatures), while maintaining an exterior (e.g., wall 32) at significantly lower temperatures, and in some embodiments, nearly at room temperature. System 10 may optionally include a cooling jacket 38, such as a water cooling path that surrounds a portion or entirety of an exterior of chamber 20.

One or more layers of insulation 22 may include metal materials, such as refractory metal materials. Suitable refractory metal materials may include or may be based on molybdenum and/or tungsten. Refractory metal insulation material may be advantageous for use in layered insulation for establishing and maintaining a high purity atmosphere within furnace 100. For example, molybdenum and tungsten have sufficient resistance to degradation from heat, vacuum, and exposure to process gas. These materials may also experience limited water and/or binder uptake or absorption. However, molybdenum and tungsten may provide a lower resistance to heat transmission in comparison to other insulation materials, and may tend to increase power requirements and cost.

Instead of, or in addition to refractory metal, insulation 22 may include high-temperature fiber insulation that operates, in principle, in a manner similar to fiberglass fiber insulation used in traditional home construction. High-temperature fiber insulation suitable for insulation 22 may include lightweight graphite fiber material. As used herein, the phrase "graphite insulation" may include graphite fiber insulation. Graphite insulation included for use in insulation 22 may be produced in rigid form as rigid fiber board with a volumetric fill factor (e.g., the ratio of fiber volume divided by the total spatial volume occupied by the rigid board) of less than 100%, about 10% to about 60%, about 5% to about 50%, to name a few, such that the board has low density, and is thus lighter in weight, as compared to solid graphite. Individual graphite fibers may tend to be most thermally conductive in the direction of the fibers. Thus, highly-oriented sheets or boards of graphite fiber insulation may exhibit anisotropic performance. Insulation 22 may include graphite fiber insulation fabricated in flat or curved planar layers with fibers generally extending parallel to the layer and perpendicular to the direction of heat flow (e.g., perpendicular to heat 14 on a given side of insulation 22). In square or rectangular furnaces, insulation 22 may include flat boards with fibers oriented along lateral extents of the boards such that highest resistance to heat conduction occurs in a direction perpendicular to the board. Insulation 22 may also include graphite fiber formed as a semi-rigid or non-rigid graphite felt with fibers oriented along the lateral extents of the felt. Cylindrical furnaces (e.g., FIGS. 6A, 6B) with cylindrical hot zones may be constructed by wrapping layers of such felt to form a layered cylinder of insulation 22. When insulation 22 includes graphite fiber, suitable heaters 112 may include electrically-resistive graphite heaters 112.

In at least some aspects, insulation 22 may include a relatively lightweight ceramic fiber insulation material. Similar to graphite insulation 22, ceramic fiber insulation 22 may be in the form of one or more rigid fiber boards with a volumetric fill factor of less than 100%, about 10% to about 60%, or about 5% to about 50%, to name a few, such that the board has lower density and lighter weight as compared to solid ceramic. While improved thermal performance may be achieved by arranging ceramic fibers generally perpendicular to the direction of heat flow, ceramic insulation may be relatively thermally isotropic regardless of the arrangement of the fibers. Thus, ceramic fibers may generally be arranged parallel to the direction of heat flow if desired. In rectangular furnaces, ceramic insulation 22 may include flat boards including ceramic fibers oriented at least partially in parallel with the lateral (long) direction of the board. Similar to graphite fiber insulation 22, ceramic fiber insulation 22 may include non-rigid ceramic felt. Cylindrical furnaces 100 with cylindrical hot zones 28 may be constructed by wrapping layers of ceramic felt to form a layered cylinder of insulation 22. As used herein "ceramic insulation" may include ceramic fiber insulation. Exemplary ceramic insulation 22 materials may include alumina and mullite mixtures, or other ceramic materials, in any suitable grade or density. Any suitable heater 112 may be used in conjunction with ceramic insulation, such as SiC heaters, molybdenum disilicate heaters, or refractory metal heaters.

Each of the above-described materials for inclusion in insulation 22 (refractory metal insulation, graphite insulation, and ceramic insulation) may be selected based at least in part on the desired design and application of furnace 100. For example, graphite insulation 22 may remain mechanically robust at temperatures up to or greater than 2,000 degrees C. for hundreds or thousands of cycles, while ceramic fiber insulation 22 may be useful at somewhat lower temperatures, such as 1,600 degrees C. Commercially-available graphite insulation products include rigid, semi-rigid and flexible felt configurations, which may be suitable for inclusion in insulation 22. The maximum operating temperature of ceramic insulation 22 may be influenced by the purity of the ceramic material and density. In order to maximize the temperature resistance of ceramic insulation 22, it may be desirable to employ high purity alumina and/or high-density boards. Various forms of ceramic insulation 22 may provide a higher degree of thermal insulation as compared to graphite, even for forms of ceramic that have a lower maximum operating temperature.

As previously mentioned, Applicant observed that using more insulation to reduce power and/or eliminate the need for water cooling may exacerbate problems of water and binder and other absorption and re-emission of contaminants (e.g., water, binder, etc.), which in some instances may retard or make it substantially more difficult to sinter some metals such as tool steel, titanium, and other "high grade" alloys.

Figure 2:
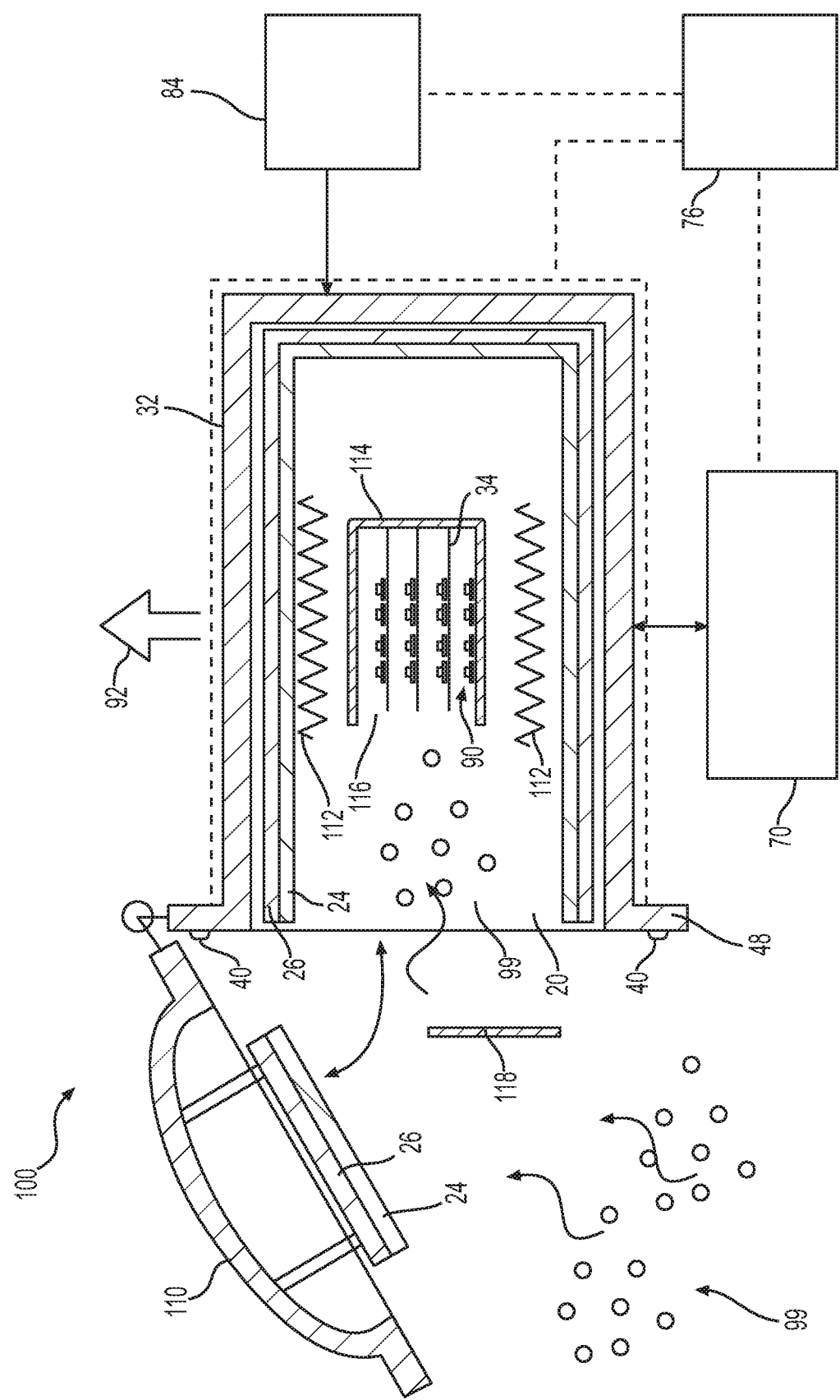
FIG. 2 is a cross-sectional view of the furnace of FIG. 1.

FIG. 2 is a schematic view illustrating an exemplary configuration for loading furnace 100. In the exemplary configuration illustrated in FIG. 2, the body of furnace 100 may form a primary furnace part or body defined by vacuum chamber wall 32 and including chamber 20. A furnace door 110 may be positionable between an open or loading position and a closed or sealed position. Furnace door 110 may form a secondary furnace part or body including one or more layers of insulation 22 such as inner (exposed) insulation 24 and outer (isolated) insulation 26. Furnace door 110 may be positionable via a hinge (as shown in FIG. 2), a lifting device to raise and lower door 110, or any other suitable mechanism. One or more vacuum seals 40 may be oriented around a perimeter of furnace door 110 to establish a seal between furnace door 110 and vacuum chamber wall 32. Vacuum seal 40 may also serve as a relatively high-integrity seal at non-vacuum pressures, including positive pressures.

Retort 114 may include a primary body or part (e.g., including one or more fixed or removable stacked shelves 34) and a secondary part formed by a removable retort door 118 (shown removed from retort 114 in FIG. 2). While retort door 118 is illustrated as being removable from a front or side surface of retort 114, as understood, retort door 118 may instead be formed by a lid, such as a top or bottom surface of retort 114.

With furnace door 110 and retort door 118 both in an open position, parts 90 may be loaded within retort 114. If desired, retort 114 may be loaded with parts 90 while removed from furnace 100 and positioned outside of furnace 100. Retort 114 may then be inserted into furnace 100. While furnace door 110 is open, contaminants, such as moisture 99 (e.g., due to humidity), may enter chamber 20. Some moisture 99 may be absorbed and/or adsorbed (hereinafter collectively referred to as absorption) by insulation 22. In some aspects, moisture may tend to increase contamination of various components of furnace 100, in addition to insulation 22. For example, moisture 99 may tend to contaminate refractory metal materials, graphite, ceramic, or other materials. Moisture 99 may tend to absorb at relatively higher rates on graphite and ceramic fiber materials, as compared to metallic materials. Absorption of moisture 99 may continue when door 110 is closed due to the presence of moisture 99 within air introduced when door 110 was open. As mentioned elsewhere, insulation may tend to absorb binder, the re-emission of which may cause the sintering atmosphere to vary in unpredictable and complex ways and/or lead to very poor parts quality.

II-2. Vapor and Gas Sealing

Figure 3:
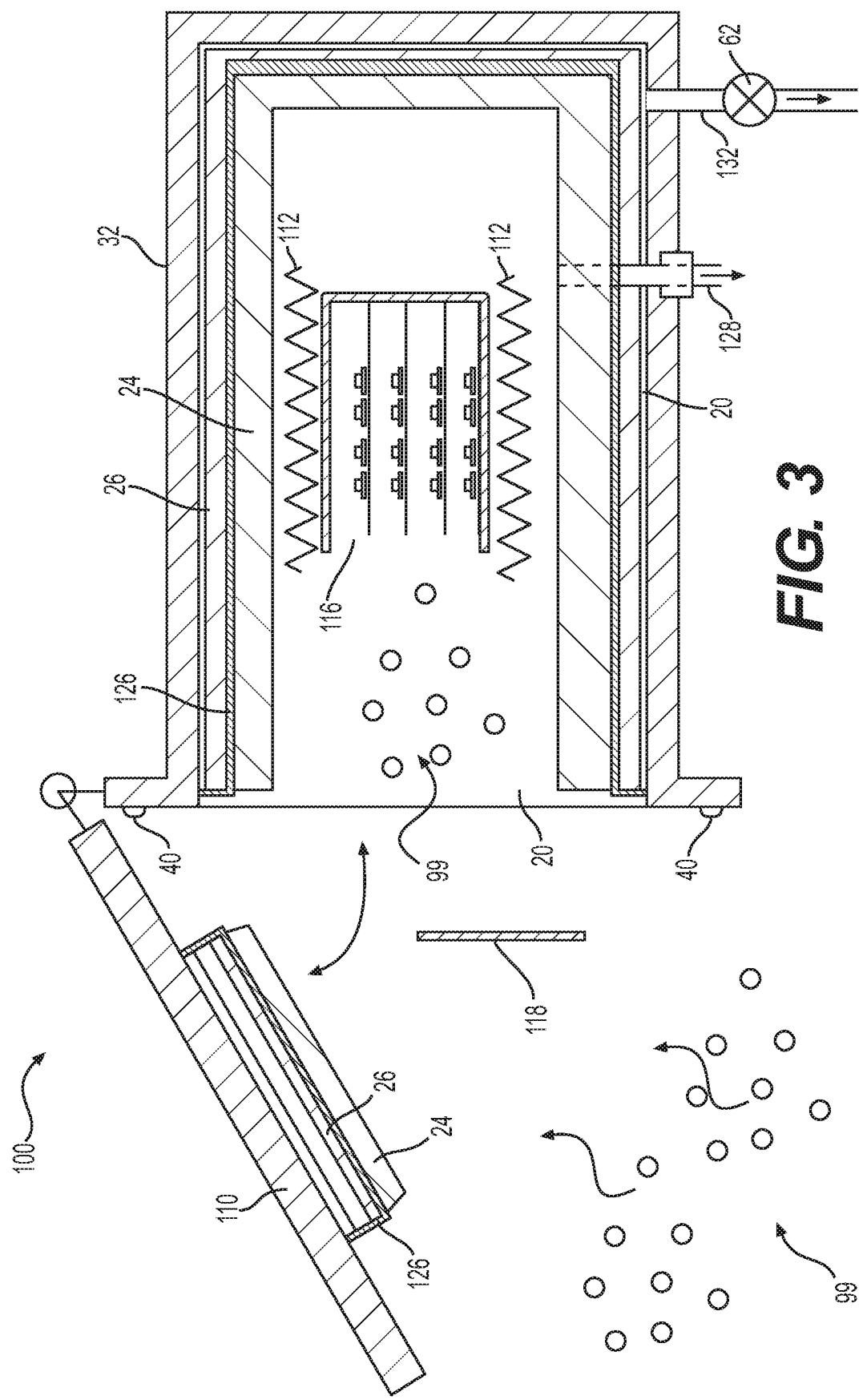
FIG. 3 is a cross sectional view of the furnace of FIG. 1 with a barrier.

FIG. 3 illustrates an exemplary configuration for limiting the effects of vapor 99 within furnace 100. Inner or exposed insulation 24 may be exposed to one or more of process gas 71 (FIG. 1), outgas from parts 90 (which may include debinder), and/or other gases. This exposure may occur when furnace 100 is in operation (performing thermal processing), when door 110 is opened, during storing, loading or unloading, etc.

Outer insulation 26 may be isolated from exposed insulation 24 and/or from chamber 20 by the presence of a barrier 126, which may form a vapor and moisture barrier. While barrier 126 is illustrated as isolating insulation 26 from chamber 20, barrier 126 may completely enclose insulation 26 so as to isolate insulation 26 from parts cavity 116. A vapor or moisture barrier includes any barrier (including relatively thin barriers) or membrane that impedes vapor ingress as compared to a configuration where a barrier is not present. Barrier 126 may be somewhat permeable (non-hermetic), such as graphoil materials or similar refractory (high-temperature) gasket materials, for example. Barrier 126 may be impermeable, for example, when formed of thin sheet metal. Barrier 126 may isolate insulation 26 from process gas 71, outgas from parts 90, which may include volatized binder, and/or other gases or moisture that may be introduced to an interior of furnace 100 when the door 110 is opened. Barrier 126 may provide a hermetic seal between isolated insulation 26 and an exterior of barrier 126 (e.g., chamber 20 of furnace 100). If desired, barrier 126 may be somewhat permeable, but may significantly reduce the permeability of isolated insulation 26 with respect to water and/or binder or other gases within chamber 20. This reduced permeability may be sufficient to ensure that a majority of moisture or water vapor that outgasses from isolated insulation 26 does not ingress inwardly through barrier 126 toward parts cavity 116. In one aspect, the outer isolated insulation 26 sealed by barrier 126 may partially or entirety surround exposed or inner insulation 24. Barrier 126 may similarly seal isolated insulation 26 with respect to exposed insulation 24, either hermetically or non-hermetically. Barrier 126 may also be provided between exposed insulation 24 and isolated insulation 26 secured to door 110.

Environment control system 58 may include a vacuum pumping port 128 (an exemplary vacuum line 73) configured to apply a vacuum to chamber 20 via valve 62 and pump 60 (FIG. 1). This port 128 may include tubing that extends to an interior of chamber 20 with respect to insulation 22, and thus may be configured to apply a vacuum to hot zone 28. A separate isolated pumping port 132 (another exemplary vacuum line 73) of environment control system 58 may include tubing that extends within vacuum chamber wall 32 (e.g., through a feedthrough 66, not shown in FIG. 3) in order to maintain or control vacuum pressure within the space of chamber 20 containing isolated insulation 26. In one aspect, the vacuum applied to the space containing the isolated insulation 26 may be approximately the same as the amount of vacuum applied to chamber 20 via port 128. However, as insulation 26 may be at least partially isolated from gaseous communication with insulation 24 and an interior of chamber 20 containing retort 114, one or more pumps 60 may apply a different amount of vacuum to isolated insulation 26. During times when vacuum is not applied to isolated insulation 26, vacuum valve 62 may be closed.

Figure 4A:
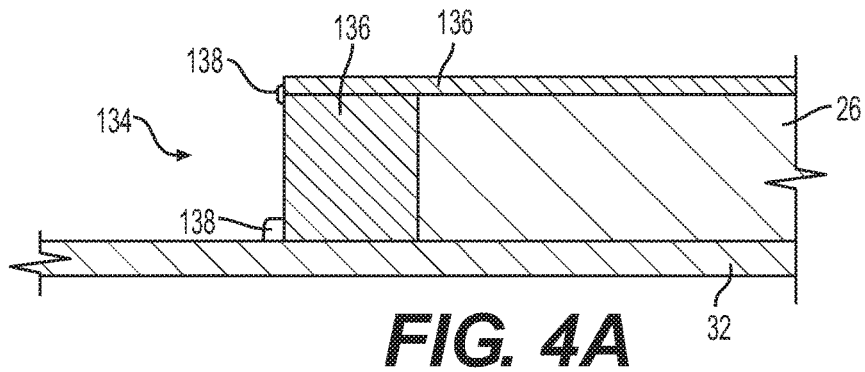
FIGS. 4A, 4B, and 4C are cross-sectional views illustrating exemplary barrier seals for the barrier of FIG. 3.
Figure 4B:
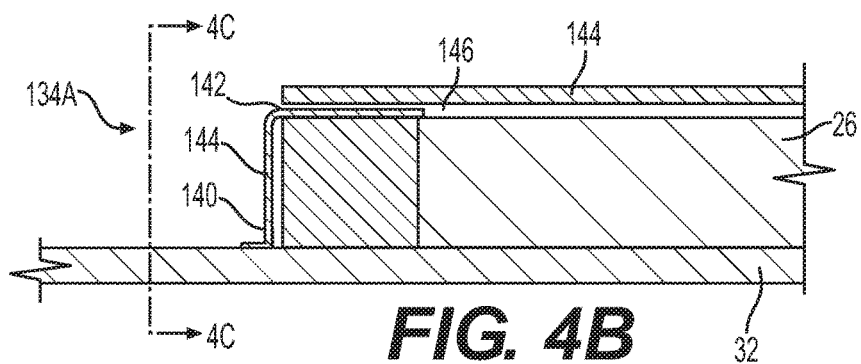

FIGS. 4A and 4B illustrate exemplary seals 134, 134A, 135, 135A that may be used with barrier 126 to seal and isolate insulation 26. In one aspect, barrier seals 134, 134A may be placed around the perimeter of barrier 126 to provide increased impedance to vapor and gas ingress. In an exemplary configuration illustrated in FIG. 4A, an impermeable barrier 136 (an exemplary barrier 126) may include barrier seals 134 that include high-grade hermetic seals 138 that prevent gas or fluid from communicating with a space between impermeable barrier 136 and isolated insulation 26. With reference to FIG. 4A, in order to achieve a high-quality seal, seals 138 may be formed by continuous welds. Additional types of seals with low permeability may be formed with the use of adhesives, sealants, or other organic or inorganic materials. In some aspects, hermetic seals 138 may be formed by a polymeric material with low permeability (high impedance to gas flow). Metallic materials, such as thin sheets of steel or aluminum, may be regarded as impermeable. Moreover, while polymers, graphoil, or glass materials may have a relatively higher permeability, such materials may provide sufficient impedance to gaseous communication and reduce the amount of moisture, binder, or other effluent that may outgas from isolated insulation 26. Therefore, polymers, graphoil, and/or glass may be used as a part of barrier 126.

Figure 4C:
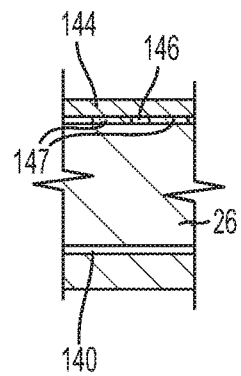

FIG. 4B illustrates a barrier seal 134A that defines a gap 146 between a permeable or impermeable barrier 144 (an exemplary barrier 126) and isolated insulation 26. Barrier seal 134A may include a cold seal 140 formed on a cold side of insulation 26 or within cold zone 30 (FIG. 1), and a non-hermetic (e.g., discontinuous) hot seal 142 between a permeable or impermeable a barrier 144. In one aspect, while hot seal 142 may include gap 146, barrier seal 134A may still form a high-impedance barrier seal. As shown in FIG. 4C, hermetic portions 147 may be provided between one or more gaps 146. In one aspect, such discontinuous sealing (e.g., gaps or substantially small leaks in the seal) may be established placing two members (e.g., separate barriers 144) in contact with each other to form hermetic seal portions 147. These hermetic seal portions 147 may be formed by pressing two precision-ground flat surfaces in a closely-mated configuration, for example. Such a mechanism may be similar in concept to a seal formed by the interference between the lid and body/rim of a cookie tin.

Figure 5A:
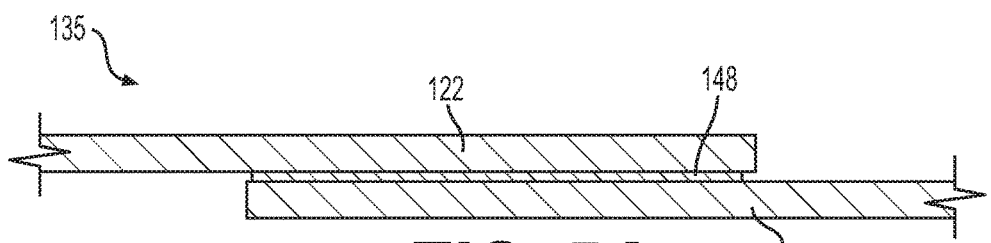
FIGS. 5A and 5B are cross-sectional views illustrating exemplary lap seals for the barrier of FIG. 3.
Figure 5B:
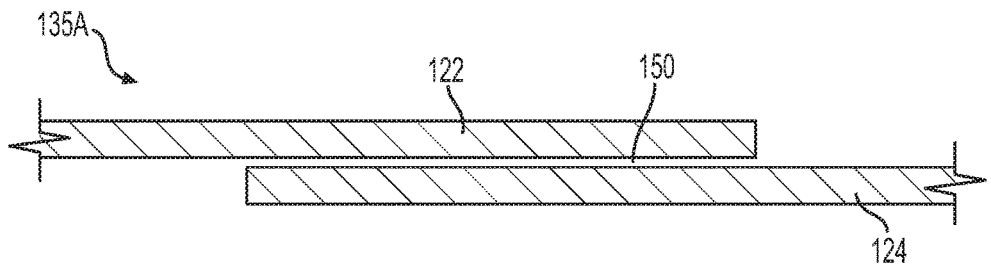

If desired, barrier 126 may include a seal that permits some leaking, such as a lap seal or overlap seal. A lap seal may be configured such that there is some gap between the surfaces (as indicated in FIG. 5B). In at least some applications, it may be desirable for there to be direct contact between opposing surfaces of the sealed members. With reference to FIGS. 5A and 5B, barrier 126 may include a lap seal 135, 135A formed by an overlap between two members of barrier 126: an inner member 122 that faces an interior of chamber 20 and an outer member 124 that faces insulation 26. As is shown in FIG. 5A a sealant, gasket and/or adhesive 148 may be positioned between an overlapping inner barrier member 122 and outer barrier member 124 to fill a gap between these members. If such sealing or gasket is continuous around the entire seal periphery or perimeter without discontinuities and/or gaps, a seal may be regarded as a "continuous seal." In contrast, lap seals with no adhesive or gasket may be imperfect and may include one or more portions that are not in direct (or intimate) contact, and such seals may be regarded as "discontinuous seals". For example, a lap seal that makes contact in numerous portions of the sealed periphery or perimeter, but that forms gaps in one or more portions, may be regarded as continuous.

Similarly, a lap seal that forms little or no direct contact along the seal may be regarded as discontinuous. In one aspect, an amount of overlap between members 122 and 124 of barrier 126 may be approximately 1 cm, 2 cm, 3 cm, or more. As shown in FIG. 5B, a lap seal 135A may include a gap 150 that provides impedance to gas and moisture by forming an extended path between members 122 and 124. As understood, a size of gaps 146 and 150 is exaggerated for illustration.

Figure 6B:
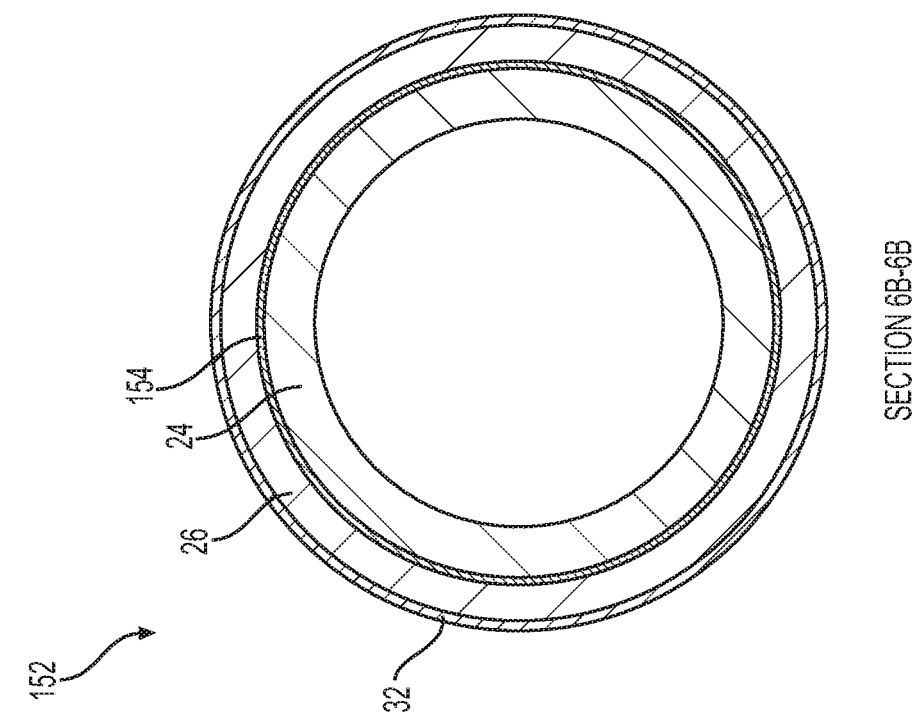
FIGS. 6A and 6B are cross-sectional views illustrating a cylindrical configuration of a barrier.
Figure 6A:
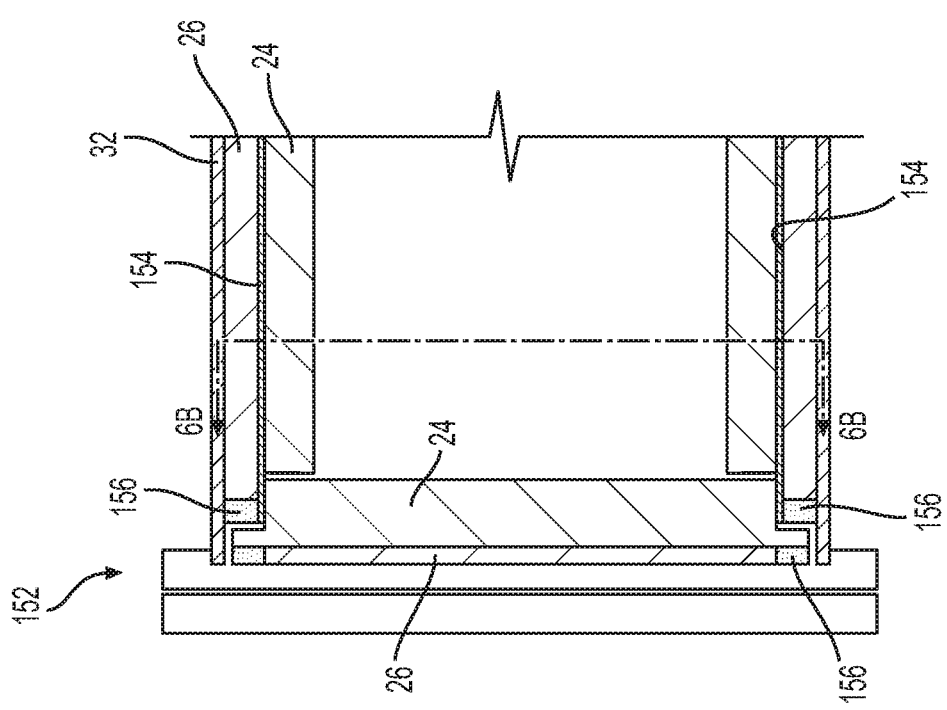

While barrier 126 may be formed in a substantially square or rectangular shape, as shown in FIGS. 6A and 6B furnace 100 may include a cylindrical configuration 152 having a cylindrical gas and moisture barrier 154. In such a configuration, insulation 24, 26 and chamber wall 32 of cylindrical configuration 152 of furnace 100 may be formed in an approximately cylindrical shape. Due to the cylindrical shape of gas and moisture barrier 154, gas barrier seals 156 (FIG. 6A) at the ends of gas and moisture barrier 154 may be located at a greater distance from hot zone 28 as compared to square or rectangular configurations, which may reduce the temperature that seals 156 are exposed to during debinding and/or sintering.

II-3. Insulation Drying

Figure 7:
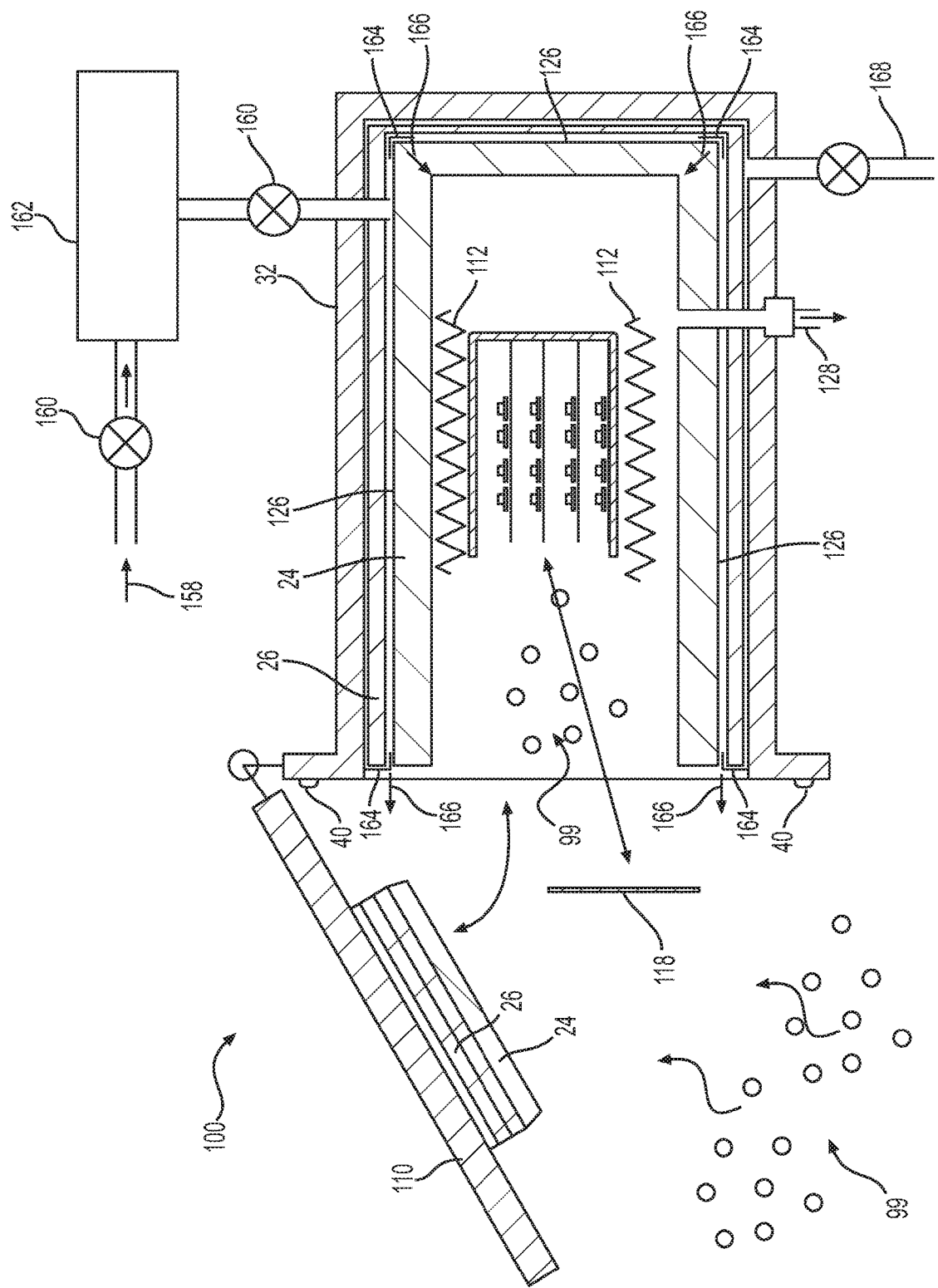
FIG. 7 illustrates an air injection configuration for the furnace of FIG. 1.

FIG. 7 illustrates a dry air injection system for furnace 100. The dry air injection system may include a purge gas supply 158, purge gas valve(s) 160, purge gas dryer 162, and appropriate tubing, feedthroughs, etc. These components may be included and controlled as part of environment control system 58 (shown in FIG. 1). Purge gas supply 158 may provide any suitable purge gas, such as dry air or an inert dry gas, to furnace 100. In one aspect, the dry air injection system may be activated when door 110 is opened, as shown in FIG. 7. Purge gas may be flowed, after being dried by gas drier 162, to an interior of furnace 100, e.g., to a space or gap between isolated insulation 26 and exposed insulation 24, or to only isolated insulation 26. In one aspect, barrier 126 (drawn without hatch lines in FIG. 7 for clarity) may form discontinuous seals 164 (e.g., lap seals). Dry air or purge gas may be injected between barrier 126 and isolated insulation 26, and may exit through discontinuous seal 164, which may form purge vents 166 (represented by arrows in FIG. 7). The injection of dry air or purge gas into isolated insulation 26, for example, may prevent the ingress or presence of moisture, binder, or any other contaminant that may otherwise absorb in isolated insulation 26 via discontinuous seals 164. Purge vents 166 may be provided at various locations, such as between exposed and isolated insulation 24, 26, through exposed insulation 24, or at other locations where moisture may tend to accumulate. For example, lap seals between members 122 and 124 of barrier 126 may be discontinuous so as to provide a flow path for purge gas 166. The use of a dry air injection system, in combination with a moisture barrier 126, may reduce the amount of contaminants in furnaces 100 that employ ceramic fiber, graphite fiber, or any other porous or hygroscopic (moisture-absorbing) insulation 22 and may be used in conjunction with lap seals 135, 135A, or other non-hermetic seals for barrier 126. In exemplary embodiments, discontinuous seals 164 can function as Peclet seals when dry gas is flowed between them.

II-4. Barrier Sealing, Retort Sealing, and Atmosphere Control

Figure 8:
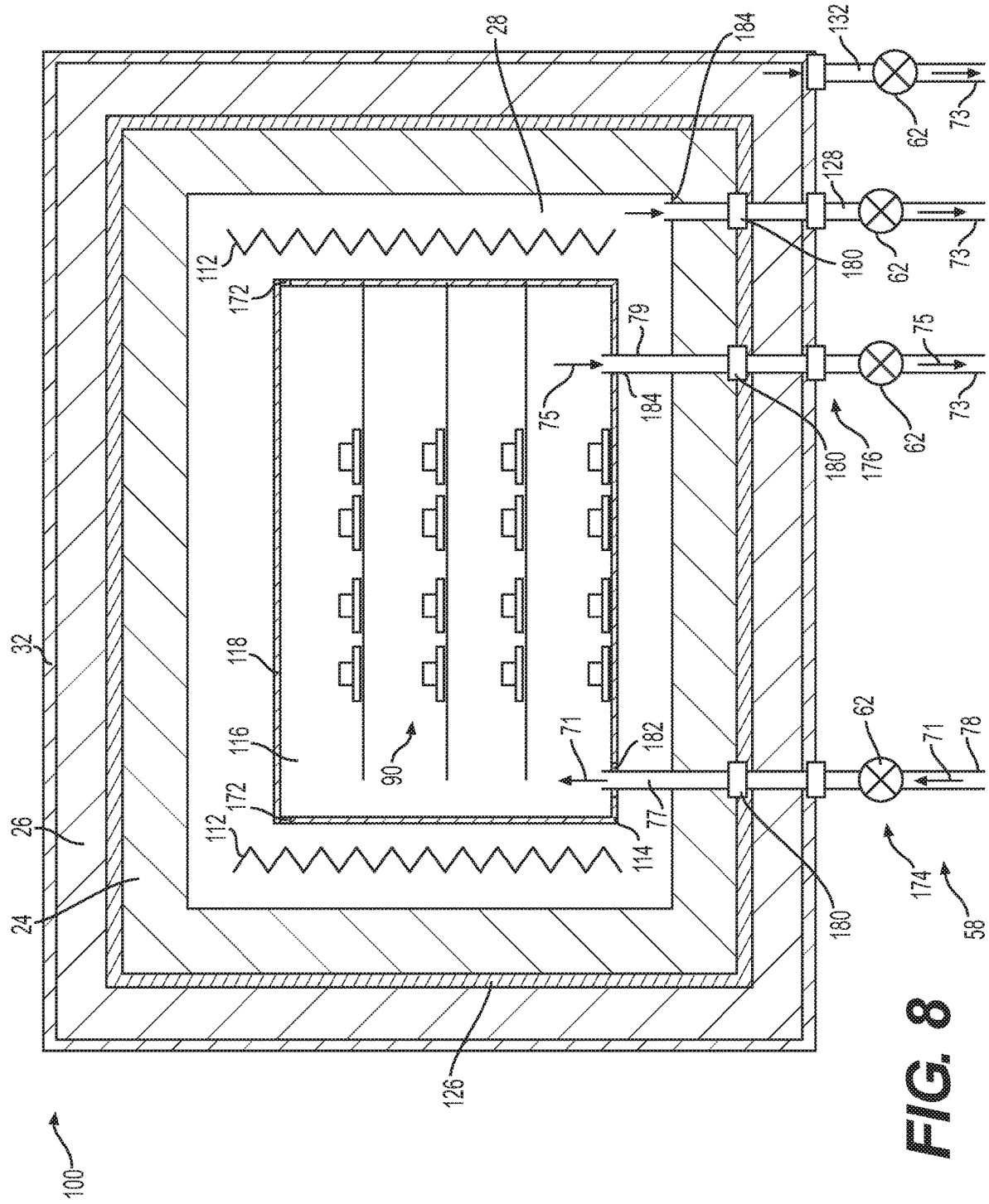
FIG. 8 is a cross-sectional view of the furnace of FIG. 1 with a sealed barrier.

FIG. 8 is a cross-sectional illustration of sealed barriers for sealing components of environment control system 58 and retort 114. Seals provided for retort 114 may include hermetic or nearly-hermetic (e.g., continuous) seals, or may include sealing that allows some level of leakage. While continuous seals may be employed to seal hermetically, not all continuous seals are hermetic seals. Seals for retort 114 may be similar to the seals for barrier 126 as described with respect to FIGS. 4A-5B, for example.

As shown in FIG. 8, retort 114 may be secured to one or more sealed retort inlets 174 and one or more sealed retort outlets 176. Retort inlet 174 may include feedline (or line) 78 and tube or line 77, and may be in fluid communication with an interior of retort 114. In a similar manner, one or more sealed retort outlets 176 may include effluent gas or vacuum line 73 and tube or line 79 to apply vacuum to retort 114 and remove effluent 75. Retort inlet 174 and retort outlet 176 may be fluidly connected to retort 114 via one or more sealed channel seals or tube seals, each of which may include continuous or discontinuous seals according to any of the sealing structures described herein. For purposes of illustration, FIG. 8 depicts retort 114 illustrating an exemplary discontinuous retort tube seal 182 associated with inlet 174, and a continuous tube seal 184 associated with outlet 176. While FIG. 8 illustrates retort 114 with a combination of discontinuous tube seals and continuous tube seals 184, it is understood that both tube seals may be continuous or discontinuous.

Retort 114 may include a plurality of removable components, such as door 118 (e.g., as described with respect to FIGS. 2 and 3). Seals associated with a body of retort 114 and door 118 (shown at the top of retort 114 in FIG. 8) may be continuous or discontinuous, as represented by discontinuous retort lid seals 172. By providing sufficient sealing at these tube seals, as well as sufficient continuous or discontinuous sealing for retort door 118, it may be possible to omit barrier 126. For example, such sealing of retort 114 may largely prevent contamination from either inner or outer insulation 24, 26 from reaching an interior of retort 114. Sealing for retort 114 is described in further detail below.

As shown in FIG. 8, environment control system 58 may maintain control over the atmosphere within retort 114 via inlet 174 and outlet 176. If desired, environment control system 58 may also include vacuum pumping port 128 for hot zone 28 and isolated pumping port 132 for isolated insulation 26, as described above. Environment control system 58 may be configured to introduce, via one or more pumps, an inert gas to an interior of retort 114. This gas may include any suitable inert, contaminant-free gas. While providing process gas directly to retort 114 may reduce the presence of contamination in parts cavity 116, especially when employed in conjunction with retort seals, further reduction in contamination may be achieved by also including barrier 126.

In some aspects, improved retort sealing may diminish the need for high integrity barriers outside of the retort. For example, a highly sealed retort, such as an impermeable wall, having high-performance lap and/or gasket seals may eliminate the need for gas barriers. Similarly, a nitride-bonded retort glazed with Silica ($SiO_2$) and sealed with lap and/or gasket seals may reduce and/or eliminate the need for hermetic moisture barriers and/or allow for non-hermetic barriers. Further still, in extreme cases, such as completely non-porous Silicon Carbide (SiC), a double gasket seal may reduce or eliminate the need for any moisture barriers and possibly even reduce or eliminate the need for an outer chamber (e.g., a chamber that defines vacuum chamber wall 32).

Figure 9:
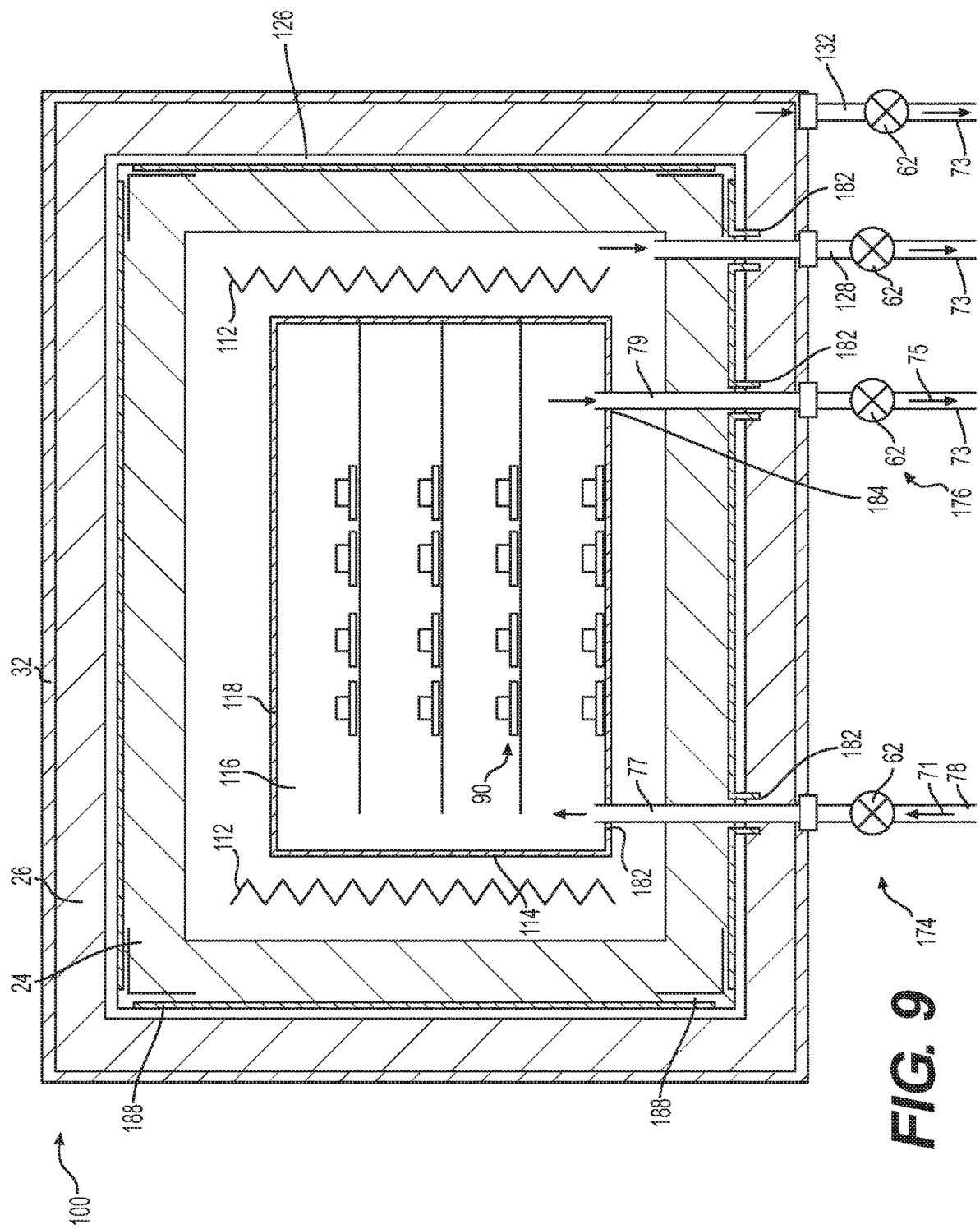
FIG. 9 is a cross-sectional view of a non-hermetically sealed barrier.

In some aspects, rather than omitting barrier 126, sealing retort 114 may facilitate the use of a non-hermetically sealed barrier. For example, FIG. 9 illustrates a cross-sectional view of furnace 100 including a non-hermetically sealed barrier 126. In one aspect, by providing sealing for retort 114 (e.g., discontinuous or continuous seals 182, 184), non-hermetic seals, such as discontinuous moisture barrier seals 188 may be used without adversely affecting the quality of parts 90. In one aspect, exposed insulation 24 may include a material, such as a nano-porous high-temperature microporous material and/or low-cost high-silica ceramic fiber insulation. In some aspects, approximately three-inch-thick graphite insulation may be employed with approximately two-inch-thick nano-porous insulation. In one aspect, exposed insulation 24 may be less hydroscopic as compared to isolated insulation 26, while isolated insulation 26 may have greater thermal resistivity. If desired, graphite fiber insulation, in the form of boards or felt, may be included on both sides of barrier 126 (i.e., graphite fiber insulation may be employed as both exposed and isolated insulation 24, 26). Retort seals, such as seals 182, 184, may provide improved purity within parts cavity 116 and may be used in conjunction with a gas and moisture barrier 126 with the above-described seals, such as lap seals implemented by bending sheet metal, or a moisture barrier 126 with some permeability (e.g., graphite foil or other graphite or carbon-based materials, such as carbon-carbon composites). As shown in FIG. 9, discontinuous seals 182 may be employed for inlet 174, outlet 176, or other vacuum tubes.

Figure 10:
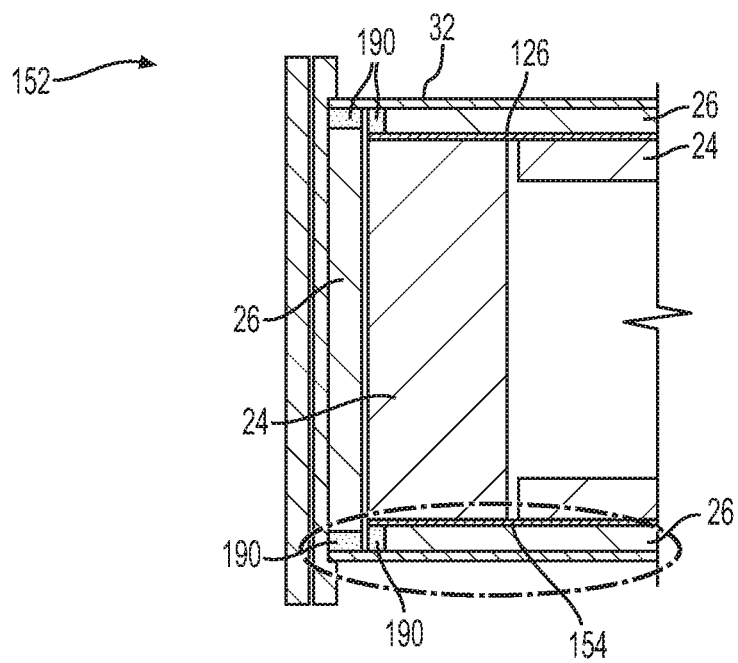
FIG. 10 is a cross-sectional view of a hermetic barrier.
Figure 11A:
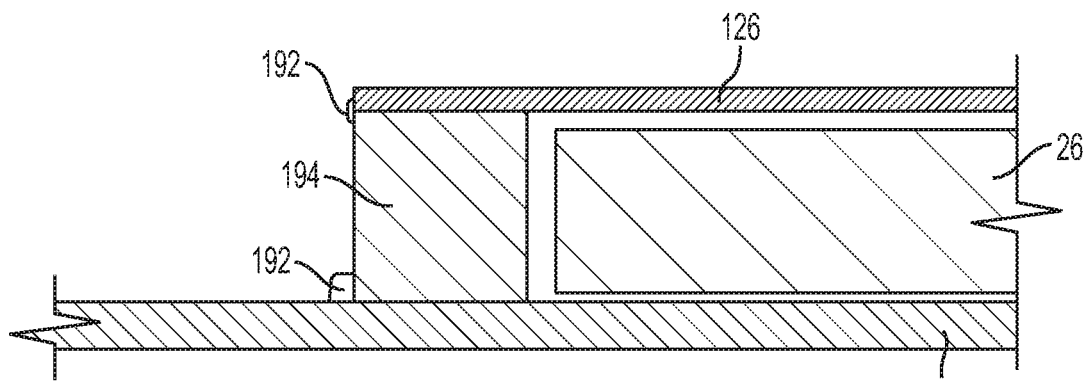
FIGS. 11A and 11B are exemplary configurations of the hermetic barrier of FIG. 10.
Figure 11B:
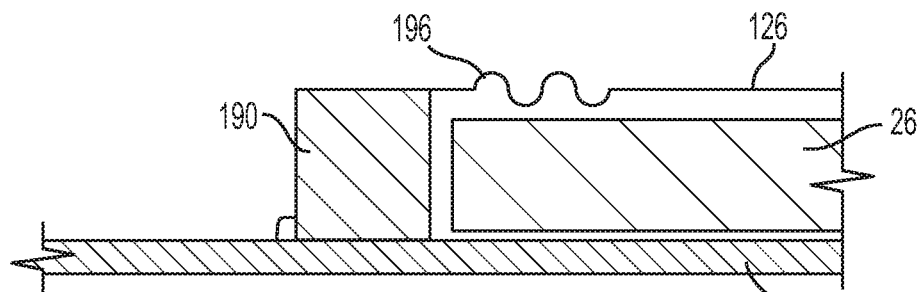

FIGS. 10-11B are cross-sectional views illustrating hermetic seals that may be employed in conjunction with cylindrical furnace 152. FIGS. 11A and 11B show exemplary configurations of the encircled portion of FIG. 10 for sealing insulation 26. Barrier 154 may be provided with moisture barrier edge walls 190. Barrier 154 may include a thin-walled nickel tube welded to steel or nickel edge walls 190 so as to form a hermetic seal for isolated insulation 26. In some aspects, barrier 126 may be formed by a thin-walled nickel tube, e.g., about 0.05 inches thick, (FIG. 11A) or high temperature steel such as 310S alloy sealed with an end ring 194 and welds 192. In order to facilitate the use of a thin-walled tube for barrier 126, as shown in FIG. 11B, an edge wall 190 and bellows 196 may be provided as part of the barrier 126. Bellows 196 may provide flexibility and may accommodate thermal expansion. Other joint types may be provided instead of bellows 196 in order to provide flexibility and improved resilience to a thin-walled barrier 126.

II-4A. Retort Structure and Materials

FIG. 12 is a schematic view illustrating a sealed retort configuration 200, which may be employed in furnace 100. In one aspect, sealed retort 200 may include a retort base 202 fluidly connected to environment control system 58 (shown in FIG. 1, for example) via one or more inlet tubes and one or more outlet tubes, and a retort body 204, which may be removable with respect to base 202 so as to provide an open position for loading retort 200 (similar to retort 114 in FIGS. 2 and 3) and a closed, sealed position (e.g., a position corresponding to FIG. 12). While retort 200 may be formed by two components, base 202 and body 204, that are fitted together, retort 200 may include a plurality of separate sections or portions that are fitted together and secured on retort base 202 for thermal processing of one or more parts 90 (not shown in FIG. 12).

Each of the sections of retort 200 may be sealed in any suitable manner described herein, include separable seals (e.g., for a lid) or non-separable seals 211 (e.g., for permanently joined sections). In the exemplary configuration illustrated in FIG. 12, retort seals 210 may be separable, replaceable seals that facilitate loading of retort 200. Retort seals, such as seals 210, or seals at other locations of retort 200, may be continuous (e.g., hermetic), discontinuous (e.g., non-hermetic), rigid, or flexible. Additionally, one or more of these seals may include one or more of a refractory (high-temperature) adhesive, cement, mortar, metal, plastic, or any other material suitable for filling at least a portion of a gap present between each one or more sections of retort 200. In some aspects, seals may include a poured material, such as sand, powder, paste, or fluid. Retort seals may be close-fitted, abutted, or contacting. Thus, any of the seals described herein, including lap seals, may be employed within retort 200. Moreover, in order to facilitate sealing of retort 200, one or more surfaces may be machined, lapped, cut, molded, or otherwise processed in any suitable manner to provide close conformation between abutting or mating surfaces of retort 200. In one aspect, a portion of retort that is removable for loading parts (e.g., retort body 204), may form a main seal (e.g., seal 210) with respect to a portion of retort 200 that is fixed within furnace 100, such as retort base 202.

Retort 200 may include graphite and/or suitable carbon-based materials. If desired, retort 200 may be coated in the manner described below and/or infused to reduce or prevent passage of gas, water vapor, or a combination thereof. The materials, coatings, and/or infusions of retort 200 may reduce porosity of the retort, and may reduce pore size or close pores in the materials forming the retort to reduce permeation as compared to open pores.

Retort 200 may include refractory materials. In particular, retort 200 may be formed of sintered silicon carbide (SiC) or reaction bonded (RB) SiC or Nitride bonded SiC. In one aspect, the material(s) included in retort 200 may be stable at temperatures such as about 800 degrees C., about 900 degrees C., about 1,000 degrees C., about 1,100 degrees C., about 1,200 degrees C., or about 1,300 degrees C. In a preferred embodiment, the material(s) included in retort 200 may be stable at temperatures including about 1,350 degrees C. or about 1,400 degrees C., or higher, in order to facilitate high-temperature sintering of metallic parts. In some cases, retort materials, such as graphite or SiC, may be operable at temperatures that reach or exceed about 2,000 degrees C. In one aspect, a retort may be considered "stable" at a particular temperature if the retort is able to withstand at least 50 cycles (e.g., sintering cycles) at a particular temperature without experiencing significant degradation and/or failure. For example, retort 200 may be configured to withstand at least 50 cycles at temperatures greater than 800 degrees C. without failing.

Retort 200 may include one or more other refractory materials used to form a non-porous sealed retort, either in addition to or instead of sintered SiC or reaction bonded SiC. Exemplary suitable refractory materials may include: Boron Carbide ($B_4C$), Silicon Hexaboride ($SiB_6$), Silicon Aluminum Oxynitride (SiAlON), Boron Nitride (BN), Silicon Nitride ($Si_3N_4$), Yttrium Oxide ($Y_2O_3$), or other Rare Earth oxides, such as $La_2O_3$, $Nd_2O_3$, $Gd_2O_3$, etc., Fused silica ($SiO_2$), Aluminum Nitride (AlN), Aluminum Titanate ($Al_2TiO_5$), Silicide Conversion Coated Molybdenum (or SiB OR), Si conversion coated W, TZM (Molybdenum, Ti, and Zr), Mo—Re alloys, W—Re alloys, Lanthanated Molybdenum, or Lanthanated W (e.g., WL10 or WL20), Hafnium Carbide (HfC), Tantalum Carbide (TaC), Zirconium Carbide (ZrC), Tungsten Carbide (WC), Niobium Carbide (NbC), Group IV-VI Carbides, Group IV-VI Borides, Group IV-VI Nitrides, Group IV-VI Silides, Nb $ClO_3$ Alloy (Nb, Hf, and Ti), or: titanium, zirconium, hafnium, vanadium, niobium, tantalum, chromium, molybdenum, tungsten, manganese, rhenium, ruthenium, rhodium, osmium, iridium, or combinations or alloys thereof including high temperature steels and nickel alloys.

In one aspect, a process or inert gas may be pumped to the retort without applying vacuum to the retort and the retort may be operated at atmospheric pressure or slight positive pressure, vacuum may be applied to the retort without pumping gas to the retort, or, as shown in FIG. 12, process gas (e.g., process gas 71, as shown in FIG. 1) may be pumped to the retort from at least one first retort tube 212 while a vacuum (e.g., to remove effluent 75 containing process gas 71 and offgas, as shown in FIG. 1) may be applied to the interior of retort 200 from at least one second retort tube 212. Thus, at least one tube 212 may correspond to process gas inlet tube 77 of FIG. 1, while another tube 212 may correspond to effluent gas tube 79 of FIG. 1. Similar to furnace 100, retort 200 may be operable at vacuum levels slightly below atmospheric pressure, or vacuum pressure. Retort 200 may also be useful for debinding and/or sintering at atmospheric pressure and/or pressures above atmospheric pressure.

Gas may be introduced to retort 200 via one or more transition conduits or tubes 213. Similarly, vacuum may be applied via one or more transition tubes 213. Transition tubes 213 may extend through a sealed feedthrough of furnace 100 from an exterior of furnace 100, as shown in FIG. 12. Each transition tube 213 may be joined to a respective retort conduit or tube 212 (e.g., inlet tube 77 or effluent tube 79) by a sealed transition 208. Moreover, each retort tube 212 may be sealed with respect to retort 200, in particular, with respect to base 202, by a retort tube seal 206. One or more optional additional feedthroughs 219 may be provided in wall 32 of furnace 100 to facilitate the insertion of one or more temperature sensors, vacuum tubes, etc., and may be closed when not in use.

Figure 13:
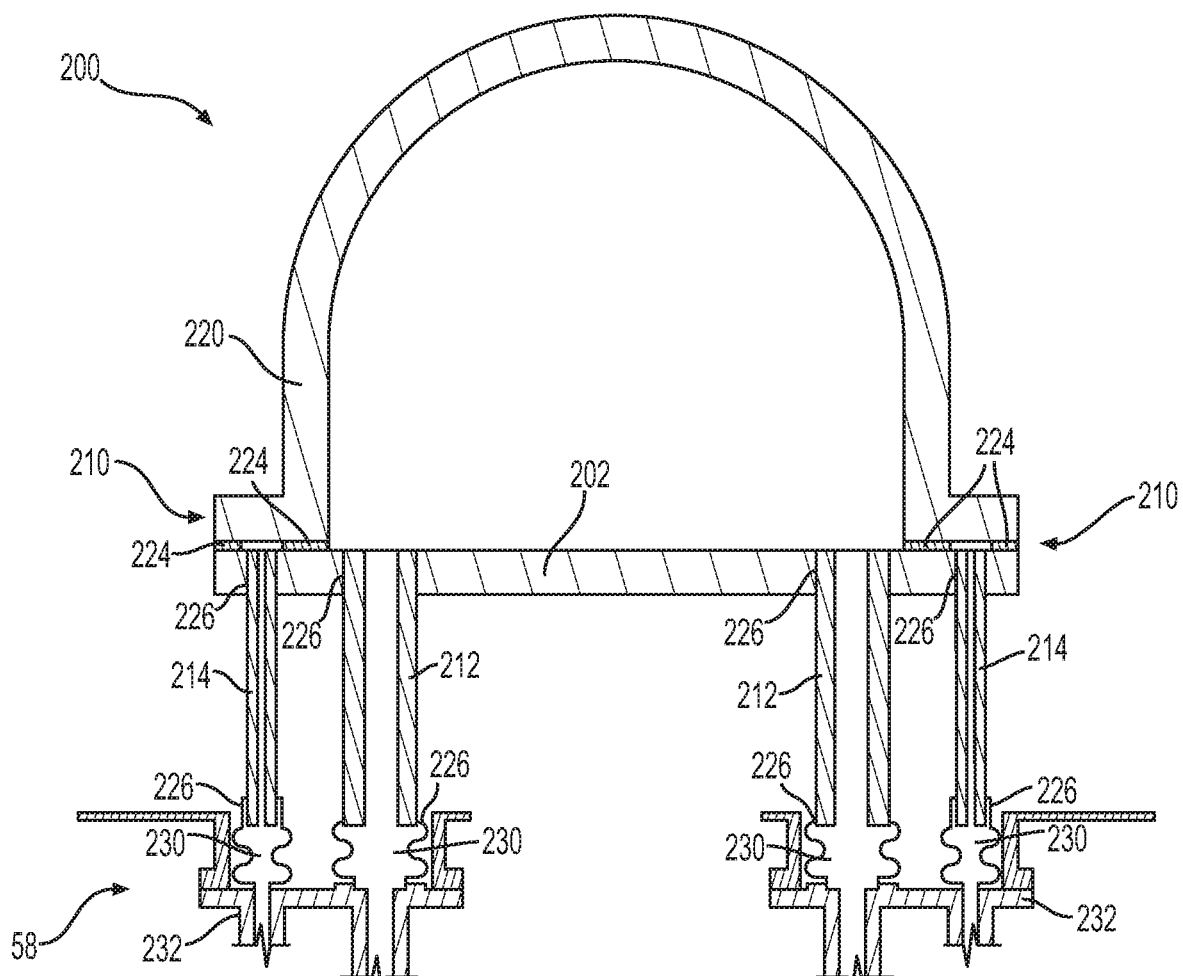
FIG. 13 is a cross-sectional view of a sealed retort having a dome-shaped configuration.

Retort 200 may have a square or rectangular shape (as shown in FIG. 12), may have a dome-shaped configuration, as represented by dome retort body 220 in FIG. 13, or may have a cylindrically-shaped configuration, as represented by cylindrical retort body 222 in FIG. 14. Regardless of the shape of retort 200, as shown in FIG. 13, retort 200 may facilitate the application of vacuum and/or introduction of sweep gas (e.g., inert gas similar to process gas) to facilitate the atmospheric isolation provided by main seal 210 of retort 200. For example, as illustrated in FIG. 13, retort body 220 may be sealed by one or more individual seals 224. In some aspects, a plurality of individual seals 224 may be provided between base 202 and body 220 of retort 200. This plurality of individual seals 224, which may each include one of a plurality of concentrically-disposed graphoil seals 224, may define a space in fluid communication with environmental control system 58. While individual seals 224 may be the same type of seal (e.g., a plurality of seal rings), individual seals 224 may include different types of seals (e.g., a seal ring and a Peclet seal, as described below).

Figure 14A:
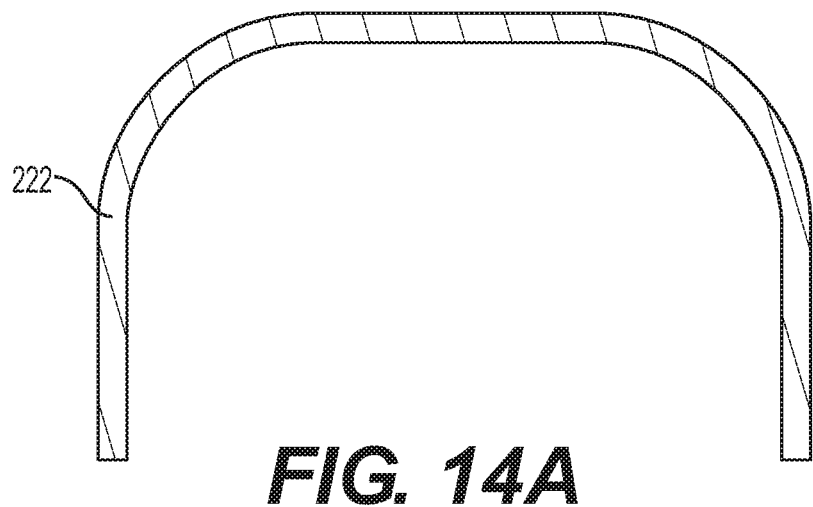
FIG. 14A is a cross-sectional view of a sealed retort body with a cylindrical configuration.
Figure 14B:
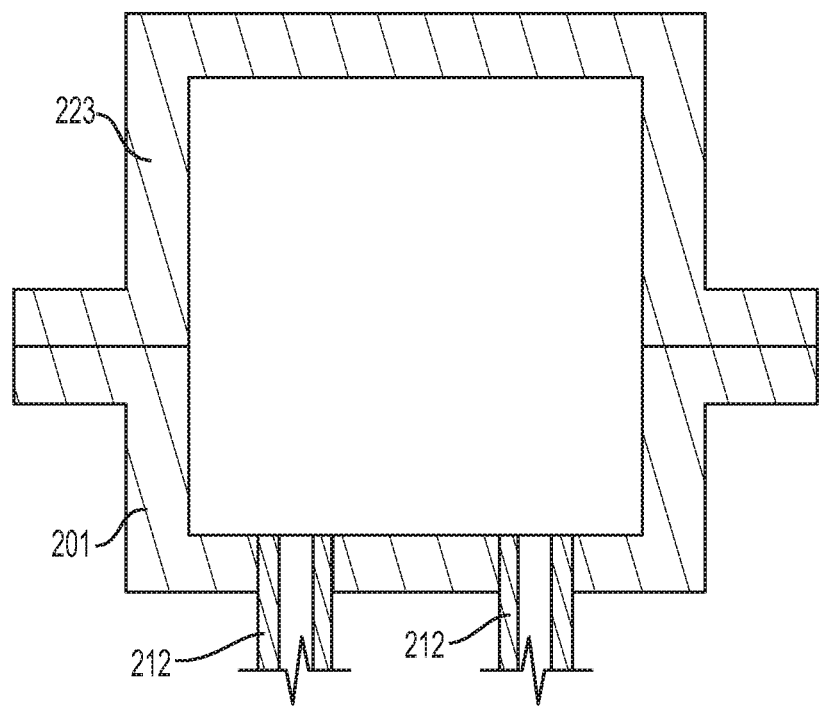
FIG. 14B is a cross-sectional view of a sealed retort having a clamshell-shaped configuration.

In one aspect, one or more rigid or metal gas passages 232 may connect the retort seal 210 with a supply of inert gas and/or a vacuum pump, as shown in FIG. 13. A compliant retort tube seal 230 may sealingly connect a gas passage 232 with a respective seal tube or conduit 214. Bonded retort tube seals 226 may seal a transition or joint between each compliant retort tube seal or conduit seal 230 and seal tube 214. A bonded retort tube seal 226 may be located at the interface between seal tubes 214 and retort base 202. In a similar manner, one or more retort tubes or retort conduits 212 that provide fluid communication between an interior of retort 200 and a supply of inert gas and/or a vacuum pump may be connected to gas passage(s) 232 via compliant tube seals 230. These retort tubes 212 may be sealed via bonded retort tube seals 226. Passages 232, compliant tube seals 230, and tubes 212, 214 may also be used with a retort 200 including cylindrical retort body 222, as shown in FIG. 14A, or a retort 200 with a clamshell shaped body 223, as shown in FIG. 14B. For example, retort body 222 may be provided with a circumferentially-extending flange (not shown in FIG. 14A) to facilitate formation of seal 210, similar to retort body 222 shown in FIG. 13.

It will be appreciated, that although retort body 220 is illustratively depicted as being dome shaped and/or retort base is illustratively depicted as being substantially planar (e.g., as depicted in FIG. 13), retort body 220 and retort plate 202 can be other shapes such as, but not limited to, both being domed-shaped, both being opposing domes forming a clamshell shape (as shown by clamshell-shaped retort base 201 in FIG. 14B), square, rectangular, and ovoid, to name a few II-4B. Retort Coating FIG. 15 is a cross-sectional view illustrating a coated retort 234. Coated retort 234 may include one or more layers of a coating on exterior and/or interior surfaces to impede gaseous communication between insulation 22 (and also heaters 112 and wall 32) and an interior of retort 234. In the case of nitride-bonded silicon carbide that has been fired to produce a Silica glaze that can serve as a very effective coating that substantially lowers overall leak rate to less than $10^4$ Torr Liter per second (TL/s) for a five liter volume retort. Coated retort 234 may have a main body or retort wall 244 that is formed of graphite and/or carbon composites that may be porous and may allow some degree of gaseous communication through wall 244 if untreated or uncoated. In one aspect, an inner or interior coating 246 and an outer or exterior coating 248 may be applied to form a coated retort 234. While both inner and outer coatings 246, 248 are illustrated in FIG. 15, a coating may be applied to only the exterior or only the interior of retort 234. Additionally, while coated retort 234 may include a coated base 236 and a coated body 238, it may be desirable to coat only base 236, only body 238, or to provide coatings including different materials, or coatings on different locations of base 236 and body 238. Tube seals, such as sealed retort tube seal 242, may be used to seal coated base 236 and a retort tube in the same manner described as any retort tube seal described herein (e.g., bonded retort tube seals 226 described with respect to FIG. 13). Additionally, retort seals 240 may be employed with coated retort 234 in the same manner as any retort seal described herein. In some aspects, the coating may be applied as a cladding and/or lamination, such as graphoil, a refractory metal foil, or a relatively thin layer of ceramic (e.g., alumina). For example, in the case of graphite retorts, a graphite laminate may be applied with graphite retainers and/or graphite or other carbon-based refractory adhesives.

Suitable materials for forming coatings 246 and/or 248 on graphite and/or carbon fiber retort walls may include organic materials, such as epoxies, pitches, creosote, furfuryl alcohols, phenolics, etc., that are infused into a graphite body and pyrolyzed. In some embodiments, graphite may be placed over a distributed vacuum chuck to facilitate infusion of one or more of these materials. In some aspects, the organic material(s) may be pyrolyzed to a glassy or disordered carbon. If desired, the organic material(s) may be processed at temperatures higher than pyrolyzing temperatures to graphitize the carbon produced from the organic material. In one aspect, glassy carbon may be deposited to form a coating on one or more surfaces of retort 234. In the case of a Nitride-bonded SiC retort with a glazed coating or $SiO_2$, for example, the improvement in contamination reduction due to coating may exceed a factor of 1,000.

In some aspects, coated retort 234 may be formed via molten silicon infiltration that reduces porosity of the retort 234. In some aspects, molten silicon may react with carbon present in retort base 236 and/or retort body 238, and may form SiC. The infiltration of molten silicon may be limited to a surface layer or may penetrate deeper (e.g., through an entirety or substantially an entirety of base 236 or body 238). In some aspects, the pore size of retort 234 (e.g., pores formed by graphite) may be reduced by the application and pyrolyzation of organic material.

If desired, one or more coatings 246, 248 may be formed via chemical vapor deposition (CVD) or chemical vapor infiltration (CVI) in which carbon, silicon, SiC, or other materials infiltrate a surface or portion of retort 234. Additionally or alternatively, a solid infiltrating material may form a coating via deposition of a powder. In some aspects, the deposited powder may include one or more of a carbonaceous material (e.g., carbon black or graphite), Si, or a metal. The powder may be heated to melt or otherwise fuse one or more materials within the powder. Such a fused constituent may react with another component in the powder or may react with a material of retort 234 to form a coating or otherwise reduce porosity. For example, a powder including carbon powder and Si may be applied to a graphite retort and heated to melt the Si, which may react with the carbon powder and/or graphite to form a surface layer (or coating) with a higher density that includes carbon, silicon, or silicon carbide, thereby coating retort wall 244.

In some aspects, an infiltrating material applied to coat retort 234 may be provided via a slurry or suspension of powder that may also include binders, surfactants, and/or dispersants. Any suitable method, such as dip coating, slip-casting, electrophoretic deposition, or spray coating may be employed to apply coatings 246, 248.

In order to infuse a metallic powder (e.g., a chemically-reactive metallic powder), metal powder particles may be provided as a powder that is deposited on the surface or into pores of retort wall 244. For example, contamination may be reduced by infusing a metallic material, such as titanium, that is the same as a material included in parts 90, onto or into retort wall 244.

In some aspects, infusion of ultra-fine particles, and/or nanoparticles of refractory metal or other inorganics may be employed to infuse or coat a graphite retort wall 244. Solvents, such as alcohol, acetone, etc., may form a carrier for these particles. Vacuum molding or other pressure-assisted vacuum infiltration techniques may be employed to cause such particles to infiltrate graphite and form coatings 246 and/or 248.

In some embodiments, coatings 246, 248 may include ceramic coatings, such as Ceramabond 542 infused using a distilled water carrier, or graphibond phenolic-filled ethanol (which may include additional ethanol as a carrier).

By providing one or more coatings 246, 248 for retort 234, it may be possible to employ a graphite material that, if uncoated, would have a relatively high porosity, reducing the cost associated with production of retort 234. Additionally, two or more of the above-described coatings may be employed and may operate in a synergistic manner in order to further reduce permeability. As understood, while coatings 246 and 248 are illustrated as single layers, one or both of coatings 246 and 248 may be formed by multiple coatings of different materials or multiple coatings of the same material.

II-4C. Retort Seals

Figure 17:
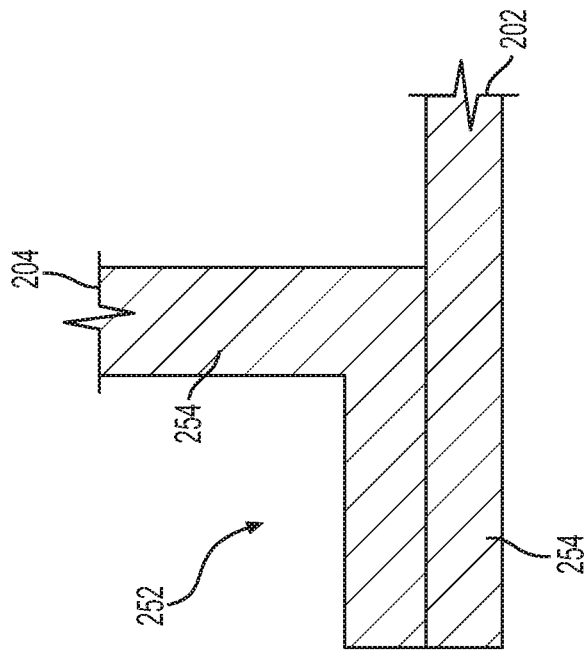
FIG. 17 is a detail view of the lap seal of FIG. 16.
Figure 16:
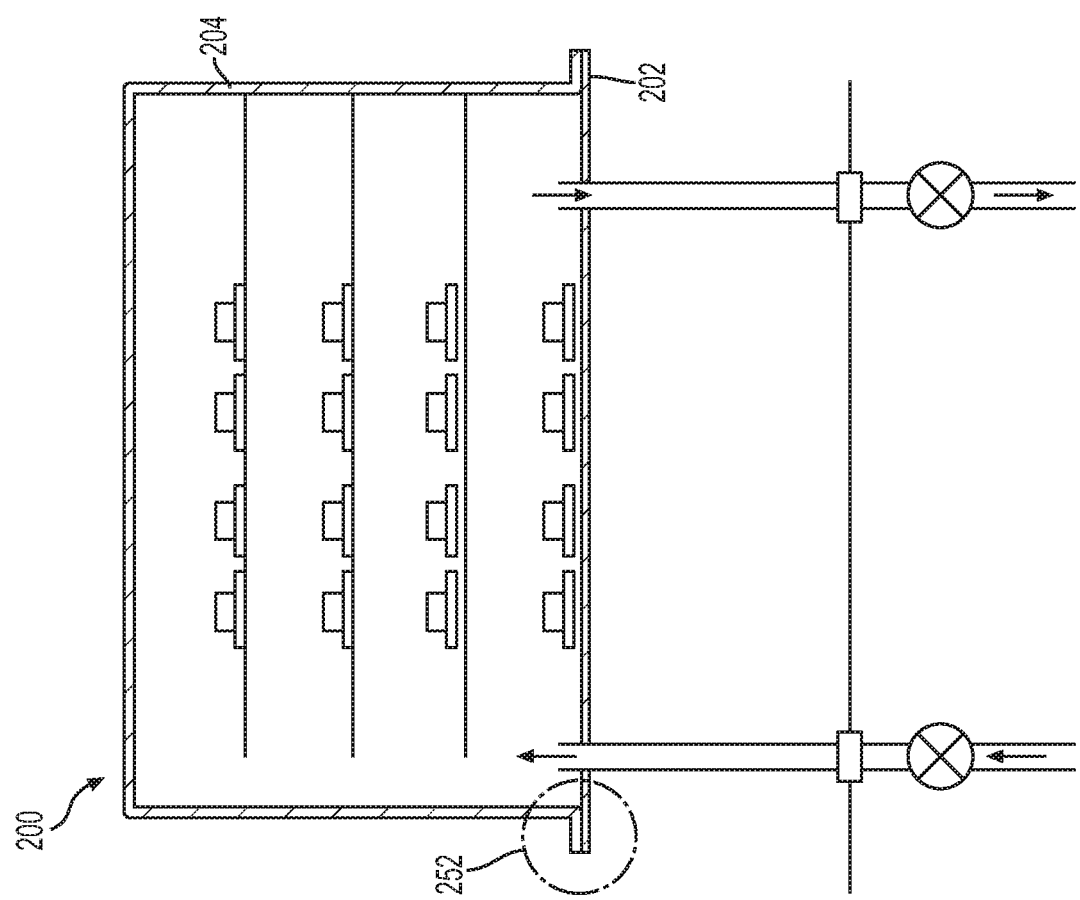
FIG. 16 is a cross-sectional view of a retort sealed with a lap seal.

Permeability of retorts, such as retort 200 or coated retort 234, may further be reduced by employing one or more retort seals discussed herein. For example, as illustrated in FIGS. 16 and 17, retort 200 may employ a lap seal 252, similar to lap seal 135A, for example. Lap seal 252 may be employed in conjunction with a relatively thick-walled retort 200 (e.g., about 0.25 inch to about 1 inch). For example, lap seal 252 may provide a seal between retort walls 254 and base 202 having a thickness of about ⅝ inch. Lap seal 252 may be used with a coated retort 234 or an uncoated retort 200 in which a vacuum is applied. In some aspects, uncoated retort 200 may be a graphite retort or any other retort material described herein.

Figure 19:
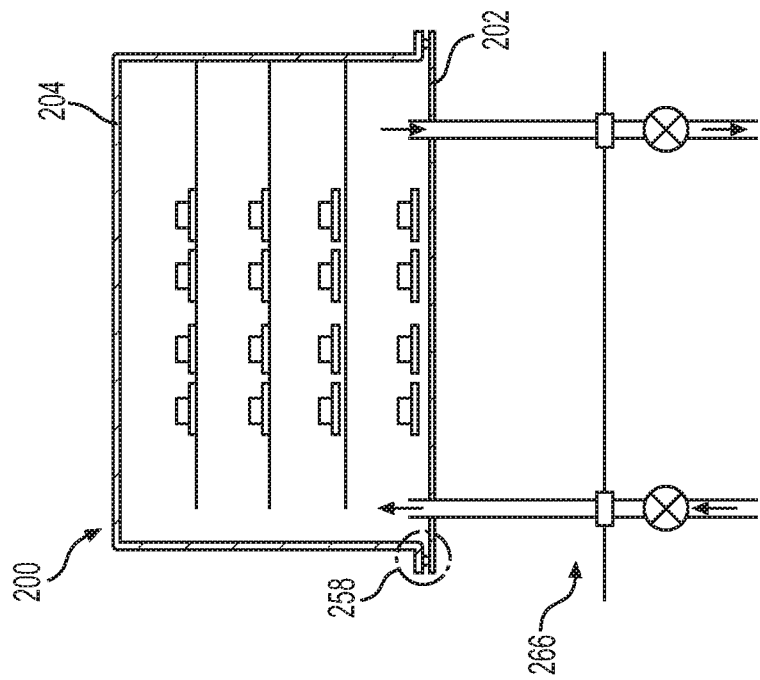
FIG. 19 is a cross-sectional view of a retort with a gasket seal in the closed position.
Figure 18:
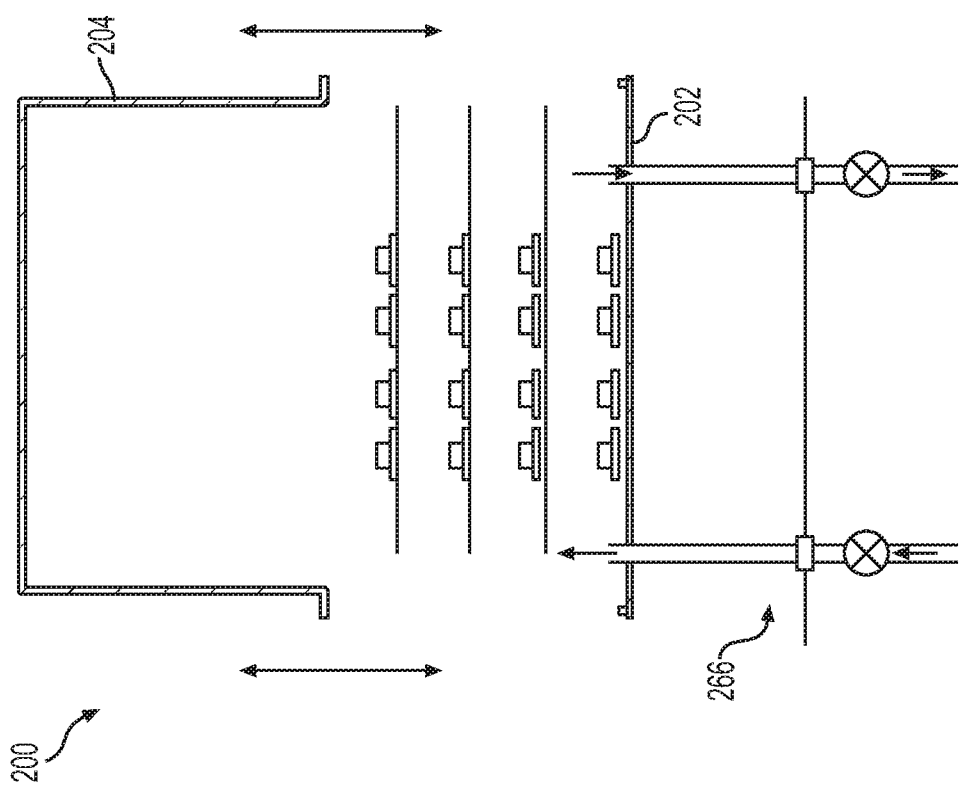
FIG. 18 is a cross-sectional view of a retort with a gasket seal in an open position.
Figure 23A:
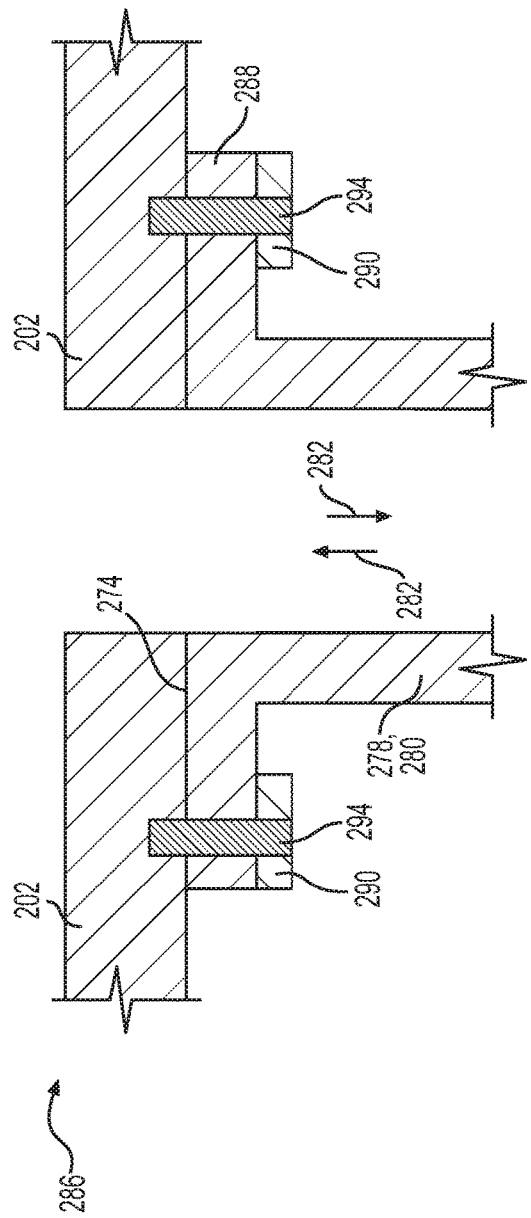
FIGS. 23A and 23B are views of seals useful for sealing a tube of the retort.
Figure 23B:
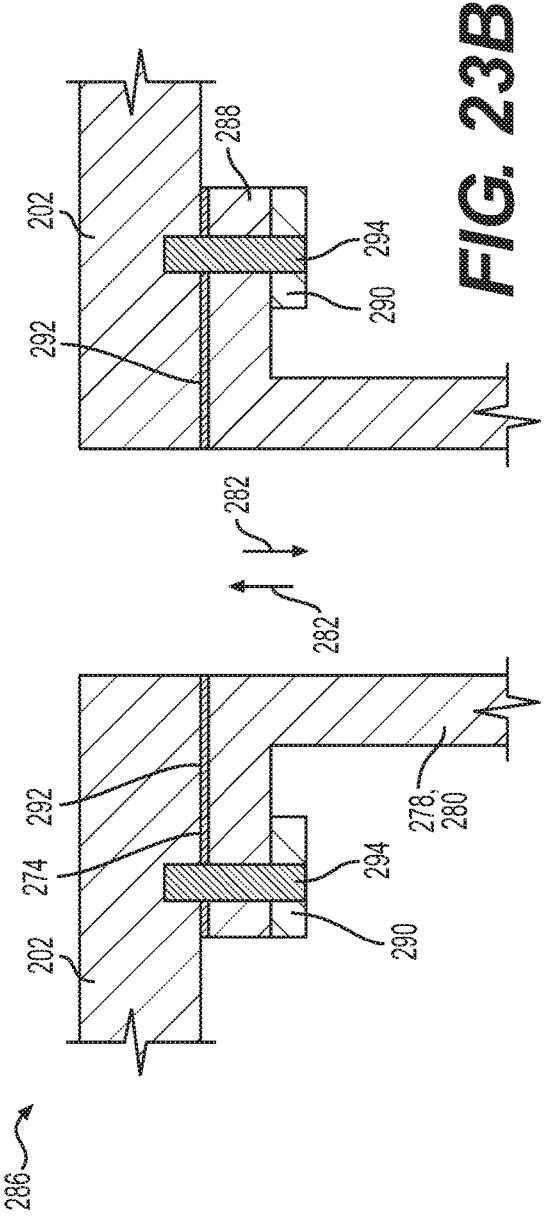

FIGS. 18-21 illustrate gasket seals for use with sealed retort 200 according to aspects of the present disclosure. FIGS. 18 and 19 illustrate respective open and closed positions of retort 200. In one aspect, retort 200 may be formed of graphite and may be sealed by a retort gasket seal 258. Retort gasket seal 258 may include a pure graphite foil or graphoil material and may be secured via one or more threaded fasteners (as shown in FIGS. 23A, 23B), such as graphite bolts that apply compressive force between retort base 202 and retort body 204 so as to compress the graphoil or other retort gasket seal 258. Retort gasket seal 258 may be formed as a compressed single graphoil gasket 262 (FIG. 20), or as a plurality (e.g., two or more) separate graphoil gaskets 264 (FIG. 21). Regardless of the number of gaskets that form gasket seal 258, the graphoil gasket may include multiple overlaid layers of graphoil sandwiched between graphite base 202 and graphite wall (of body 204).

FIG. 21 illustrates an exemplary retort seal pump system 266 of environment control system 58 (FIG. 13) that includes seal tube 214, which may facilitate application of a vacuum, via a diaphragm pump or rotary vane pump, to the space between plural gaskets 264. Seal tube 214 may be connected to a furnace chamber feedthrough 270, which may correspond to gas feedthrough 66 of FIG. 1 to provide fluid communication with one or more pumps of furnace system 10. By applying vacuum to the space between a pair of seals, such as graphoil or other gaskets 264, the sealing performance of the gaskets may be greatly improved. Chamber 20 within vacuum chamber wall 32 may be supplied with an inert gas to reduce or prevent oxidation of graphoil gaskets.

With reference to FIGS. 22A-22C, in some aspects, a groove 276 may be formed in retort 200 to facilitate the application of sweep gas 282 to a retort seal such as a lap or gasket seal 274 according to any of the lap or gasket seals described herein. While groove 276 is illustrated as being formed as a recess within retort base 202, groove 276 may instead be formed by a groove within retort body 204. In one aspect, groove 276 may extend through an entire periphery or circumference of retort 200 so as to circumscribe parts cavity 116. Sweep gas 282 may be introduced via a sweep gas inlet tube 278 and may travel within groove 276 before exiting groove 276 via sweep gas outlet tube 280 can be exhausted and/or pumped. As illustrated in FIG. 22B, a pair of retort tube seals 286 may be provided so as to provide one or more inlets and/or outlets for sweep gas for pumping and/or exhausting the sweep gas. The use of sweep gas may improve sealing performance as compared to a sealing member provided in groove 276, although a sealing member may be sufficient in some embodiments. If the gaskets are thick enough (e.g., 0.020 inch to 0.1 inch, or more), there may be no need for a groove.

FIGS. 23A and 23B illustrate exemplary retort tube seals 286 for sealing sweep gas inlet and outlet conduits or tubes 278, 280. For example, as shown in FIGS. 23A and 23B, sweep gas tubes 278, 280 may be secured to retort base 202 via a graphite and/or carbon composite threaded rod 294 and via a graphite and/or carbon composite nut 290. A lap seal (FIG. 23A) may be employed to form direct or intimate contact to seal the interface between a flange 288 of tubes 278, 280 and base 202. Alternatively, a gasket 292, such as a graphoil gasket or graphite adhesive (e.g., a phenolic-based adhesive), may be secured between tubes 278, 280 and base 202 of retort 200. The tubes 278, 280, and flange 288 may include a ceramic (e.g., alumina), carbon composite, graphite, or any refractory material described herein.

II-5. Outer Heaters

Figure 24:
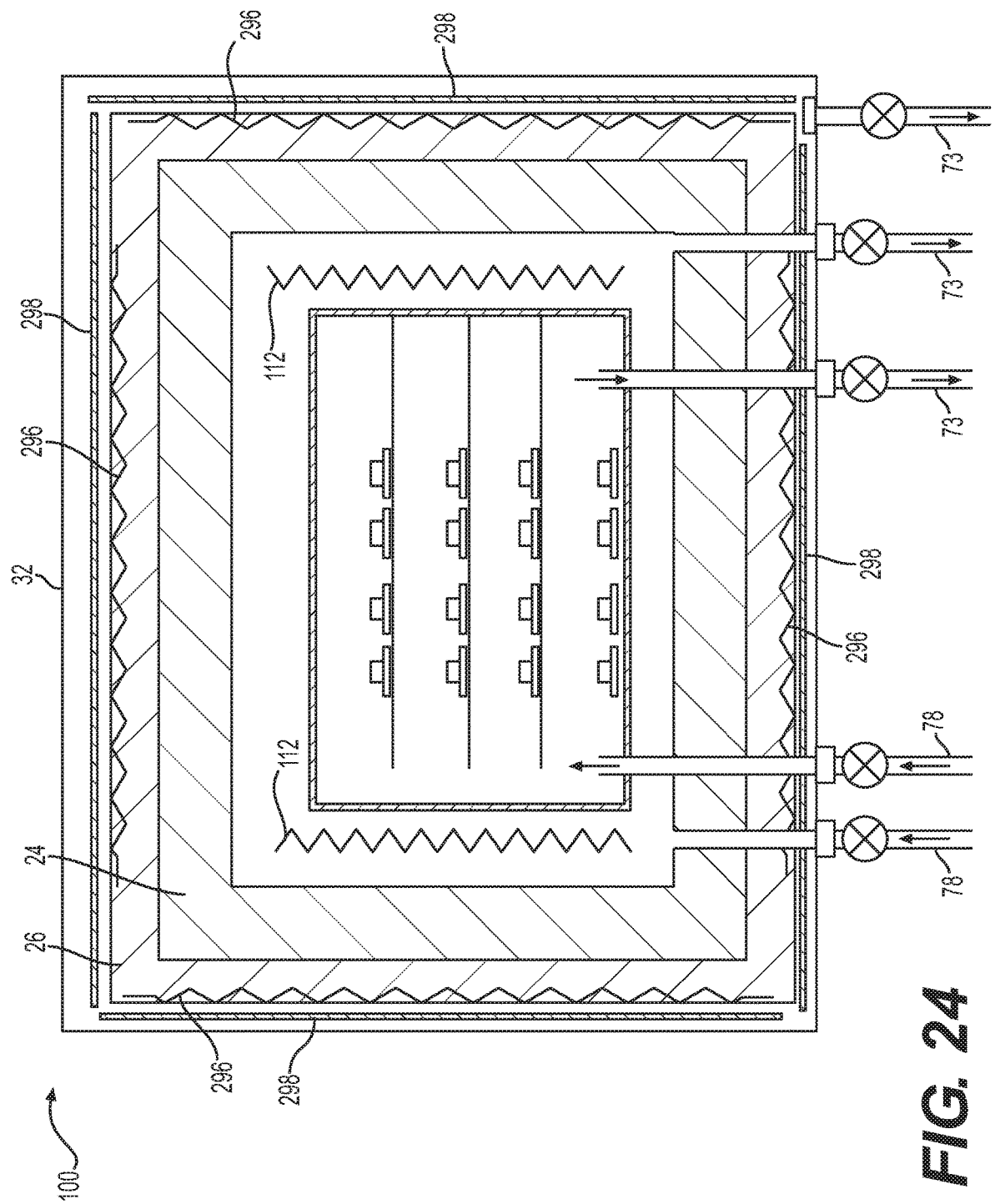
FIG. 24 is a cross-sectional view of a furnace having outer heaters and heat shields.

With reference to FIG. 24, furnace 100 may also include, if desired, one or more outer heaters 296, which may be positioned external to exposed insulation 24. Outer heaters 296 may be nichrome and/or Kanthal alloy heaters, and may generate less heat compared to heaters 112. For example, outer heaters 296 may generate temperatures ranging from about 50 degrees C. to about 500 degrees C. As shown in FIG. 24, outer heaters 296 may be embedded or buried within isolated insulation 26. In some aspects, heaters 296 may heat isolated insulation 296 before and/or during thermal debinding. Heaters 296 may generate heat to remove contamination prior to debinding and/or sintering of parts, such as titanium or tool steels that may be particularly sensitive to contamination. In some aspects, heaters 296 may continue to generate low level heat when the furnace 100 is opened, for example, to mitigate condensation of moisture. Control of heaters 296 may be performed by furnace controller 76 and power supply 84 (FIG. 1), or heaters 296 may be controlled by a separate controller.

Heat shields 298 may surround the outer heaters 296, and may include one or more spaced-apart layers of thin stainless steel sheet material. In some aspects, heat shields 298 may be provided within wall 32 of furnace 100, or secured inwardly of wall 32. By providing heat shields 298 within wall 32, heat leakage to the outside environment of furnace 100 may be reduced or prevented. Thus, heat shields 298 may prevent overheating of components outwardly disposed of heaters 296.

Figure 25:
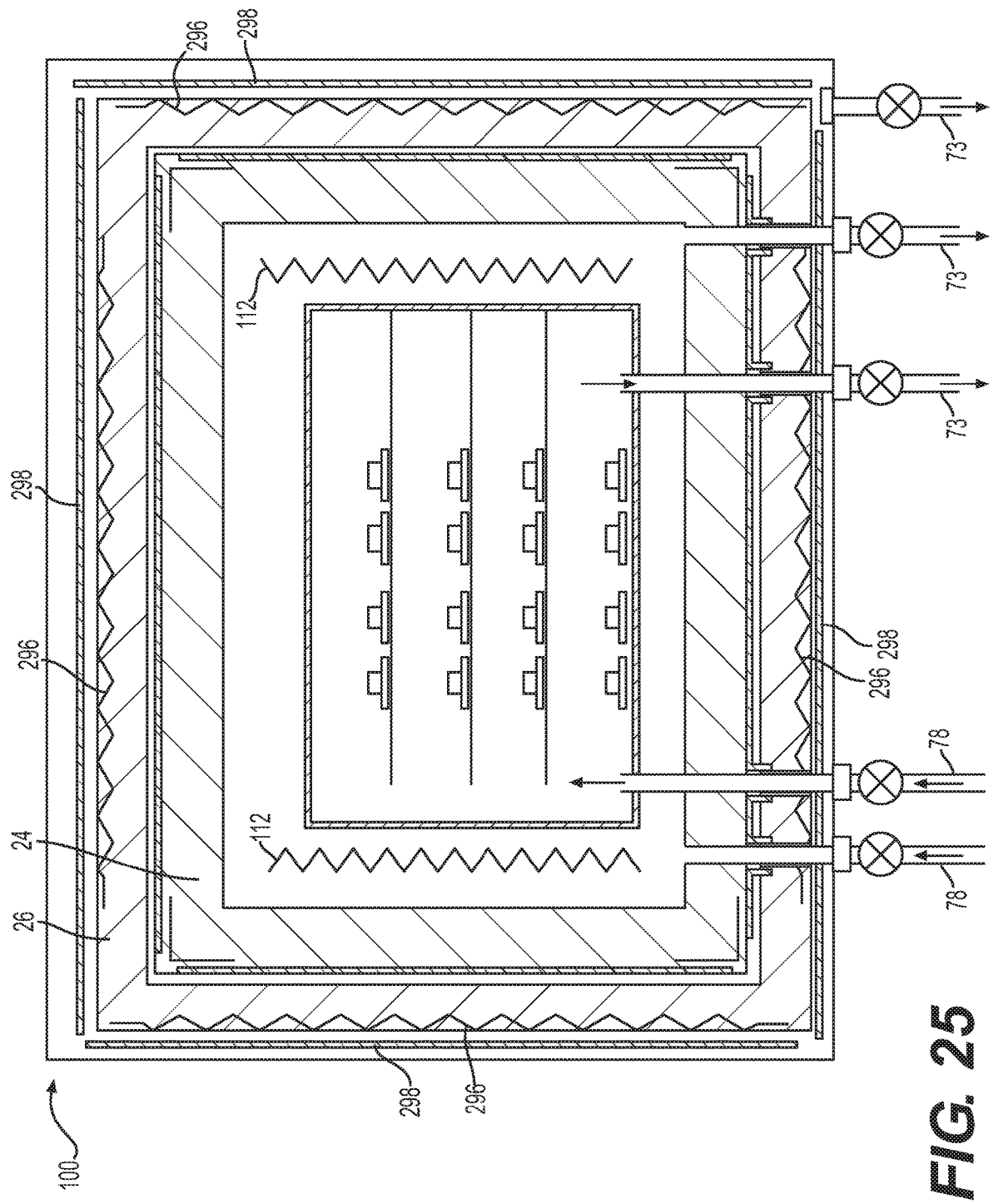
FIG. 25 is a cross-sectional view of a furnace having outer heaters.

In at least some aspects, the use of outer heaters 296 may reduce contamination in embodiments that do not include a barrier 126 (although a barrier 126 as shown in, for example, FIGS. 3 and 8-11B, may be included if desired). Heaters 296 may generate heat to condition outer insulation 26 before a sintering process to remove contamination such as moisture and/or binder. For example, prior to a sintering or debinding operation, inner and outer heaters may each generate temperatures within ranges of about 80 degrees C. and about 400 degrees C. for a predetermined period of time (e.g., one hour, two hours, etc.) to facilitate the removal of moisture, binder, or other contaminants via heat conditioning. If desired, vacuum may be operated during this condition to further assist removal of contaminants via vacuum lines 73. The heaters 112 and outer heaters 296 may be operated at the same or similar temperatures, or at significantly different temperatures. For example, heaters 296 may apply less heat as compared to heaters 112. While heat conditioning may be employed in furnaces 100 without a vapor and moisture barrier 126, heat conditioning may also be employed when a barrier 126 is present. Moreover, while FIG. 24 illustrates vacuum pumping of outer insulation 26 via a vacuum line 73, vacuum pumping of inner insulation 24 may also be performed via a vacuum line 73 in fluid communication with insulation 24. Additionally, as shown in FIG. 25, configurations of furnace 100 that include outer heaters 296 may facilitate the use of a barrier 126 with discontinuous barrier seals 164. Thus, outer heaters 296 may be employed in furnaces without a moisture barrier 126, with a moisture barrier 126 with discontinuous seals 164, or with a moisture barrier 126 with continuous seals or hermetic seals. Moreover, outer heaters 296 may further be used together with tube seals that are continuous or discontinuous, according to any of the tube seal configurations described herein.

III. Solution 2: Vacuum Retort

III-1. Structure of Furnace Having Vacuum Retort

Figure 26:
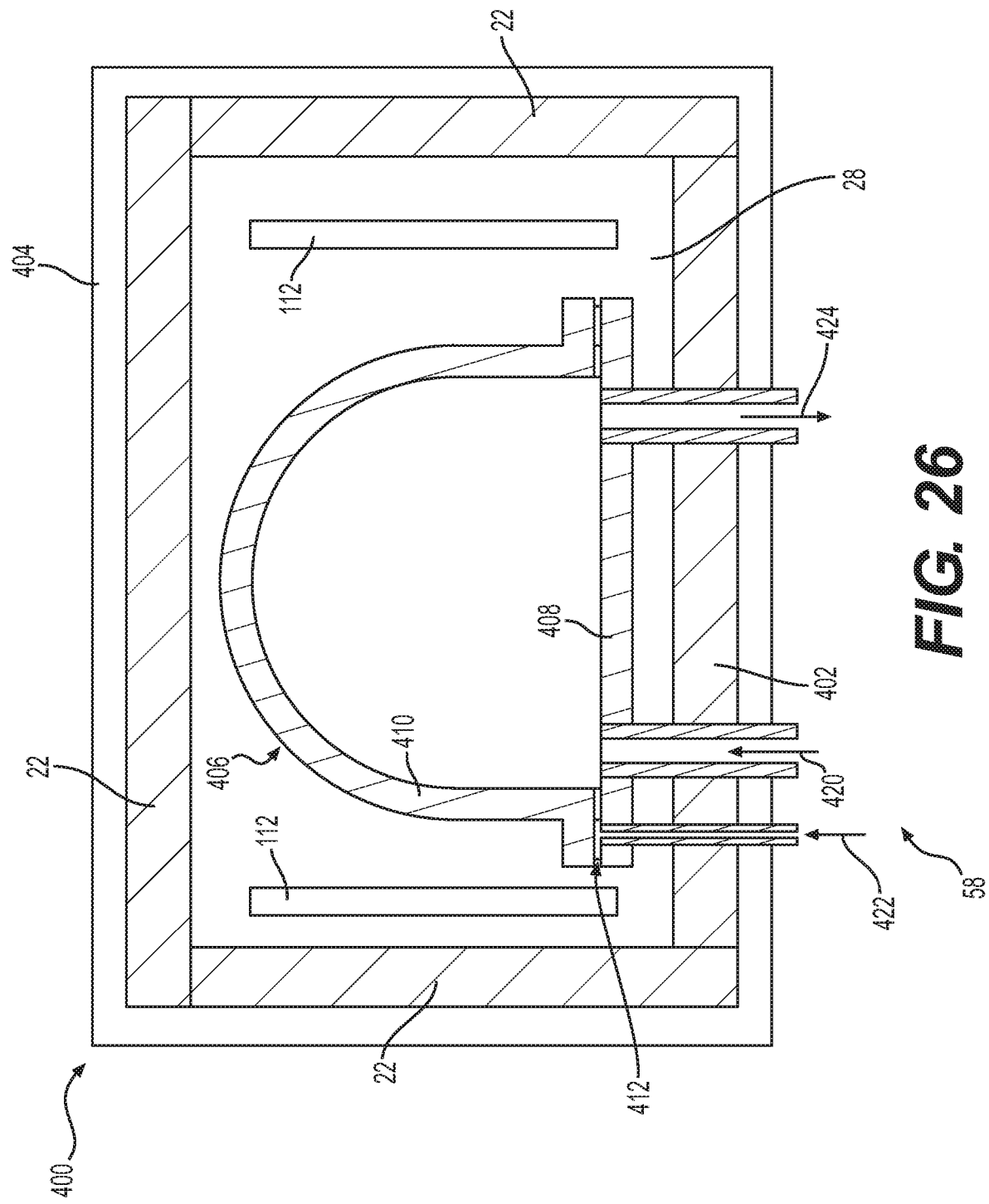
FIG. 26 is a cross-sectional view of a furnace including a vacuum retort.

FIG. 26 illustrates a cross-sectional view of a furnace 400 that includes a vacuum retort 406. Furnace 400 and retort 406 may correspond to furnace 100 and retort 200 discussed above with respect to, FIGS. 12-14 and 16-22B, for example.

FIG. 26 illustrates a sealed retort or vacuum retort 406 in a furnace 400 having no vacuum chamber (e.g., no vacuum is applied outside of retort 406). Insulation 22 may be surrounded by and secured to a protective cover 404, such as a sheet metal box. In some aspects, protective cover 404 may be airtight but not capable of withstanding vacuum (e.g., may permit a flow of air therethrough). However, protective cover 404 may include a housing that has sufficient strength to withstand vacuum if desired, as described above with respect to vacuum chamber wall 32. Heaters 112 and insulation 22 may at least partially surround retort 406 so as to define a hot zone 28 defined by an inner-most layer of insulation 22, as described above. Insulation 22 may include one or more layers of exposed inner insulation 24 as described above. If desired, insulation 22 in furnace 400 may include one or more layers of isolated insulation 24 that is separated from an interior of furnace 400 by a moisture barrier 126. However, barrier 126 may be omitted, if desired, due to the isolation provided by sealing and providing vacuum to retort 406 itself Retort 406 may include a non-porous material, for example sintered SiC (e.g., sintered alphas SiC such as Saint-Gobain Hexalloy), alumina, reaction-bonded siliconized SiC (RB Si SiC), or any suitable non-porous refractory materials, such as nitride-bonded SiC. Retort 406 may include mullite (or other high-temperature ceramics), 310S (or other refractory metals), or nickel alloys. In at least some embodiments, refractory materials with a higher reactivity may be employed in the retort, such as tungsten or molybdenum. When using materials with higher reactivity, it may be beneficial to surround retort 406 with an inert atmosphere, e.g., by placing the retort and insulation (e.g., an insulation pack) within an airtight protective cover or housing 404. In exemplary embodiments, for somewhat lower sintering temperature, the concepts herein may apply for retorts made of nickel alloy and/or high temp steel, such as 310S. For example, a furnace for sintering silver may be operable at relatively lower sintering temperatures, such as about 950 degrees C., with a sealed metal retort (including, for example, 310S) in accordance with the concepts disclosed herein. Retort 406 may provide for very high-performance sealing of a retort seal 412 (which may form a main retort seal) even at sintering temperatures. Retort seal 412 may include an inner seal (e.g., formed by a gasket) and a Peclet seal 416, which are described below and illustrated in FIG. 29, for example. In order to establish a Peclet seal, sweep gas 422 may be pumped to retort seal 412. In some aspects, sweep gas 422 may be provided by one or more pumps of environmental control system 58 to ensure that the flow of sweep gas 422 within seal 412 has a sufficient velocity such that the flow of inert gas suppresses diffusion of outside air towards the inner volume of retort 406.

Sweep gas 422 may be a laboratory grade inert gas, such as Argon. In some aspects, leakage of sweep gas 422 to an interior of retort 406 may be harmless or even helpful to sintering. For example, a hydrogen-bearing forming gas may be included in sweep gas 422 to provide benefits to sintering should sweep gas 422 leak into retort 406. In some aspects, a small quantity of air may leak through seal 412 to an interior of retort 406. However, this finite amount of leak or diffusion of air from the outside of retort 406 may be kept sufficiently small due to the use of sweep gas 422. Thus, contaminants may be prevented from entering retort 406 in quantities sufficient to adversely affect the quality of parts processed within furnace 400 to, for example, provide for a sintering atmosphere having purity of parts per million, parts per billion, or even more pure. Additionally, atmosphere within retort 406 may be controlled by the application of process gas 420 and vacuum applied to remove effluent 424.

FIGS. 27-29 illustrate exploded, assembled, cross-sectional, and detail views, respectively, of an exemplary configuration of retort 406. As illustrated in FIG. 27, retort 406 may include a removable retort body 410 having any appropriate shape (e.g., a dome shape as illustrated in FIGS. 27 and 28, a square or rectangular shape, or a cylindrical shape). Retort base 408 may have any suitable shape to sealingly receive retort body 410. A vacuum gasket 414, which may be a sacrificial gasket replaceable after each use or after a predetermined number of uses, may be positioned between retort body 410 and retort base 408. Gasket 414 may form an inner seal established with a ring of graphoil gasket material, ceramic fiber gaskets, other refractory layered and/or fibrous materials, for example. While graphoil gaskets may be relatively permeable (or leaky) when used in vacuum, unlike other sealing materials, graphoil gaskets can withstand extreme temperatures, e.g., temperatures in excess of 1,400 degrees C. Retort 406 may be sized to receive an approximately 0.1 inch to approximately 0.40 inch radial width vacuum gasket 414. In some aspects, gasket 414 may have a thickness of about 0.001 inches to about 0.005 inches, or about 0.005 inches to about 0.05 inches. In particular, gasket 414 may have a thickness between about 0.05 inches to about 0.1 inches.

One or more sweep gas conduits or Peclet tubes 426, and one or more process gas conduits or tubes 428, may be connected to plate 408 and sealed according to any suitable manner described herein. When a plurality of Peclet tubes 426 are included, a first Peclet tube 426 may be configured to supply sweep gas 422 to Peclet seal 416 (FIGS. 28, 29), while a second Peclet tube 426 may apply vacuum and remove sweep gas 422. However, in at least some aspects, a plurality of tubes 426 may each supply sweep gas 422. Similarly, process tubes 428 may supply process gas 420 (which may be the same gas as sweep gas 422 or a different inert gas) to an interior of retort 406, while one or more additional process tubes 428 may be connected to a vacuum pump to remove effluent 424. Sweep gas groove or channel 444 may extend so as to surround vacuum gasket 414. In at least some aspects, a first tube 428 may supply sweep gas for the Peclet seal, while a second tube may be employed to sample and/or monitor the purity of sweep gas 422 for the purpose of performing in situ diagnostics such as monitoring the condition and/or performance of the Peclet seal.

Figure 31:
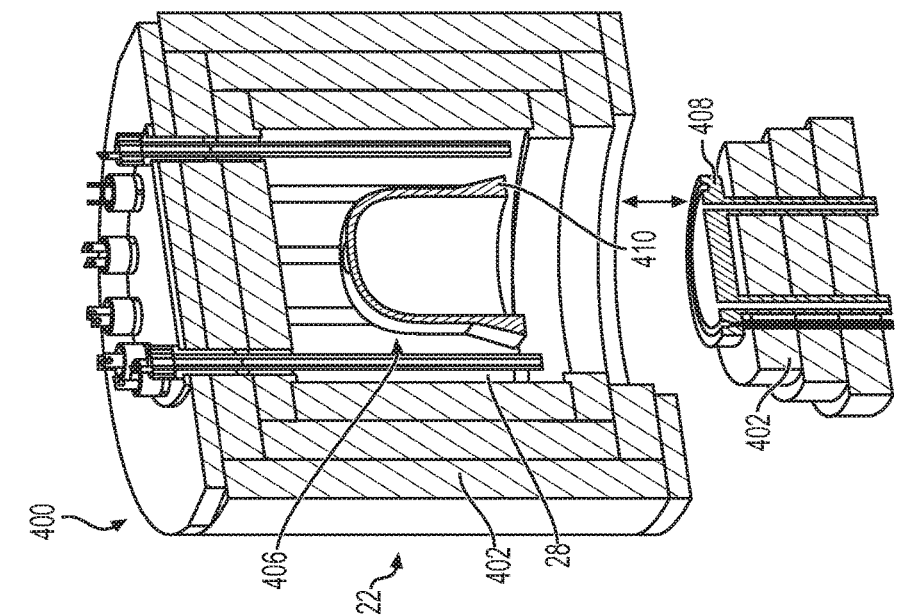
FIG. 31 is a view of the vacuum retort of FIG. 30 in an open position.
Figure 30:
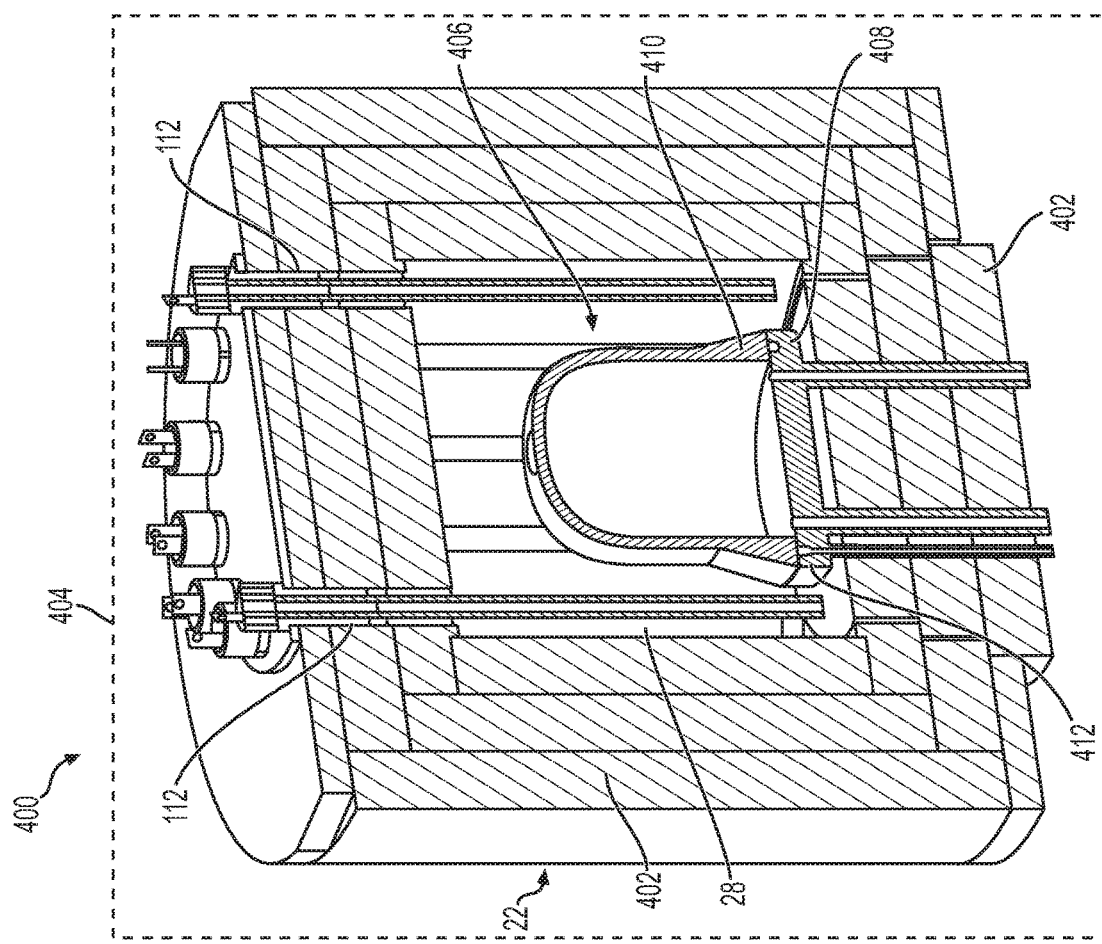
FIG. 30 is a cross-sectional perspective view of a vacuum retort positioned within a furnace.

FIGS. 30 and 31 are cross-sectional perspective views illustrating an exemplary configuration of a furnace 400, including approximately cylindrically-extending insulation sections 402 (e.g., non-sealed or exposed insulation, corresponding to insulation 24), and heaters 112. Insulation 402 may be formed of rigid boards of alumina fiber insulation. Heaters 112 may be SiC furnace heaters (e.g., helical resistive furnace heaters). Various furnace heaters may be employed, including nickel alloys including Kanthal wire, or other known refractory heater materials. In some aspects, while SiC heaters may be employed, the materials of the heaters are not limited to SiC. As described above, a protective cover 404 may be provided so as to surround insulation 402 and retort 406. If desired, protective cover 404 may be air-tight, and may be supplied with an inert gas.

As shown in FIG. 31, retort 406 may be loaded by raising and lowering retort base 408 with integral insulation 402. In such an embodiment, retort body 410 may be secured to insulation 402 or to another component of furnace 400. This may be performed by disconnecting tubes 426 and 428, for example. Alternatively, retort body 410 may be lifted and separated from retort base 408, together with a portion of insulation 402, by a suitable lifting mechanism.

III-2. Peclet Sealing

Figure 33:
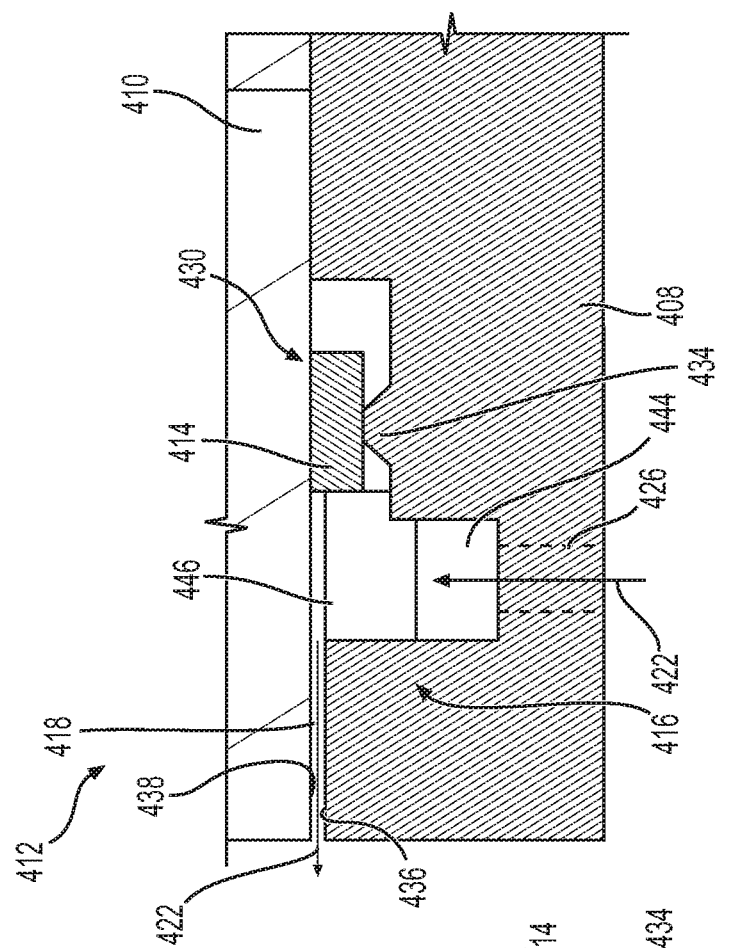
FIG. 33 is a cross-sectional detail view of a Peclet seal of the vacuum retort seal.
Figure 32:
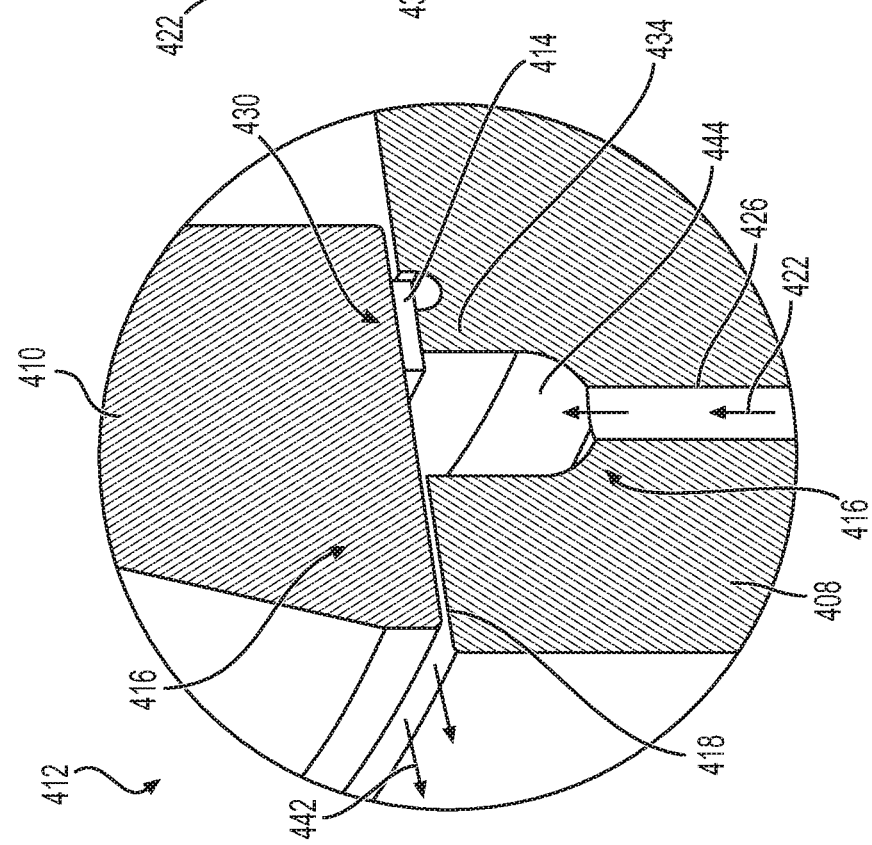
FIG. 32 is a perspective cross-sectional detail view of a vacuum retort seal.

FIGS. 32 and 33 illustrate cross-sectional views showing features of retort seal 412, which may include an inner seal 430 and an outer seal 416. Inner seal 430 may be formed by vacuum gasket 414, while outer seal 416 may be formed by a seal configured to receive a flow of sweep gas including an inert and/or process gas referred to herein as a "Peclet seal." In one aspect, for example by way of blocking diffusion by gas flow, outer seal 416 may have a higher isolating performance as compared to inner seal 430. For example, vacuum gasket 414 of inner seal 430 may be formed of graphoil (e.g., a seal formed of a plurality of thin layers of highly-compressed graphite stacked along an axial direction of the gasket once assembled on retort 406), as described above. In order to establish inner seal 430, a graphoil gasket formed of foil having a thickness of 0.015 inch having a 10 inch diameter may be compressed (or crushed) by a 1 mm wide flat ridge or gasket ledge 434 with about 10 to about 100, or about 100 to about 1,500 pounds of force which, in at least some embodiments, may be provided by the vacuum. Thus, the vacuum force itself may provide an adequate source of force to compress gasket 414. Such a graphoil seal in may be fully crushed under such circumstances (e.g., beyond the point of elastic recovery) and capable of achieving a leak rate of between about 0.01 and about 1 Torr-liters per second (TL/s), which corresponds to between approximately 0.001 and 1 standard liters per minute (SLM), which may be considered high leak rates for high vacuum applications. Typically, leak rates of about 1 Torr liter per second to about 0.001 Torr liter per second may be considered incompatible vacuum processes. However, the use of Peclet sealing as an additional seal outside of such a leak may isolate the leak itself from an outside ambient environment, which may result in surprisingly high purity, regardless of vacuum level. For example, implementing the current disclosure has resulted in a vacuum sintering atmosphere having a purity level of 1 Parts Per Billion (PPB), even with a gasket leak rate of 1 Torr liter per second.

The inner seal 430 may be established, at least in part, by clamping gasket 414. This clamp may be performed without the use of a clamping mechanism and instead may employ the force of the vacuum applied to retort 406 (e.g., about 15 PSI of force) to compress and crush gasket 414. It is noted that for a 10 inch diameter gasket 414, approximately 1,200 pounds of force may result from 15 PSI of vacuum force produced in order to maintain a high vacuum. A system 10 employing furnace 400 as shown in FIGS. 26-33, for example, may be configured to establish and maintain hard vacuum (e.g., 10 Torr or less) would result in roughly 1,000-1,200 pounds of force for gasket 414, which may correspond to approximately 37 pounds per linear inch along gasket 414. In one aspect, gasket 414 may be crushed by about 30% or by about 50%, corresponding to a reduction in thickness of about 30% or by about 40%, respectively. In particular, gasket 414 may be crushed by an amount between about 50% and about 60%. The above-described exemplary amounts of force may be sufficient to secure and seal base 408 and body 410 of retort 406 without the need for a physical clamping mechanism. Thus, if desired, retort 406 may be formed without a clamp and/or without a structure such as a plate, flange, etc., for supporting a clamp. For retorts for use in both vacuum and non-vacuum applications, or for retorts used in vacuums above about 300 Torr, the retort may be pressed down on from above from outside the insulation, e.g., using a push rod or other structure that extends through one or more layers of insulation. An optional, sharper knife edge may be included in ledge 434 to provide improved sealing.

Sufficiently high levels of sealing may be achieved by supplying sweep gas 422 to circumferentially-extending groove or channel 444 such that sweep gas 422 may flow around an outer periphery or perimeter of the retort as described above with respect to FIGS. 22A-22C. Although groove 444 is referred to as circumferentially-extending, it is understood that the shape of groove 444 may ultimately depend on the shape of the perimeter of retort 406, e.g., a rectangular-shaped retort 406 may result in a rectangular-shaped groove 444. Accordingly, although the language used in reference with this exemplary embodiment may reflect the cylindrical shape of this particular embodiment, the shape of the retort and accompanying structures is by no means limited in possible shapes or configurations. With reference to FIG. 33, retort body 410 may include a retort body face 438 that opposes a face of retort base 408. Outer seal 416 may include a radially-extending channel 418 that connects a clean side (sweep gas groove or channel 444) to a relatively dirty side (an exterior of retort 410). Channel 418 may be provided at one or more circumferential positions of retort 406, or may extend around an entire periphery of retort 406.

Figure 34:
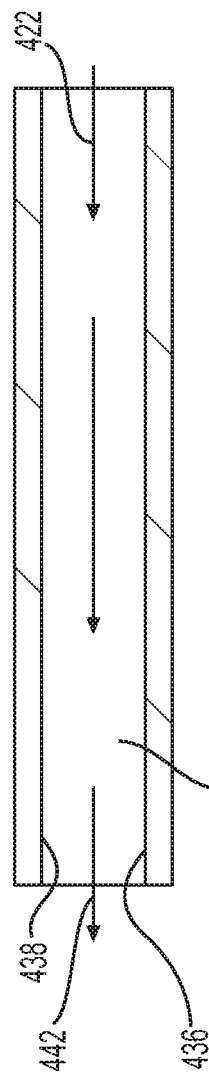
FIG. 34 is a schematic view illustrating an operation of a Peclet seal.
Figure 35:
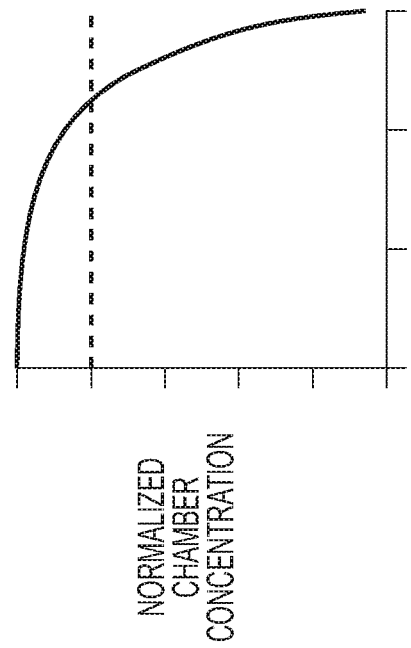
FIG. 35 is a chart illustrating a plot of normalized chamber concentration as a function of Peclet number.

With reference to FIGS. 34 and 35, the performance of Peclet seal 416 may be evaluated in terms of the unitless Peclet number, which corresponds to the product of gas velocity and channel length divided by diffusivity. FIG. 34 is a conceptual representation of channel 418 and a flow of sweep gas 422 therethrough Applicant recognized that in order to achieve uniform sealing for these Peclet gap seals along the entire perimeter, it may be desirable for the conductance of the groove 444, that feeds the seal, to be about 10 to about 100 times the fluidic conductance of the overall Peclet gap itself. This may prevent or reduce pressure drops along groove 444 and promote uniform pressure along the perimeter of the Peclet seal. It is noted that Peclet gap seals are, generally speaking, sensitive to variation in gap size, and good sealing performance may be achieved when gap size variations are significantly smaller than the gap itself. For example, Peclet seals of the current disclosure may provide improved sealing when spatial fluctuation is about 20% or less. Spatial variation in the Peclet gap seals may occur due to warping by thermal shock, inadequate machining, or other unwanted deviations from flatness and parallelism between the gap surfaces. In exemplary embodiments, an intervening porous material 446 having a fluidic conductance of $1/10^{th}$ to about $1/1000^{th}$ compared to the fluidic conductance of the Peclet gap may be imposed between the Peclet gap (e.g., channel 418) and groove 444, such that intervening porous material may substantially mitigate and/or eliminate sensitivity to Peclet gap variation since the porous impedance may dominate the distribution of flow along the circumferential perimeter of the Peclet gap. In exemplary embodiments, a porous medium, such as graphite, porous nitride bonded SiC, having porosity of about 0.001 Darcy to about 0.0001 Darcy. Various grades of graphite, porous SiC, porous ceramic, or porous Nitride-bonded SiC may be configured to provide a porosity of about 0.001 Darcy to about 0.0001 Darcy. Such a porous medium may provide adequate compensation to allow for 50%, and in some instances, up to 100%, variations in Peclet gap size. In some instances, without intervening porous material 446, groove 444 may have substantially greater conductance than the Peclet gap to ensure uniform pressure along circumference of the Peclet gap. In the event of substantially uniform pressure along the circumference of the Peclet gap, the circumferential distribution of flow rate through the Peclet gap may be dominated by the Peclet gap size and may vary locally according to gap size by a factor of $1/gap^3$. Following the above, if the flow rate through the Peclet gap drops in one region, the flow velocity in that region may be lower and the Peclet sealing may degrade proportionally in that region. By contrast, with intervening porous material 446 and the same overall flowrate as above, the uniformly-distributed impedance provided by intervening porous material 446 may dominate the varying impedance of the Peclet gap, promoting uniform gas flow along the circumference of the Peclet gap.

With reference to FIGS. 34 and 35, the performance of Peclet seal 416 may be evaluated in terms of the unitless Peclet number, which corresponds to the product of gas velocity and channel length divided by diffusivity. FIG. 34 is a conceptual representation of channel 418 and a flow of sweep gas 422 therethrough. Peclet sealing may be conceptualized as a result from the flow of a relatively clean, pure gas (e.g., sweep gas 422 or process gas) that is provided at a sufficiently uniform and rapid rate so as to overwhelm diffusion of contaminants upstream of the flow of the pure gas. As an example, a relatively long tube having a flow of about 10 feet per minute to about 50 feet per minute, or about 50 feet per minute to about 100 feet per minute, or in particular, over 100 feet per minute, may be expected to inhibit diffusion, especially when the flow of clean gas is relatively laminar over a particular length of the tube. In some aspects, the longer the length of the Peclet flow channel, the more effective the Peclet isolation. While Peclet seals may be formed by Peclet gaps, as described herein, tubes or conduits may also be configured to create Peclet seals, such that, for a given amount of flow, longer and thinner conduits may provide relatively improved isolation.

The above description of Peclet sealing may be understood and quantified as illustrated in FIG. 35, which is a chart showing a normalized chamber concentration (e.g., of contamination from a relatively dirty side or an exterior of retort 410) as a function of Peclet number. A maximum value of normalized chamber concentration may correspond to 100% concentration within retort 410, while the dashed line represents a maximum desired concentration within the chamber of retort 410. Peclet number may correspond to: $Pe = u \times L/D$, where Pe represents Peclet number, u represents average velocity of sweep gas within a tube or channel, L represents the length of the tube, and D represents the diffusivity of the species in question (e.g., a source of contamination). Increased Peclet number may be associated with increased sealing. Thus, as velocity or tube length increases, sweep gas 422 may more effectively impede diffusion of outside air, which may include contamination. Accordingly, for a given gas flow velocity, the Peclet number can be increased by using a thinner or longer channel 418. Taking, for example, a 9 inch (about 22.9 cm) retort, a 1 cm channel length with a 25-150 μm thickness is estimated to achieve isolation on the order of parts per million of outside "dirty" or contaminated gas, as compared to inside "clean" gas. Increasing gas velocity and increasing tube or gap length (e.g., the length of channel 418) may be associated with increased performance.

In some aspects, outer (Peclet) seal 416 (see, e.g., FIGS. 32 and 33) may include a channel 418 having a length of at least about 1 cm from an interior (clean side) to an exterior (dirty side). A gap of channel 418 defined by faces 436 and 438 may be within a range of between about 0.001 inch to about 0.010 inch or within a range of about 0.002 inch to about 0.005 inch. Thus, outer Peclet seal 416 of retort 406 may provide for approximately 1 ppm isolation with respect to outside air. Said differently, approximately one molecule of air (which may contain a relatively higher amount of contamination as compared to sweep gas 422) for every million molecules of sweep gas 422 may be present in channel or groove 444. Approximately 0.1 to approximately 2.0 standard liters per minute (SLM) of sweep gas 442, or approximately 0.1 SLM to approximately 1.0 SLM, may be sufficient to achieve such isolation. The sweep gas may expand so that the actual flow within the gap of channel 418 may increase even while the mass flow rate remains constant or decreases. In configurations where graphoil gasket 414 has a relatively large leak rate, such as approximately 0.1 Torr-liters per second (TL/S), it is expected that 0.01 SLM of 1 ppm contaminated sweep gas enters the system, which would correspond to approximately $10^{-9}$ SLM of outside air. Such contamination may be even further diluted by process gas 420. For example, a flow of process gas 422 of 1 SLM may dilute the $10^{-9}$ SLM yet further to reach dilution on the order of parts per billion of outside air relative to process gas.

III-3. Atmospheric or Low-Vacuum Configuration

Figure 37:
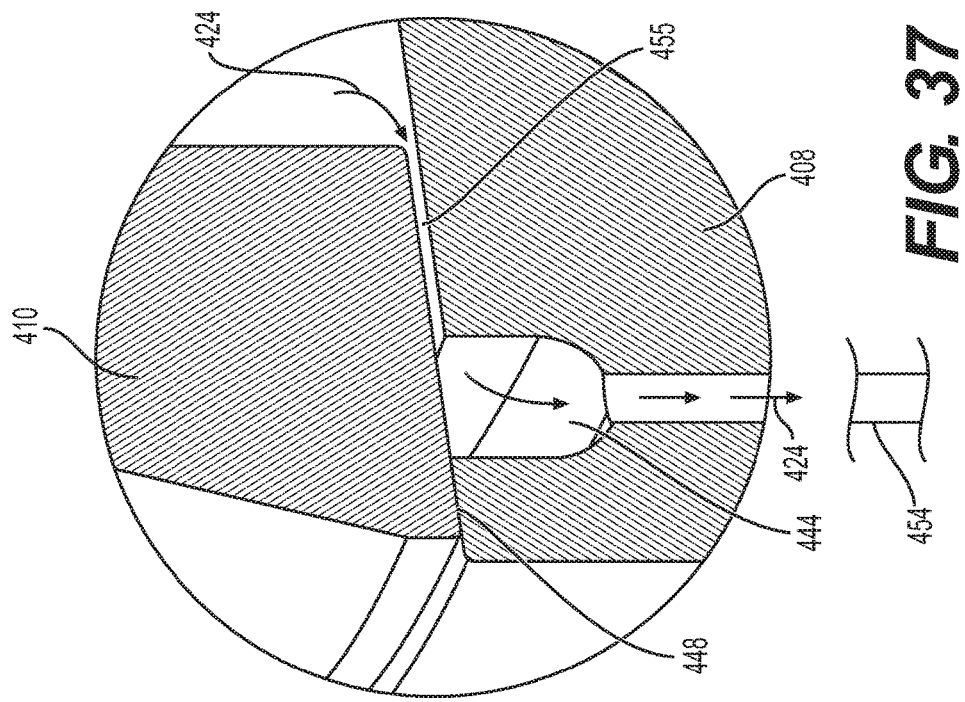
FIG. 37 is a cross-sectional detail view of a retort seal of the moderate vacuum or atmospheric retort of FIG. 36.
Figure 36:
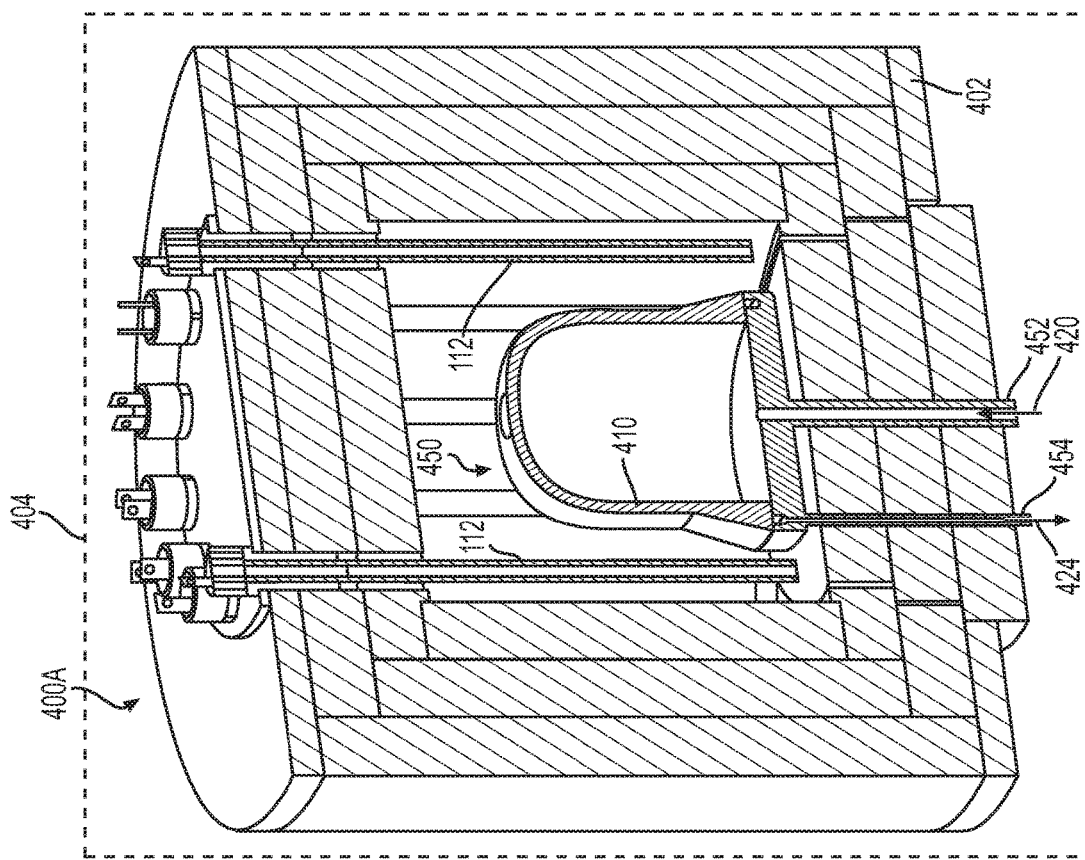
FIG. 36 is a cross-sectional perspective view of a moderate vacuum or atmospheric retort and furnace.

FIGS. 36 and 37 illustrate a furnace 400A that may be employed at moderate vacuum, atmospheric, and/or slightly positive pressures. For example, furnace 400A may be used at vacuum of about 300 Torr. As illustrated in FIG. 36, furnace 400A may include a retort 450 in communication with an environment control system similar to system 58 (FIG. 1) to provide a supply of process gas 420 via a gas inlet tube 452. A vacuum or gas outlet tube 454 may extend from retort 450 to remove effluent 424 (which may contain a mixture of process gas 420 and offgas from parts 90) from furnace 400A. As best shown in FIG. 37, retort 450 may include a channel or groove 444 separated from the interior of retort 450 via an inner channel 455 which serves as a Peclet seal to isolate the inside of the retort from groove 444 such that a majority of gas that leaks from an outside of retort 450 into groove 444 may be isolated. In one aspect, channels 444 and 455 may form an inner retort seal. An outer seal 448 of retort 450 may be formed by a lap seal or gasket. In embodiments where outer seal 448 includes a graphoil gasket, retort 400A may be enclosed within an at least partially airtight chamber indicated by dashed line 404, while insulation 402 may be flushed with a dry inert gas, such as argon or nitrogen.

III-4. Peclet Tube Sealing and Tube Extensions

Figure 39:
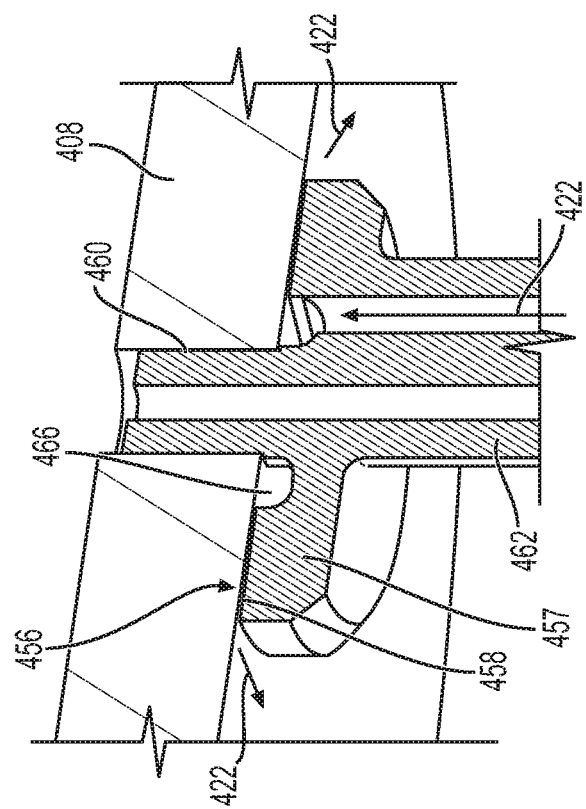
FIG. 39 is a cross-sectional view of the tube seal of FIG. 38.
Figure 38:
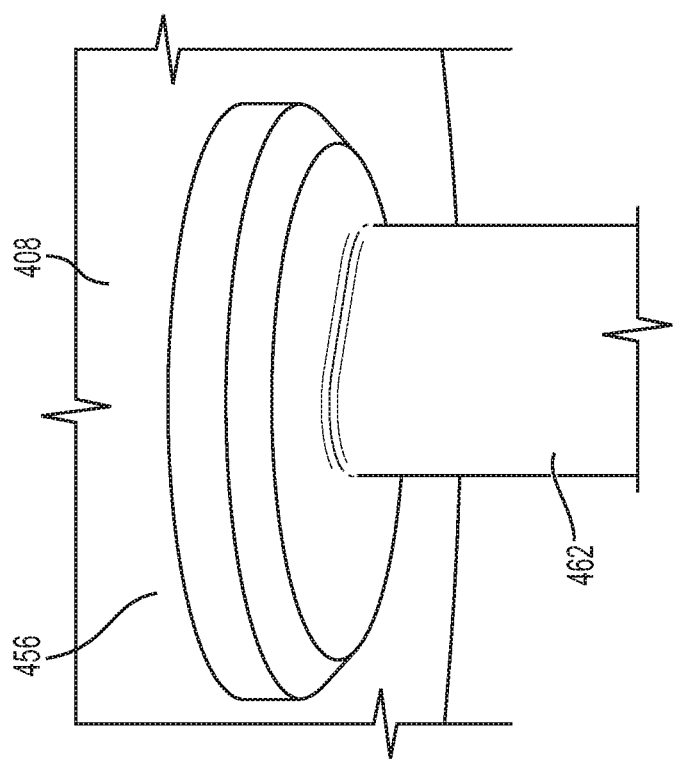
FIG. 38 illustrates a tube seal for a retort.

FIGS. 38 and 39 illustrate an application of a Peclet seal applied outside of a retort to form a Peclet tube seal 456. In one aspect, Peclet tube seal 456 may be employed for any of the conduits or tubes described herein, including tube seals between a component of a furnace (e.g., wall 32) and a component of environment control system 58, such as tube 73 for applying vacuum, and/or tube 78 for providing process gas 71 (shown in FIG. 1). In the example illustrated in FIGS. 38 and 39, Peclet tube seals 456 may be employed as retort tube or conduit seals between the retort and retort conduits or tubes 462, which may correspond to tubes 426 and/or 428 (see FIGS. 27 and 28) for providing sweep gas 422 and/or applying vacuum. FIG. 38 is a perspective view illustrating a Peclet tube seal 456 that forms a seal with respect to retort base 408.

FIG. 39 is a cross-sectional view illustrating a Peclet-sealed retort tube 462, which may supply process gas or apply a vacuum to an interior of retort 406. In order to achieve good sealing for sealed retort 406, retort tube 462 may receive a flow of sweep gas 422 that enters a circumferentially-extending sweep gas channel 466. While channel 466 may have an approximately circular-shaped path, other shapes, such as rectangular shapes, may also be employed as mentioned above. As described above with respect to Peclet seal gaps (e.g., a gap formed by channel 418, FIG. 33), Peclet channel 456 may have a gap or Peclet gap 458 defined between retort base 408 and a wall of a flange 457 of between about 0.001 inches to about 0.005 inches, or about 0.005 inches to about 0.010 inches. Sweep gas 422 may exit channel 456 via Peclet gap 458. In one aspect, an inner tube seal 460 may extend between retort base 408 and a proximal portion of retort tube 462 to form a relatively leaky joint (e.g., a leaky sinter bond or a high-temperature adhesive bond). However, contamination of an interior of retort 406 may be prevented or reduced via tube seal 456.

With reference to FIG. 40, retort tubes 462 may be secured to tube extensions 470. In one aspect, retort tubes 462 may be monolithic members that are brazed onto tube extensions 470. For example, monolithic members refers to retort tubes 462 that are part of the plate assembly formed from the same green part prior to sintering of the SiC. In some instances, unlike monolithic members, retort tubes 462 may be sinter-bonded onto base 408. This brazing may be accomplished by way of various known high-temperature braze alloys, such as gold alloys, copper alloys, and/or others available from Morgan Inc., for example (e.g., copper ABA braze foil available from Morgan Inc.). This copper or other brazing may form a braze joint 468 that may withstand temperatures of about 800 degrees C. or higher. Higher-temperature braze joints 468 may be formed by using Si powder and a graphite furnace that may be operable at about 1,000 degrees C., or even about 1,300 degrees C. Thus, maximum service temperature may be greater than 1,300 degrees C. when an inert atmosphere is provided, and about 900 degrees C. or higher for other conditions. In one aspect, the tubes 462 may have a length of between about 2 inches and about 5 inches and may be provided within insulation 22 (outside of the hot zone). In some aspects, retort tubes 462 with shorter lengths (e.g., lengths of between about 1.5 inches and about 3.0 inches, or lengths less than about 1.5 inches) may be employed. While shorter lengths may increase the temperatures that braze joint 468 experiences, the use of shorter tubes may be achieved with the use of SiC for the plate (base 408) and tubes 462.

IV. Solution 3: Contamination Prevention in Environmental Control System

Figure 41:
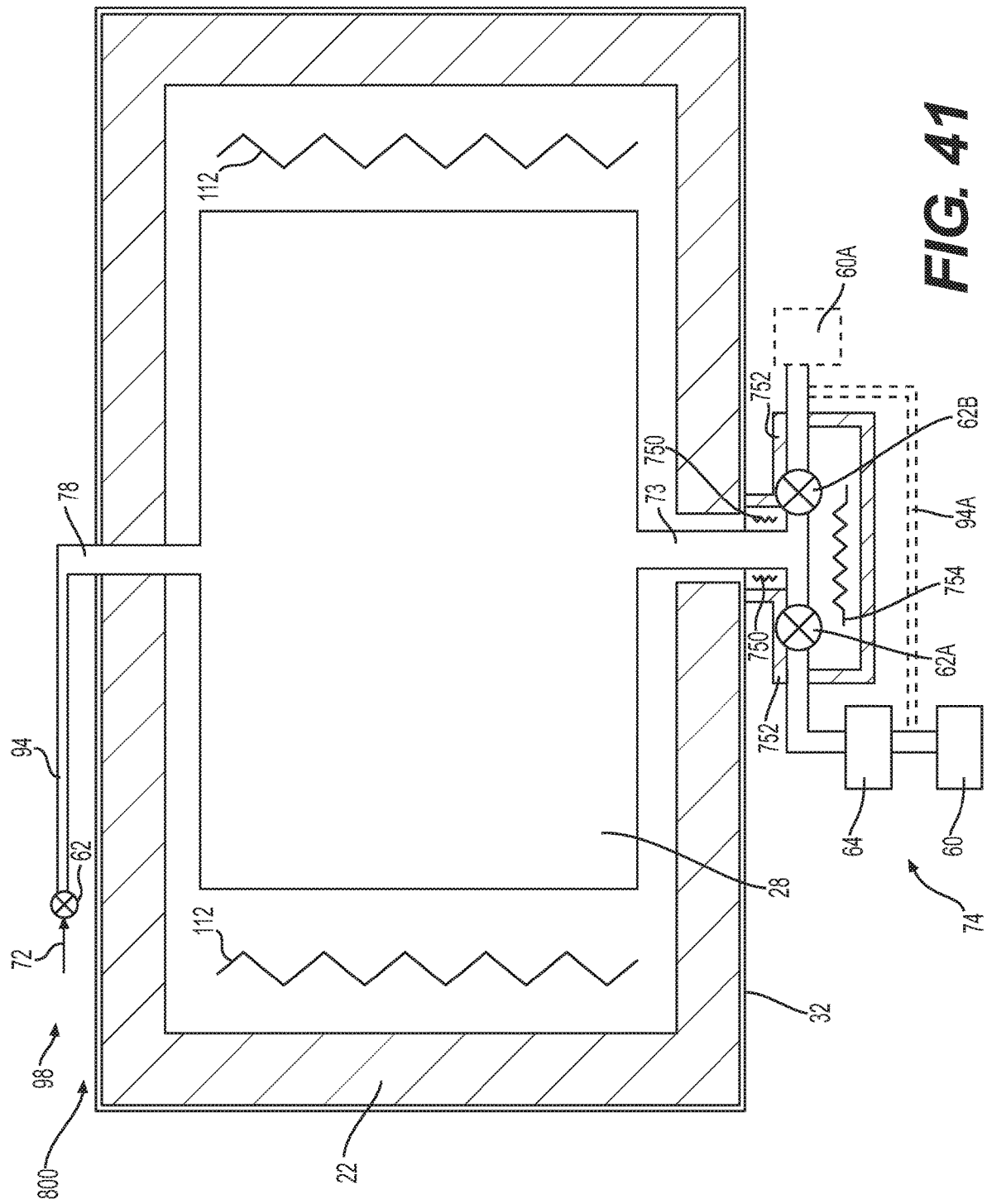
FIG. 41 is a partially-schematic cross-sectional view illustrating an exemplary furnace for reduction of binder contamination.

FIG. 41 illustrates an exemplary furnace 800 usable with furnace system 10 to reduce or eliminate binder contamination of components of inlet gas manifold 98 and/or of vacuum pumping manifold 74. While at least some embodiments described above may seal retorts against contamination, including contamination from binder materials, it may also be beneficial to prevent or mitigate contamination of one or more inlet or outlet conduits or tubes of the retort, in particular with respect to binder materials. For example, binder may not tend to condense in the sealed retort (e.g., 200) or vacuum retort (e.g., 406) described herein, for at least the reason that during thermal debinding, the retort may tend to be as hot (or hotter) than parts 90. Therefore, binder may not tend to adhere or absorb into the retort during debinding. As described with reference to FIG. 1, inlet gas manifold 74 may introduce process gas (e.g., gas 71 as shown in FIG. 1) from a gas supply line 72. As shown in FIG. 41, a valve 62 may be configured to control a flow of process gas 71 through process gas line 78. A tube or inlet line 94 may extend between supply line 72 and process gas line 78. As described above, a hot zone 28 surrounded by insulation 22 (e.g., insulation 24), may receive process gas 71 during thermal processing. One or more vacuum lines 73 of vacuum pumping manifold 74 may facilitate removal of process gas 71, together with volatized binder, and may apply vacuum pressure to hot zone 28. One or more valves 62, a binder trap 64, and vacuum pump 60 may be provided downstream of vacuum line 73.

In some aspects, binder trap 64, vacuum pump 60, and line 73 may tend to become contaminated with volatized binder released from parts being processed by the furnace during debinding processing. In some configurations, upstream components (e.g., portions upstream of work zone 28 with respect to process gas 71) may also tend to become contaminated during debinding and/or sintering. It is desirable to therefore isolate the interior of the sealed retort or the interior of the inner chamber of the above-described furnaces (represented as work zone 28 in FIG. 41) from the contamination.

Such contamination may be prevented or limited by forming inlet line 94 of inlet gas manifold 74 with a relatively small diameter and a relatively long length. For example, inlet line 94 may be formed with a length within a range of about 10 inches to about 30 inches. An inner diameter of inlet line 94 may be about 0.125 inch. As was described with reference to FIGS. 34 and 35, a conduit or tube may also be configured to create a Peclet seal such that, for a given amount of flow of clean gas, relatively longer and thinner conduits may provide correspondingly improved isolation. By employing a long and thin tube or line 94, the inlet may be isolated from the retort by exploiting Peclet sealing, similar to the manner described above. This sealing, as well as any of the other seals described herein, may be performed in the manner described in U.S. Provisional Application No. 62/853,561, filed May 28, 2019, the entirety of which is incorporated by reference herein. One or more systems and/or furnaces described herein may also include a catalytic converter or any of the features described in U.S. application Ser. No. 16/204,835, filed Nov. 29, 2018, the entirety of which is incorporated by reference herein.

Maintaining surfaces at debinding temperatures, or above debinding temperatures, may tend to prevent binder contamination of those surfaces. Thus, in order to prevent or limit binder contamination downstream of work zone 28 (e.g., in vacuum line 73 and downstream of vacuum line 73), one or more tube or line heaters 750 may be positioned adjacent to line 73. In one aspect, heaters 750 may generate heat so that a otherwise colder portion of line 73 (e.g., a portion of line 73 outside of work zone 28, or outside of vacuum chamber wall 32) is maintained at a temperature of above about 300 degrees C., above about 400 degrees C., and up to about 500 degrees C. One or more valves 62 may be provided downstream of line 73. Each of these valves 62 may be surrounded by valve insulation 752 and may be configured to operate at each temperatures of about 300 degrees C., 400 degrees C., or 500 degrees C. A valve heater 754 may be positioned adjacent to one or more of valves 62 to maintain these temperatures.

In the exemplary configuration of furnace 800 illustrated in FIG. 41, two valves 62 are provided. In one aspect, a first or debinding valve 62A may be opened (e.g., by command signals from controller 76 as shown in FIG. 1) to allow application of vacuum pressure via pump 60 during debinding processing, while the second or sintering valve 62B is maintained fully closed. During sintering processing, sintering valve 62B may instead be opened while the debinding valve 62A is maintained fully closed by controller 76. A separate sintering pump 60A may be provided for use only during sintering processing.

In some aspects, by maintaining elevated temperatures on line 73 during at least debinding, retention of volatized binder may be prevented or reduced, because the elevated temperatures may inhibit volatized binder from condensing or otherwise collecting on line 73. Similarly, the elevated temperatures of sintering and debinding valves 62 may prevent retention of volatized binder in the valves. Still further, as the sintering valve 62 is maintained fully closed during debinding, contamination of sintering valve 62 may be even further reduced. Thus, contamination may be significantly reduced when sintering valve 62 is opened during sintering processing.

In an alternate configuration, pump 60A may be omitted. In this configuration, an additional tube or line 94A may connect sintering valve 62B with vacuum pump 60. Line 94A may have the same or similar dimensions as line 94, and may be configured to provide fluid isolation (e.g., Peclet isolation) between pump 60 and sintering valve 62B. As was described with FIG. 34, a long thin tube with gas flow may provide Peclet sealing between a contaminated outlet and a clean inlet.

V. Exemplary Applications of Solutions 1-3

V-1. Retort Seal Combinations

FIGS. 42A-42E are cross-sectional views of portions of exemplary retorts 200 that represent embodiments of double retort seals that may be implemented with a sealed retort, including a sealed retort that is either hermetic or somewhat porous. In each of FIGS. 42A-42E, a left side represents an outside of the retort, which may be an environment immediately surrounding the retort at vacuum or at atmospheric pressure. This atmosphere may generally be inert (e.g., less than 1% oxygen, preferably less than 0.01% oxygen), regardless of the surrounding pressure, partial pressure, or vacuum pressure (e.g., within chamber wall 32). As described previously, the outer chamber 32 may form a vacuum chamber. Alternatively, outer chamber 32 may form an airtight chamber that, while not a vacuum chamber, may be sufficient to support an inert atmosphere inside chamber wall 32.

In each of FIGS. 42A-42E, the right side represents the inside of the retort, which is configured to receive parts 90. In each of FIGS. 42A-42E, the seal on the right represents an inner seal (and begins with 902), and the seal on the left represents an outer seal (and begins with 904). In each of the exemplary configurations illustrated in FIGS. 42A-42E, the retort may include a groove (not shown) between the seals and/or the gaskets may be sufficiently thick (e.g., about 0.05 inch to about 0.1 inch) to create a space between the seals such that no groove is required. As described above with respect to FIGS. 16, 17, 22A, 38, and 39, lap seals may be formed by opposing surfaces in direct contact with one another. Retort lap seals, may generally be formed by contact between surfaces that have been machined and/or ground to a relatively high degree of flatness. For example, in the case of graphite retorts, flatness may be about 0.001 inches to about 0.003 inches, about 0.003 inches to about 0.005 inches, etc. In the case of SiC or other ceramic retort materials, the flatness of lap seals or lap joints may be about 0.0001 inches to about 0.0005 inches, or about 0.0005 to about 0.0015 inches.

Figure 42A:
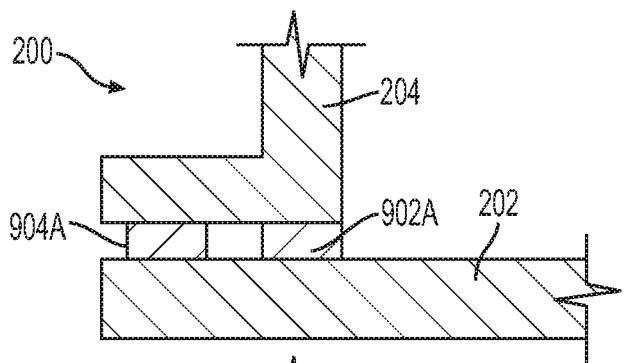
FIGS. 42A-42H are cross-sectional views of exemplary seal configurations.
Figure 42B:
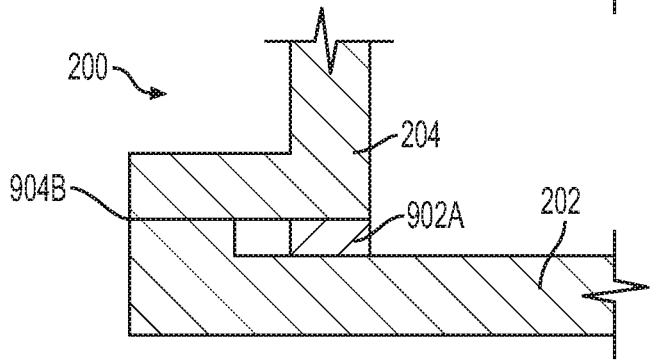
Figure 42C:
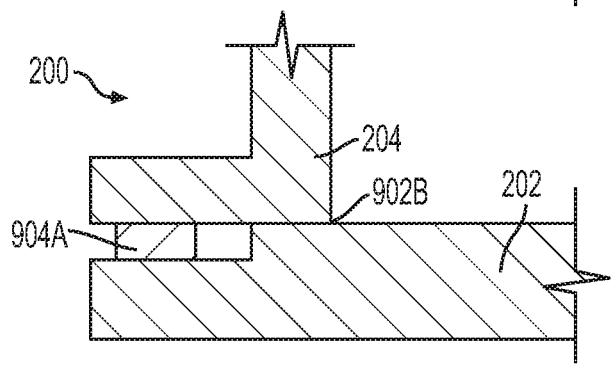

As shown in FIG. 42A, inner seal 902A and outer seal 904A may each be gasket seals. With reference to FIG. 42B, inner seal 902A may be combined with an outer lap seal 904B (see the discussion of lap seals above, e.g., with respect to FIGS. 5A and 5B, which describe barrier 126). FIG. 42C illustrates an inner lap seal 902B positioned inwardly with respect to an outer gasket seal 904A. As shown in FIGS. 42A-42C, a groove or space extending between the inner and outer seals 902 and 904 may be injected with sweep gas, for example, in the manner described above with respect to FIG. 22A. Alternatively, the space between inner and outer seals 902 and 904 may be vacuum pumped, with or without injecting sweep gas.

Figure 42D:
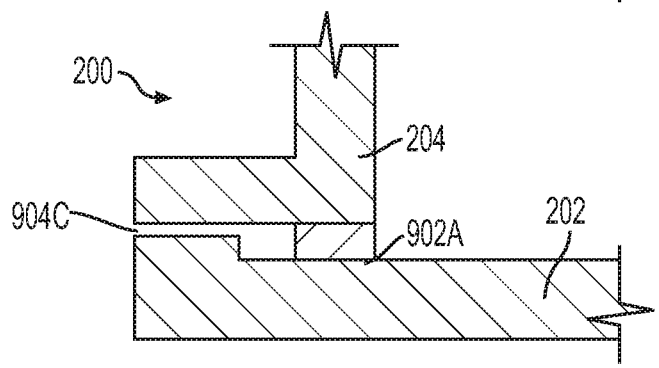
Figure 42E:
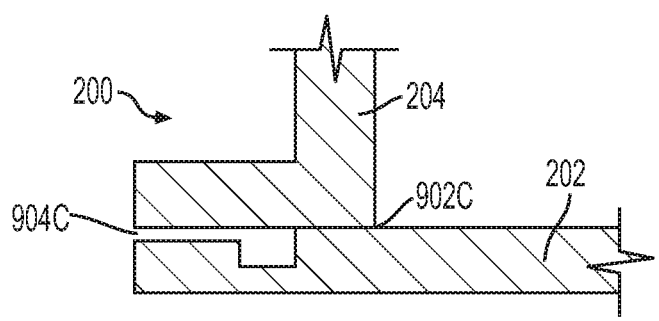

FIG. 42D illustrates an inner gasket seal 902A positioned inwardly of an outer Peclet seal having a Peclet gap 904C in accordance with the Peclet seals described above (e.g., with respect to FIGS. 32 and 33). FIG. 42E illustrates an inner lap seal 902C positioned inwardly with respect to Peclet gap 904C. Regarding the configurations of FIGS. 42D and 42E, sweep gas may be applied in the groove or space in accordance with previous descriptions of Peclet sealing. In each configuration including a gasket (e.g., gasket 902A, 904A), the gasket may be a graphoil gasket or another suitable high-temperature gasket, such as ceramic felt or fiber. Although not illustrated, here one or more additional outer seals may be included to form a third, a fourth (or more), inner and/or outer seals.

Figure 42F:
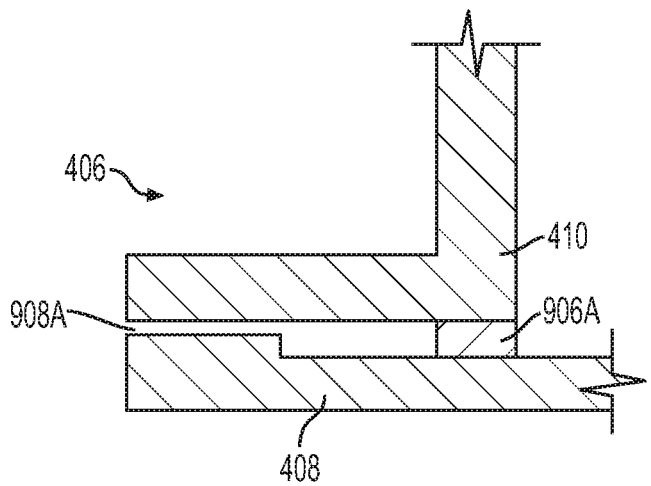
Figure 42G:
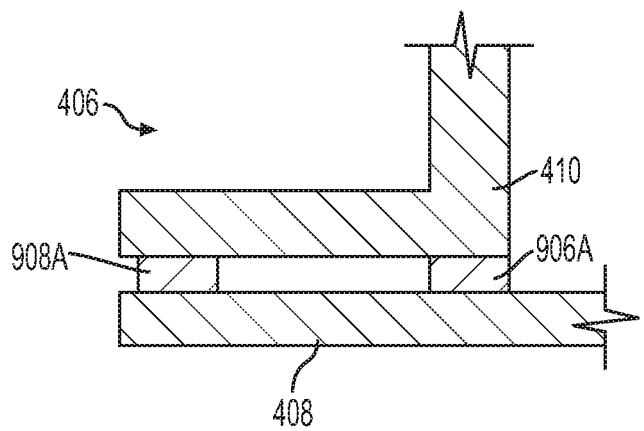
Figure 42H:
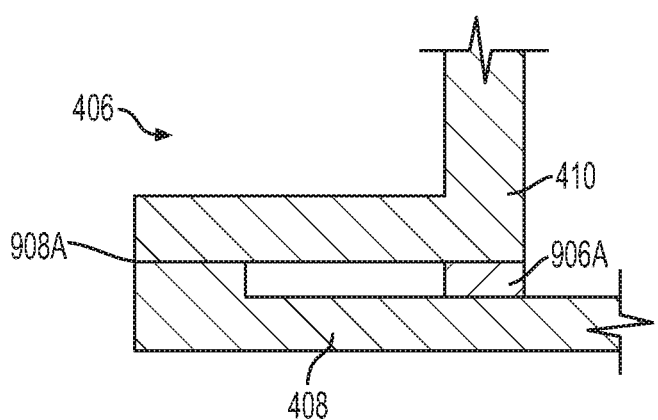

FIGS. 42F-42H are cross-sectional views of exemplary retorts 406 that represent embodiments of double retort seals that may be implemented with a hermetic, non-porous, vacuum retort. While these double seals may be configured to perform well with normal ambient air outside the retort, the purity of the atmosphere inside vacuum retort 406 in the configurations of FIGS. 42F-42H may optionally be enhanced by including an outer chamber as either an airtight chamber, or a vacuum chamber, for respectively surrounding the vacuum retort with inert air and/or vacuum. Similar to FIGS. 42A-42E, the right side represents the interior of retort 406 (which receives parts 90), while the left side represents the exterior of retort 406. The seal 906A in each of FIGS. 42F-42H represents an inner seal, and the seals on the left (beginning with 908) represent an outer seal. In each of the embodiments illustrated in FIGS. 42F-42H, there may be a groove (not shown) between the seals and/or the gaskets having a sufficient thickness (e.g., about 0.05 inch to about 0.1 inch) to create a space between the such that no groove is required.

FIG. 42F illustrates an inner gasket seal 906A positioned inwardly with respect to a Peclet seal having a Peclet gap 908A. FIG. 42G illustrates an inner gasket seal 906A positioned inwardly of an outer gasket seal 908B. FIG. 42H illustrates an inner gasket seal 906A positioned inwardly of an outer lap seal 908C. As shown in FIGS. 42G and 42H, a groove and/or space extending between the inner and outer seals 906 and 908 may be injected with sweep gas, for example, in the manner described above with respect to FIG. 22A. Alternatively, the space between inner and outer seals 906 and 908 may be pumped with or without injecting sweep gas. Regarding the embodiment illustrated in FIG. 42F, which was previously described with respect to Solution 2, sweep gas may be applied in the groove and/or space in accordance with previous descriptions of Peclet sealing. Each of the gaskets 906A or 908B may include a graphoil gasket or another suitable high-temperature gasket, such as ceramic felt or fiber. As described above with respect to FIGS. 42A-42E additional inner and/or outer seals may be included to form third seals, fourth seals, etc.

These configurations of FIGS. 42A-42H are included for descriptive clarity, do not describe every possible sealing mechanism or sealing combination, and are not intended as limiting. For example, while not illustrated in FIGS. 42A-42H, both inner and outer seals may be lap seals, as shown in FIG. 22A. Furthermore, it should be understood that multiple Peclet seals may be arranged in series in various configurations that may be contemplated by a person of ordinary skill in the art having this description in hand. There is no restriction on the number of additional seals, including additional Peclet seals.

V-2. Thermal Processing

The above-described systems and furnaces may be used for thermal processing of various types of parts 90 by one or more processes, such as debinding and/or sintering. In at least some aspects, parts 90 may be metallic parts produced by an additive manufacturing process, such as three-dimensional, printed, stainless steel parts. In particular, parts may include 17-4 alloy steel. The system and furnaces described herein may be useful for removing binding of such parts during debinding processing, and/or fusing powder particles from which the parts are formed during sintering processing.

Figure 43:
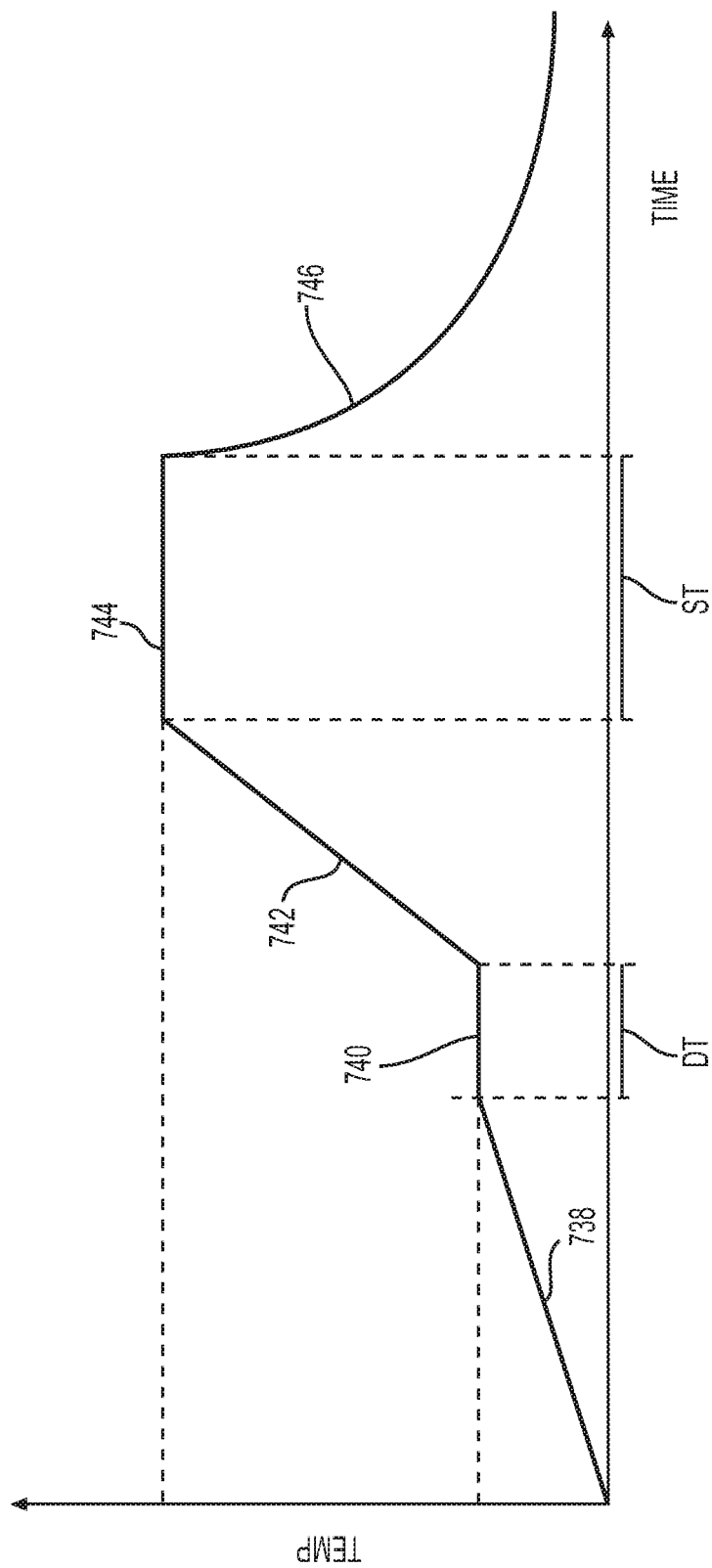
FIG. 43 is a chart illustrating exemplary thermal processing that may be performed by furnaces of the present disclose.

FIG. 43 is a chart illustrating an exemplary temperature cycle within hot zone 28 of furnace 100, 400, or 800 during thermal processing. While the thermal processing represented in FIG. 43 includes both debinding and sintering portions, debinding or sintering may be performed separately. At a beginning of thermal processing, the temperature may be relatively slowly elevated during ramp up, e.g., debinding ramp up 738. Debinding ramp up 738 may occur over a period of time of approximately eight hours, but may be shorter or longer depending on factors including: the size, number, and shape of parts 90, the type of binder present in parts 90, and a size of the powder particles that form each part 90. The rate at which temperature increases during ramp up 738 may increase or decrease accordingly.

At the end of ramp up 738, the temperature within hot zone 28 may reach approximately 500 degrees C. Once this temperature is reached, the temperature within hot zone 28 may be held approximately constant during a debinding dwell period 740 that occurs for a debinding dwell time DT. This dwell time DT may extend for approximately one hour, but may be shorter or longer based on one or more of the above-described factors.

At the conclusion of dwell time DT, the temperature within hot zone 28 may again begin to ramp up during a sintering ramp up 742. As can be seen in FIG. 43, the temperature within hot zone 28 may increase at a faster rate during sintering ramp up 742 as compared to debinding ramp up 738. The duration and rate of temperature increase during ramp up 738 may also be altered according to one or more of the above-described factors associated with parts 90. Once a predetermined sintering temperature has been reached at the end of sintering ramp up 742, this sintering temperature may be maintained approximately constant or in a steady-state condition, for sintering timing ST. ST may extend for approximately three hours, but may be longer or shorter for the reasons described above.

The use of gas and moisture barrier 126 and/or retort sealing, may reduce power required during one or more of debinding ramp up 738, debinding dwell 740, sintering ramp up 742, and sintering dwell time 744. For example, gas and moisture barriers 126 and/or retort sealing may facilitate the use of increased amounts of insulation (e.g., 5-inch thick alumina fiber or graphite fiber insulation) while preventing or inhibiting moisture and binder absorption and release from insulation 26. The sealed retort, with sealed inlet and outlet lines, may impede communication between contaminated insulation and the interior of the retort (and parts 90). While coating the retort may improve this sealing, slip-cast nitride-bonded silicon carbide may be employed in combination with the above-described sealing techniques. Hermetic or partially-hermetic retort seals, which may include the application of inert sweep gas to form a hermetic seal, may be useful in particular for retorts including refractory materials, such as sintered SiC, reaction-bonded SiC, or alumina. Such seals may include an inner seal (e.g., graphoil gasket seal) and an outer seal (e.g., Peclet seal). The use of a sealed chamber may reduce power requirements without the need to employ water cooling, while exposing a relatively low amount of insulation to hot zone 28.

At the conclusion of sintering dwell time 744, a cooling period 746 may occur. If desired, one or more post-sintering heat treatments may be performed on parts 90 in the same furnace, or in another furnace.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc., are either related to a specific example presented or are merely a general description of such a technique, arrangement, etc. Identifications of specific details or examples are not intended to be, and should not be, construed as mandatory or limiting unless specifically designated as such. Any to specifically describe a combination or sub-combination of components should not be failure understood as an indication that any combination or sub-combination is not possible. It will be appreciated that modifications to disclosed and described examples, arrangements, configurations, components, elements, apparatuses, devices, systems, methods, etc., can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software.

It is intended that the specification and examples be considered as exemplary only, with a true scope and spirit of the disclosure being indicated by the following claims.

What is claimed is:

1. A high-temperature high-purity vacuum furnace for heating parts over a range of high furnace temperatures, comprising:
    an arrangement of furnace insulation with furnace heaters disposed therein, that when heating parts define a hot zone therein that is heated by the furnace heaters to a temperature that exceeds 800C for at least a portion of a furnace heating cycle,
    an openable and closeable sealed vacuum retort that while closed is contained during the furnace heating cycle within the hot zone and is surrounded by an outside ambient air originating from outside the vacuum furnace, and is composed of a material that is:
    (i) non-porous and thus impervious to diffusion of outside gases, and
    (ii) capable of withstanding vacuum pressure throughout the furnace heating cycle;
    wherein the sealed vacuum retort while closed defines an inner volume as a hollow interior in fluid communication with an inlet tube for injecting process gas therein and an outlet tube for applying vacuum thereto;
    wherein each of the inlet tube and the outlet tube extends from the hot zone, towards an exterior of the furnace, through at least a portion of the arrangement of furnace insulation; and
    wherein when the retort is closed the inner volume is vacuum sealed from the outside ambient air by a main retort seal that is within the hot zone that blocks contamination, of the process gas within the inner volume, by leakage of outside ambient air into the inner volume, to a sufficient degree to prevent adverse effects on parts quality by the outside ambient air.

2. The vacuum furnace of claim 1 wherein at least a portion of the arrangement of furnace insulation is moveable to allow access to the inner volume of the sealed vacuum retort between furnace cycles.

3. The vacuum furnace of claim 1 wherein, during operation with the sealed vacuum retort closed, the main retort seal blocks contamination, of the process gas within the inner volume, by leakage of outside ambient air into the inner volume, to a sufficient degree such that contamination in the inner volume is equal to or less than one air molecule from the outside ambient air for every million molecules of process gas.

4. The vacuum furnace of claim 1 wherein, during operation with the sealed vacuum retort closed, a first process gas purity in the inner volume is comparable to a second process gas purity achieved in commercial ultra-high vacuum systems.

5. The vacuum furnace of claim 1 wherein the main retort seal divides the sealed vacuum retort into a retort base and a retort body, wherein at least one of the retort body and the retort base is removable to provide an open, unsealed, position for loading parts into the sealed vacuum retort, and replaceable to provide a closed, sealed, position, in which the sealed vacuum retort can be vacuum sealed by the main retort seal; and Wherein, during operation with the sealed vacuum retort in the closed position, the retort base and retort body are each surrounded by the arrangement of furnace insulation and thereby contained within the hot zone.

6. The vacuum furnace of claim 5 wherein a portion of the arrangement of insulation can support at least one of the retort body and retort base, for motion therewith.

7. The vacuum furnace of claim 5 wherein a portion of the arrangement of insulation can be connected to the retort body for movement therewith therewith when opening the sealed vacuum retort.

8. The vacuum furnace of claim 5 wherein the main retort seal includes an inner seal that employs a somewhat permeable, non-hermetic, vacuum gasket formed of a refractory material that can withstand a temperature range of the furnace heating cycle and the vacuum gasket exhibits a gasket leak, at least in part due to the permeability, and the outer seal acts as an additional seal that surrounds the inner seal and isolates the gasket leak from the outside ambient air.

9. The vacuum furnace of claim 8 wherein the vacuum gasket is a graphoil gasket.

10. The vacuum furnace of claim 9 wherein the outer seal is a peclet seal.

11. The vacuum furnace of claim 10 wherein the furnace system has no vacuum chamber outside of the sealed vacuum retort and therefore no vacuum can be applied outside of the sealed vacuum retort such that an outer exterior of the peclet seal remains at approximately atmospheric pressure.

12. The vacuum furnace of claim 10 wherein the arrangement of insulation is at least partially surrounded by a unsealed protective cover that permits a flow of outside ambient air therethrough.

13. The vacuum furnace of claim 10 wherein one of the retort base and the retort body includes a circumferentially extending sweep gas groove that is disposed between the inner gasket seal and the peclet seal and is configured to receive sweep gas from a sweep gas tube, that is in fluid communication with the sweep gas groove, such that the sweep gas surrounds the inner seal and a majority of the sweep gas flows into and through the peclet seal at a velocity sufficient to suppress diffusion of outside air towards the inner volume.

14. The vacuum furnace of claim 13 wherein the sweep gas tube extends through at least a portion of the arrangement of furnace insulation and is in non-separably hermetically sealed to the sealed vacuum retort.

15. The vacuum furnace of claim 13 wherein the sweep gas flows through the peclet seal at a rate of between and inclusive of 0.1 to 2.0 standard liters per minute (SLM).

16. The vacuum furnace of claim 13 wherein the sweep gas flows through the peclet seal at a rate of between and inclusive of 0.1 to 1.0 SLM.

17. The vacuum furnace of claim 13 wherein the sweep gas is an inert gas.

18. The vacuum furnace of claim 17 wherein the sweep gas is Argon.

19. The vacuum furnace of claim 13 wherein the sweep gas is a pure, laboratory grade, inert gas with a purity better than 1 ppm.

20. The vacuum furnace of claim 13 wherein the peclet seal includes (i) a peclet channel having a peclet channel length extending from the sweep gas groove to the exterior outside ambient air; and the peclet channel is delimited by (ii) a peclet gap extending between confronting faces of the retort body and the retort base such that the sweep gas flows from the sweep gas groove to the outside ambient air.

21. The vacuum furnace of claim 20 wherein the peclet gap is between or equal to one of 0.001 inches to 0.010 inches.

22. The vacuum furnace of claim 20 wherein the peclet gap is between or equal to one of 0.002 inches to about 0.005 inches.

23. The vacuum furnace of 20 wherein the sweep gas groove has a sufficiently large width and a depth such that a fluidic conductance of the channel is greater than 10 times a fluidic conductance of the peclet gap.

24. The vacuum furnace of claim 13 wherein the peclet seal provides suppression sufficient such that any sweep gas in the sweep gas groove that leaks into the sealed vacuum retort through the gasket leak is contaminated with outside ambient air only by an amount that is lower than 1 part per million (ppm).

25. The vacuum furnace of claim 24 wherein the amount of contamination is lower than 100 part per billion (ppb).

26. The vacuum furnace of claim 24 wherein the amount of contamination is lower than 10 ppb.

27. The vacuum furnace of claim 24 wherein the amount of contamination is lower than 1 ppb.

28. The vacuum furnace of 24 wherein for a generally pure sweep gas a higher degree of suppression of diffusion of the outside ambient air results in a higher degree of isolation and the concentration of contamination of process gas in the hollow interior by outside air deceases as a Peclet channel length increases and as the gas velocity increases.

29. The vacuum furnace of 24 wherein a degree of isolation can be approximately based on the relationship $Pe=u \times L/D$ wherein Pe is a unitless Peclet number, u is the gas velocity and D is the diffusivity of the air within the sweep gas.

30. The vacuum furnace of 13 wherein the suppression of diffusion of the outside air by the peclet seal renders the gasket leak to be sufficiently uncontaminated to prevent any adverse effects from the outside air on the quality of sintered parts.

31. The vacuum furnace of claim 30 wherein any contamination in the gasket leak is further diluted, by the process gas, as it enters the inner volume.

32. The vacuum furnace of claim 5 wherein the inlet tube and the outlet tube each are non-separably sealed to the base plate, each of the inlet tube and the outlet tube forming a continuous hermetic seal therewith.

33. The vacuum furnace of claim 32 wherein the inlet tube and outlet tube are each integrally formed with and composed of the same material as the furnace base.

* * * * *